(12) United States Patent
Persinger et al.

(10) Patent No.: US 8,444,923 B2
(45) Date of Patent: May 21, 2013

(54) METHOD AND APPARATUS TO ACHIEVE FORMULATION AND REACTIVE POLYMERIZATION UTILIZING A THERMALLY ATMOSPHERICALLY CONTROLLED FEEDING SYSTEM FOR THERMOPLASTIC MATERIALS

(75) Inventors: Jeff Persinger, Clifton Forge, VA (US); Jeff Rose, Clifton Forge, VA (US); J. Wayne Martin, Buchanan, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 46 days.

(21) Appl. No.: 13/003,258

(22) PCT Filed: Jul. 8, 2009

(86) PCT No.: PCT/US2009/049928
§ 371 (c)(1),
(2), (4) Date: Jan. 7, 2011

(87) PCT Pub. No.: WO2010/006044
PCT Pub. Date: Jan. 14, 2010

(65) Prior Publication Data
US 2011/0116975 A1 May 19, 2011

Related U.S. Application Data

(60) Provisional application No. 61/078,884, filed on Jul. 8, 2008.

(51) Int. Cl.
*B01J 19/18* (2006.01)
*B01J 19/00* (2006.01)
*B01J 8/00* (2006.01)
*G05B 1/00* (2006.01)
*G05D 23/00* (2006.01)
*G05D 16/00* (2006.01)
*B29C 47/76* (2006.01)
*B29C 47/00* (2006.01)
*B28B 3/20* (2006.01)

(52) U.S. Cl.
USPC ........... 422/135; 422/105; 422/108; 422/109; 422/112; 422/129; 422/131; 422/187; 264/101; 264/102; 264/176.1

(58) Field of Classification Search
USPC ................. 422/105, 108, 109, 112, 119, 129, 422/131, 135, 187; 164/101, 102, 176.1
See application file for complete search history.

(56) References Cited

U.S. PATENT DOCUMENTS 4,456,389 A * 6/1984 Regenass et al. ............... 374/31
(Continued)

FOREIGN PATENT DOCUMENTS

| EP | 1647788 | 4/2006 |
|---|---|---|
| KR | 100647253 | 11/2006 |

(Continued)

OTHER PUBLICATIONS

International Search Report and Written Opinion dated Feb. 25, 2010 issued by the Korean Intellectual Property Office for PCT Application No. PCT/US2009/049928.

*Primary Examiner* — Jill Warden
*Assistant Examiner* — Natasha Young
(74) *Attorney, Agent, or Firm* — Jihan A. R. Jenkins, Esq.; Ryan A. Schneider, Esq.; Troutman Sanders LLP

(57) ABSTRACT

A continuous process wherein a mechanized and automated feeding system provides precision delivery of thermally and atmospherically conditioned components to a pelletization process including extrusion, pelletization, thermal processing, drying, and post-processing of the polymeric pellets formed. The components can be combined to form solutions, dispersions, emulsions, formulations, and the like. These components can further be reacted and thermally modified to form oligomers, pre-polymers, polymers, copolymers, and many combinations thereof.

54 Claims, 66 Drawing Sheets

U.S. PATENT DOCUMENTS

| | | | |
|---|---|---|---|
| 6,332,765 B1 | 12/2001 | Spelleken | |
| 6,824,371 B2 | 11/2004 | Smit | |
| 7,771,635 B2 * | 8/2010 | Boothe et al. | 264/176.1 |
| 2004/0026339 A1 * | 2/2004 | Hills | 210/767 |
| 2005/0016214 A1 * | 1/2005 | Hsu et al. | 65/33.9 |
| 2007/0006454 A1 * | 1/2007 | Onobori et al. | 29/832 |
| 2008/0237145 A1 * | 10/2008 | Jefferson et al. | 210/748 |

FOREIGN PATENT DOCUMENTS

| | | |
|---|---|---|
| KR | 1020070106559 | 11/2007 |
| KR | 1020080012911 | 2/2008 |

* cited by examiner

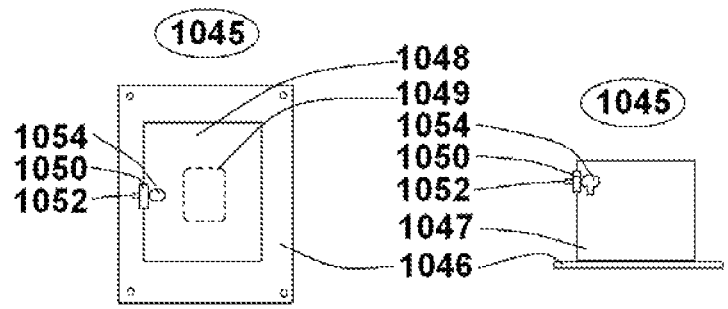
FIG. 9a
FIG. 9b
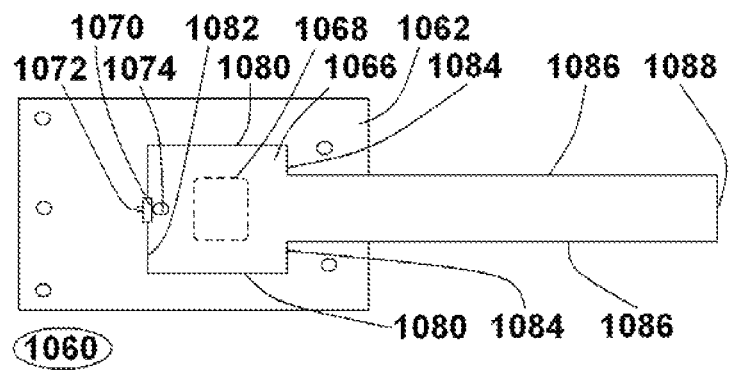
FIG. 9c
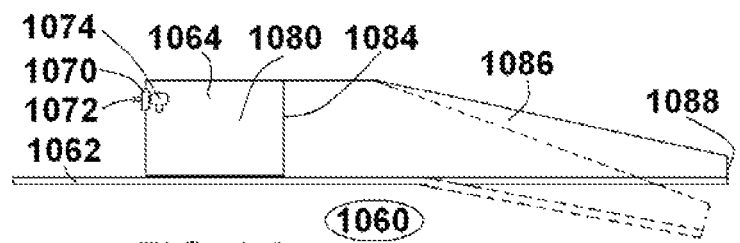
FIG. 9d

METHOD AND APPARATUS TO ACHIEVE FORMULATION AND REACTIVE POLYMERIZATION UTILIZING A THERMALLY ATMOSPHERICALLY CONTROLLED FEEDING SYSTEM FOR THERMOPLASTIC MATERIALS

CROSS-REFERENCE TO RELATED APPLICATION

The present application claims the benefit of International Patent Application Serial Number PCT/US2009/049928, filed 8 Jul. 2009, which claims the benefit of United States Provisional Patent Application Ser. No. 61/078,884 filed 8 Jul. 2008, both of which are entitled "Method And Apparatus To Achieve Formulation And Reactive Polymerization Utilizing A Thermally And Atmospherically Controlled Feeding System For Thermoplastic Materials," and are hereby incorporated by reference in their entirety as if fully set forth below.

BACKGROUND OF THE INVENTION

1. Field of the Invention

The present invention generally relates to a continuous process wherein a mechanized and automated feeding system provides precision delivery of thermally and atmospherically conditioned components to a pelletization process including extrusion, pelletization, thermal processing, drying, and post-processing of the polymeric pellets formed such that the components can be combined to form solutions, dispersions, emulsions, formulations, and the like, wherein these components can further be reacted and thermally modified to form oligomers, pre-polymers, polymers, copolymers, and many combinations thereof.

2. Description of the Prior Art

The generally independent processes and equipment in the conventional reactive extrusion, pelletization, and drying processes of polymeric material are known, some for many years, and used in various applications the most notable of which include polyurethanes. Thermal processing of the reactive components and polymeric pellets as used herein can involve temperature manipulation, including heating and cooling as well as crystallization and is well known.

Yet, the prior art is silent as to the use of a mechanized and automated feeding system to provide for the precision delivery of thermally conditioned reactive components to that reactive extrusion facilitating rigorous control of that reaction process and the subsequent pelletization, thermal processing, drying, and post-processing of the polymer formed.

Pelletization equipment and its use following extrusion processing have been implemented for many years by the assignee as demonstrated in prior art disclosures including U.S. Pat. Nos. 4,123,207; 4,251,198; 4,500,271; 4,621,996; 4,728,176; 4,888,990; 5,059,103; 5,403,176; 5,624,688; 6,332,765; 6,551,087; 6,793,473; 6,824,371; 6,925,741; 7,033,152; 7,172,397; 7,267,540; 7,318,719; US Patent Application Publication Nos. 20060165834; German Patents and Applications including DE 32 43 332, DE 37 02 841, DE 87 01 490, DE 196 42 389, DE 196 51 354, DE 296 24 638; World Patent Application Publications WO2006/081140, WO2006/087179, WO2007/027877, and WO2007/089497; and European Patents including EP 1 218 156 and EP 1 582 327. These patents and applications are all owned by the assignee and are included herein by way of reference in their entirety.

Similarly, dryer equipment has been used by the assignee of the present invention for many years as demonstrated in the prior art disclosures including, for example, U.S. Pat. Nos. 3,458,045; 4,218,323; 4,447,325; 4,565,015; 4,896,435; 5,265,347; 5,638,606; 6,138,375; 6,237,244; 6,739,457; 6,807,748; 7,024,794; US Patent Application Publication No. 20060130353; World Patent Application Publication No. WO2006/069022; German Patents and Applications including DE 19 53 741, DE 28 19 443, DE 43 30 078, DE 93 20 744, DE 197 08 988; and European Patents including EP 1 033 545, EP 1 123 480, EP 1 602 888, EP 1 647 788, EP 1 650 516, and EP 1 830 963. These patents and applications are all owned by the assignee and are included herein by way of reference in their entirety.

Additionally crystallization processes and equipment are also disclosed by the assignee exemplarily including U.S. Pat. No. 7,157,032; US Patent Application Publication Nos. 20050110182, 20070132134; European Patent Application No. EP 1 684 961; World Patent Application Publication Nos. WO2005/051623 and WO2006/127698. These patents and applications are all owned by the assignee and are included herein by way of reference in their entirety.

Post-processing manipulations as used herein can include thermal manipulation, pellet coating, particle sizing, storage, and packaging of the pellets thusly formed, and are well-known to those skilled in the art.

BRIEF SUMMARY OF THE INVENTION

Briefly described, in preferred form, the present invention is a method for rigorously controlling the feed of reactive components to a reactive extrusion process, mechanically and automatically, to precisely maintain the respective quantities of those components as well as the thermal conditioning of those components being fed simultaneously to a reactive extrusion process. The polymer formed is pelletized following appropriate mixing and thermal manipulation, heating and/or cooling, and is transported downstream for crystallization, as required, drying, and subsequent post-processing manipulations.

In an exemplary embodiment, the present invention is a system to achieve formulation and reactive polymerization utilizing a thermally and atmospherically controlled feeding system for thermoplastic materials comprising a feeding unit that provides the precision delivery of thermally and atmospherically conditioned components in a stream, and optionally one or more of the following units: a mixing unit to mix and thermally control the components of the stream from the feeding unit, to effect polymerization in the mixing process, a pressurizing unit to pressurize the stream from the mixing unit, a filtering unit to filter the pressurized stream from the pressurizing unit, and a pelletization unit to pelletize the stream. The present invention can further comprise a second mixing unit to mix the filter stream from the filtering unit, a second pressurizing unit to pressurize the stream from the second mixing unit, a second filtering unit to filter the pressurized stream from the second pressurizing unit, and providing the stream from the second filtering unit to the pelletization unit. The present invention can further comprise a drying unit to drying the pellets of the pelletized stream. The present invention can further comprise a pellet crystallization unit to crystallize the pellets of the pelletized stream.

In an exemplary embodiment, the present invention is a system to achieve formulation and reactive polymerization utilizing a thermally and atmospherically controlled feeding system for thermoplastic materials comprising a feeding unit that provides the precision delivery of thermally and atmospherically conditioned components in a stream, and optionally one or more of the following elements of the feeding unit or other units: the feeding unit comprising at least two reservoir tanks for conditioning the reactive stream, an inert gas and vacuum assembly for regulating and metering the reactive stream through the feeding unit, a mix head located on a pivotable arm, a rinse system to rinse feeding unit transport lines and at least the mix head of the reactive stream, and independent reactive stream temperature control for each reservoir tank, a mixing unit to mix and thermally control the components of the stream from the feeding unit, to effect polymerization in the mixing process, a positioning system to ensure the proper positioning of the stream exiting from the feeding unit to the mixing unit, wherein the stream is provided from the mix head of the feeding unit to a throat of an extruder of the mixing unit, and wherein the positioning system comprises a sensor in proximity to the mix head in order to ensure the location of the mix head over the throat of the extruder when delivering the stream from the feeding unit to the mixing unit, a pressurizing unit to pressurize the stream from the mixing unit, a filtering unit to filter the pressurized stream from the pressurizing unit, the filtering unit comprising at least two filters, a first filter being an on-line filter for filtering the stream, and a second filter being a stand-by filter for use when the first filter must be taken off-line, wherein the stream is directed through the first filter for filtering, wherein upon when there is a need for removing the first filter from the processing system, the stream can be directed through the second filter for filtering, and wherein the second filter is temperature controlled during stand-by, so the second filter has the operational characteristics for ready substitution of the first filter, so it can become the on-line filter upon removal of the first filter, a pelletization unit to pelletize the stream, and a drying unit to drying the pellets of the pelletized stream.

In an exemplary embodiment, the present invention is a feeding unit that provides the precision delivery of thermally and atmospherically conditioned components in a stream, a mixing unit to mix the components of the stream to effect polymerization in the mixing process, and a pelletization unit to pelletize the mixed stream. The feeding unit can comprises one or more reservoir tanks for conditioning the stream. One of the at least one or more reservoir tanks can comprise a perforated angular fluid regulating device through which the stream flows, wherein the perforated angular fluid regulating device tapers decreasingly in the direction of the bottom of the at least one of the one or more reservoir tanks, wherein the perforations of the perforated angular fluid regulating device are positioned so as to allow excess stream to drain out of the perforated angular fluid regulating device, and wherein the angularity perforated angular fluid regulating device allows some build-up of incoming stream while directing the flow of that stream taperingly into a fluid film along the wall of at least one of the one or more reservoir tanks. One of the at least one or more reservoir tanks can comprise stream level control. The stream level control can comprise an inert gas and vacuum assembly. One of the at least one or more reservoir tanks can comprise stream temperature control. The stream temperature control can comprise a stirring system to maintain sufficient motion of the stream in the reservoir tank to achieve uniformity of temperature throughout the reservoir tank. The stream temperature control can comprise a plurality of thermocouples to monitor stream temperature. The stream temperature control can comprise a circulation system to circulate a heat stream in proximity to the reservoir tank. The stream temperature control can further comprise a deflection system, wherein the circulation system comprises a blower, and the heat stream is heated air from the blower, and wherein the deflection system comprises a plurality of baffles.

The present invention provides numerous advantages over the conventional art, for example, the ovens used in the conventional process are, in essence, just a big box with hot air blown through a fan in the bottom and up around the tanks. Yet, this design is very inefficient, and causes hot-spots on the tanks. The present invention surrounds the tanks with ductwork that takes air from the bottom of the oven, heats it, and circulates it around the outer circumference near the top of the tanks, and then the air travels downward back to the intake fan. The present invention utilizes pumps and flow-meters in the oven, but there is not any hot air blowing directly on them. In the conventional system, the hot air from the fan is directly in front of the flow meters, and this causes some problems with temperature fluctuations. As the temperature in the oven goes up or down, that fan blows unheated or hot air (depending on the oven temperature) out.

The present invention can also utilize stirrers for the tanks that preferably are not used, but if needed because of temperature concerns, they provide relatively low mixing action. The stirrers are preferably designed to just keep the contents moving from the outer wall of the tank (where the heat is), to the center of the tank.

The present invention can also utilize 25 micron filters on refill lines to the tanks to filter out any contaminants that could be transferred from main storage tanks. This keeps the tanks clean.

Preferably, all inert gas and vacuum generation is computer controlled. For example, an operator can set the inert gas, for example, nitrogen, pressure from a touch screen and the system controllers will maintain it. The conventional process required extensive twisting of knobs, and a hope that the pressure would not gradually increase/decrease because the operator over/under set a knob. The present control system can also alarm the operator when pressure/vacuum is lost, and will shut down pumps accordingly.

The tanks can utilize load cells for refill and usage. On initial startup, the tanks can be filled to a certain level, and the control system instructed that this is the FULL weight. Then, the system can be instructed at what weight to open the refill valve. For example, if 800 kg is set as the full level, and it is determined that the tank should be refilled after using 100 kg, the system can be appropriately coded, and the operator removed from manually handling this operation.

At the same time the weights are stored, the system can provide the operator with how much chemical are being using. For example, from the above, if the system refills ten (10) times a night, then a line supervisor would be informed they have used 1,000 kg of chemical that night. These running totals can be kept, for example, by the hour, day, week and month. This way, an operator can take this information and schedule chemical shipments more accurately, because she knows how much is going to be used through a run. It also allows her to do budgetary and negotiation work with the supplier, because she will have a more accurate accounting of how much chemical she will need in a week/month/year.

As designed, the present invention enables the mix head to be moved vertically by a screw shaft and motor. The operator can adjust the mix head up and down to the feed throat by pushing a button, eliminating the need for complicated locks or lifting mechanisms. Moving the mix head in and out can be had by an articulated arm. It is easy to move, and can be locked in position. The mix head also has safety features, for example, where it will not pour chemicals unless it is over the feed throat, and it will not pour solvent unless it is away from the extruder.

A feeding system touch screen is provided, and can be located on an arm that allows it to be moved in proximity to the mix head when the operator is ready to pour. This way, the operator at the feed throat can position the mix head, start the feeding system and extruder, and can speed up or slow down the extruder without ever taking her eyes off of the feed port.

Another touch screen can be provided at the pelletizer, and both touch screens are designed to operate the entire system. In one embodiment, the pelletizer can be started from the feeding system touch screen, and the feeding system can be started from the pelletizer. However, there are safeguards in both, to avoid, for example, feed throat issues These and other objects, features and advantages of the present invention will become more apparent upon reading the following specification in conjunction with the accompanying drawings.

BRIEF DESCRIPTION OF THE DRAWINGS

FIG. 9a is a top view illustration of a material feeding inlet shroud.

FIG. 9b is a cross-sectional illustration of a material feeding inlet shroud.

FIG. 9c is a top view illustration of a material feeding inlet overflow shroud.

FIG. 9d is a cross-sectional illustration of a material feeding inlet overflow shroud.

FIG. 33a is a schematic view of a portion of a streamline cutter hub.

FIG. 33b is a schematic view of the streamline cutter hub rotated in perspective relative to FIG. 33a.

FIG. 33c is a cross-sectional view of the streamline cutter hub in FIG. 33a.

DETAILED DESCRIPTION OF THE INVENTION

Figure 1:
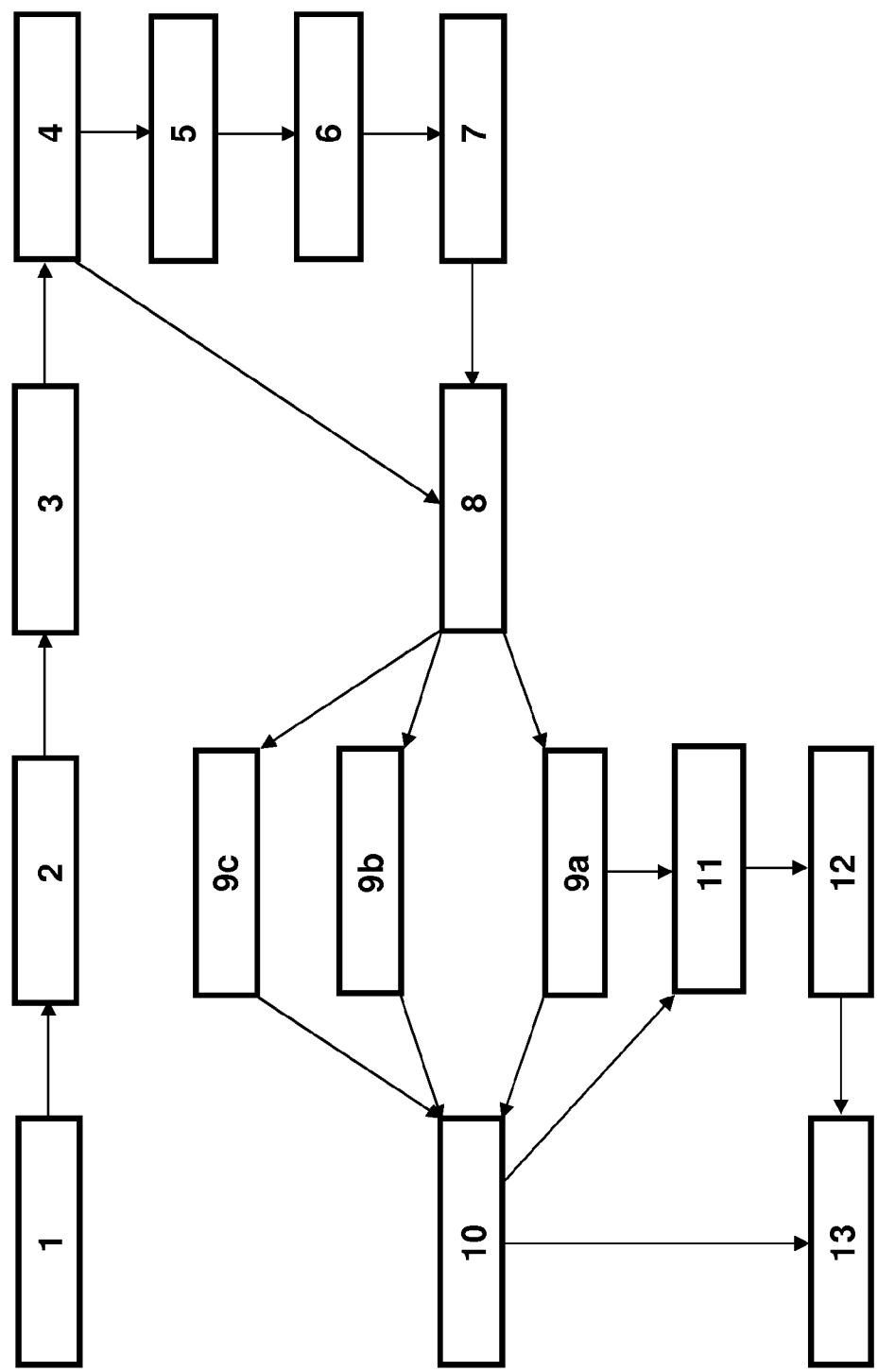
FIG. 1 is a flow chart diagram illustrating the reactive extrusion process with feeding system.

Although preferred embodiments of the invention are explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

The present reactive mixing processing system with precisely controlled feeding as shown diagrammatically in FIG. 1 includes a feeding system section 1 that provides precise control of the quantities of reactive components as well as precise control of the thermal condition of those reactive components with mixing to a reactive extrusion process section 2. The reactive components are further mixed and thermally controlled to effect polymerization in the reactive mixing process and are subsequently pressurized, section 3, for filtration in section 4. The filtered material can optionally pass to and through a second mixing process, section 5, with additional pressurization, section 6, and filtration, section 7, or directly to a pelletization section 8. The pelletized material is transported through section 9a or optionally transported with acceleration to retain internal heat through section 9b or optionally transported with pressurization to minimize loss of volatiles through section 9c. Transport can go to a dryer section 10 or to a pellet crystallization section 11. Pellets from the pellet crystallization section 11 are transported to dryer section 12 and subsequently to post-processing section 13. Alternatively, the pellets from dryer section 10 can proceed directly to post-processing section 13 or can be transported to pellet crystallization section 11 with subsequent drying in dryer section 12 and post-processing in section 13.

Figure 2:
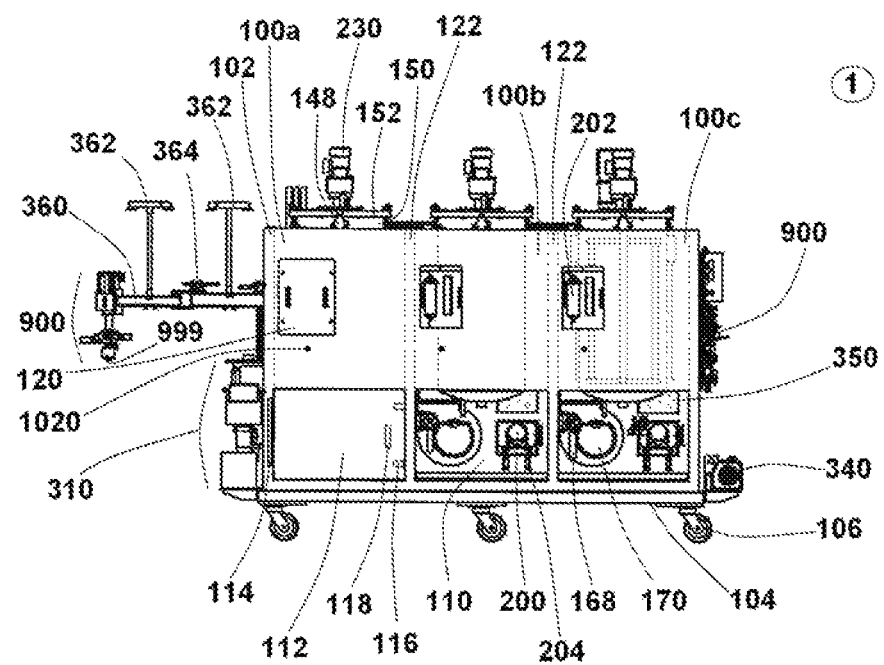
FIG. 2 is a schematic illustration of the access or rear view of the feed system section containing a cross-sectional view of the reservoir tank with agitator and air-circulation shroud containing a cross-sectional view of the reservoir tank with agitator and air-circulation shroud.

Turning now to FIG. 2, illustrating the access or rear view, the feed system section 1 comprises a housing 102 fixedly attached, preferably by welding, to frame 104 and to which a multiplicity of optional wheels 106 are attached threadingly, or preferably bolting affixedly, to frame 104 for ease of positionability and maneuverability of the unit. The housing 102 contains at least one reservoir tank 150 and preferably contains a multiplicity of reservoir tanks 150 in an equivalent multiplicity of reservoir chambers 110. The tanks are enclosed by tank cover 152. Reservoir chamber access door 112 is attached to housing 102, preferably hingedly attached by at least one hinge 114, and latched when in closed position by at least one manual latch 116. Handle 118 is attached to reservoir chamber access door 112. Fluid filter access door 120 is attached to housing 102 preferably by a multiplicity of screws. Alternatively, the fluid filter access door 120 can be bolted into place or can be attached by hinges and latches, not shown, and the like as is known to those skilled in the art. Optionally at least one handle 134 can be affixed to fluid filter access door 120.

Feed system section 1 is illustrated in FIG. 2 comprising three reservoir tanks 150 in three reservoir chambers 110 as separated by two partitions 122 indicated positionally by dotted lines without intending to be limiting. The first chamber is 100a is completely enclosed by reservoir chamber access door 112 and fluid filter access door 120. Similarly the second 100b illustrates the dotted outline of reservoir tank 150 with the reservoir chamber access door 112 and fluid filter access door 120 removed. The third chamber 100c illustrates a cross-section through the tank to show the internal components. Details of the components and construction are disclosed hereinbelow and further detailed in FIG. 2a.

Attached to tank cover 152 in FIG. 2 is stirrer 230 and between tank cover 152 and housing 102 is at least one and preferably a multiplicity of load cells 148 discussed below. Within reservoir chamber 110 and visible through the reservoir chamber access door 112 is flowmeter 168, blower 170, and fluid circulating pump 200. Similarly, fluid filter 202 is accessed within the upper portion of the reservoir chamber 100 through fluid filter access door 120.

Figure 2A:
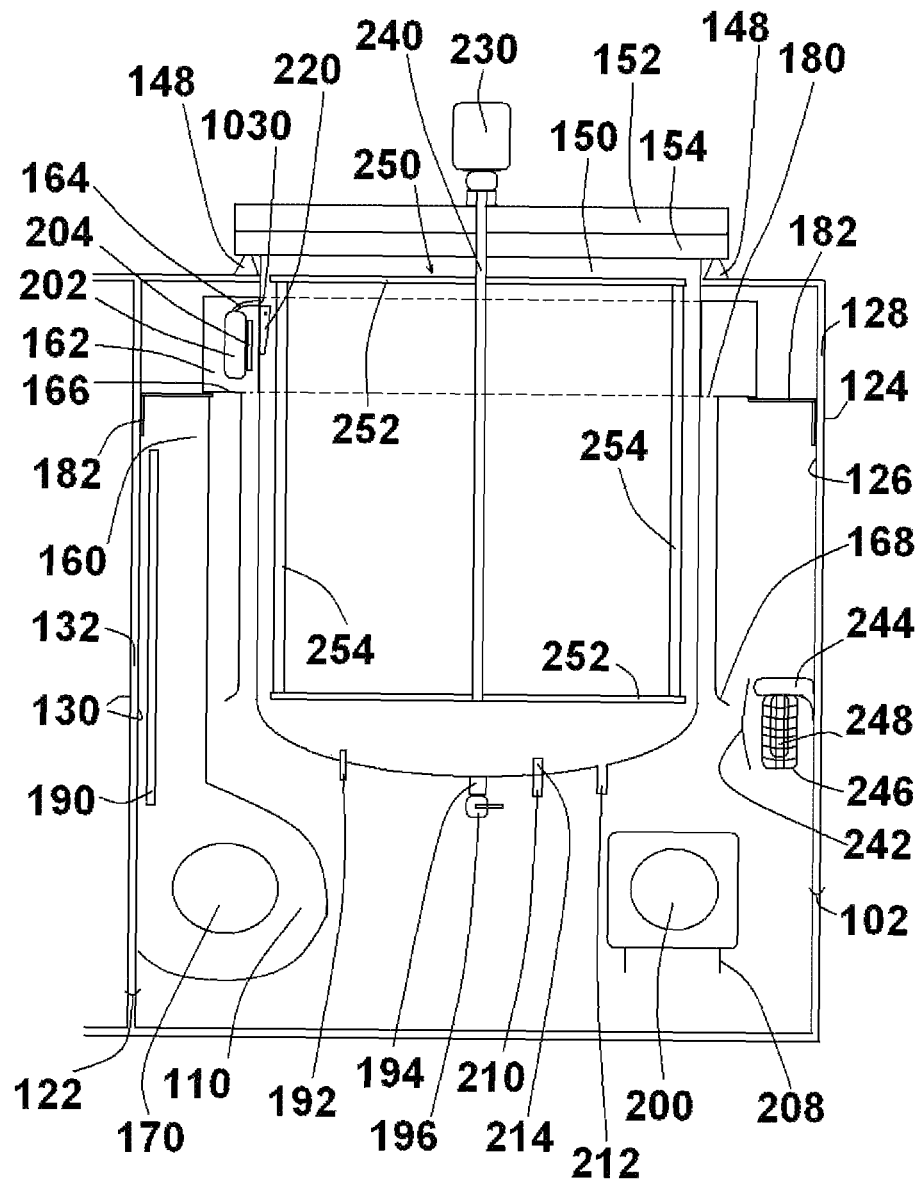
FIG. 2a is a cross-sectional illustration of the reservoir tank, housing, and agitator.

Turning now to FIG. 2a, housing 102 is constructed with outer wall 124, inner wall 126 and insulation 128. Similarly, partition 122 is constructed from two walls 130 between which is insulation 132. The walls 130 of partition 122 are attached to inner wall 126, preferably by welding. The walls 130, inner wall 126, and outer wall 124 are sheet metal and preferably are steel including tool steel, vanadium steel, carbon steel, hardened steel, stainless steel, nickel steel and the like.

Tank 150 has an annular flange 154 attached thereto, preferably by welding, about its uppermost periphery. Tank cover 152 is attachedly connected to annular flange 154, preferably by bolts, and the assembly rests on at least one and preferably a multiplicity of load cells 148 and thus is suspended into reservoir chamber 110. Load cells 148 are attached to housing 102, preferably by bolting, and optionally can be attached to annular flange 154 also preferably by bolting. The tank can be made from many metals, including aluminum, steel, tool steel, vanadium steel, hardened steel, carbon steel, stainless steel, nickel steel and the like and is preferably constructed of 304 grade stainless steel or equivalent.

Blower 170 is contained within duct 160 that is attachedly connected to the inner wall 126 of housing 102 as well as to wall 130 of partition 122 along the vertical height to connect to circumferential duct 162 through which is suspended reservoir tank 150. The upper diameter 164 of circumferential duct 162 about reservoir tank 150 closely approximates the diameter of reservoir tank 150 whereas the lower diameter 166 of circumferential duct 162 is radially larger and thus circumferentially larger than the diameter of reservoir tank 150. Attached, preferably by welding, peripherally about lower diameter 166 of circumferential duct 162 is circumferential shroud 169 of approximately comparable length to the wall of reservoir tank 150. At least one and preferably a multiplicity of baffles 180 or equivalent deflection devices are positioned circumferentially about the juncture of lower diameter 166 of circumferential duct 162 and circumferential shroud 169 to deflect the flow of air emanating from blower 170 to and through duct 160 into and around circumferential duct 162 around reservoir tank 150 and down and out through the cavity formed between circumferential shroud 169 and reservoir tank 150. Within duct 160 is at least one and preferably a multiplicity of heating elements, and more preferably a multiplicity of resistance heating elements 190. The duct 160, circumferential duct 162, and circumferential shroud 169 can be made of many metals, including aluminum, steel, tool steel, galvanized steel, vanadium steel, hardened steel, carbon steel, stainless steel, nickel steel and the like and is preferably constructed of galvanized steel or its equivalent. Circumferential duct 162 rests on at least one and preferably a multiplicity of brackets 182 attached to wall 130 of partition 122 and/or inner wall 126 of housing 102.

Fluid filter 202 is attached, preferably bolted, to bracket 204 and is subsequently attached, preferably by welding, to circumferential duct 162. Other positions of attachment are anticipated by the instant invention as is understood by someone skilled in the art.

Attached to the reservoir tank 150 is thermal well 192 for insertion of a thermocouple, not shown, as well as fluid outlet 210 and return fluid inlet 212. At the lowest elevation of reservoir tank 150 is attached drain 194 and drain valve 196, preferably a ball valve. Optionally a standpipe 214 can be attached within reservoir tank 150 to fluid outlet 210 to minimize or avoid accidental withdrawal of undesirable sediment into the fluid.

Within reservoir tank 150 is attached, preferably by welding, perforated angular fluid regulating device 220. The fluidic circulation pathway is further described in detail hereinbelow.

Figure 3:
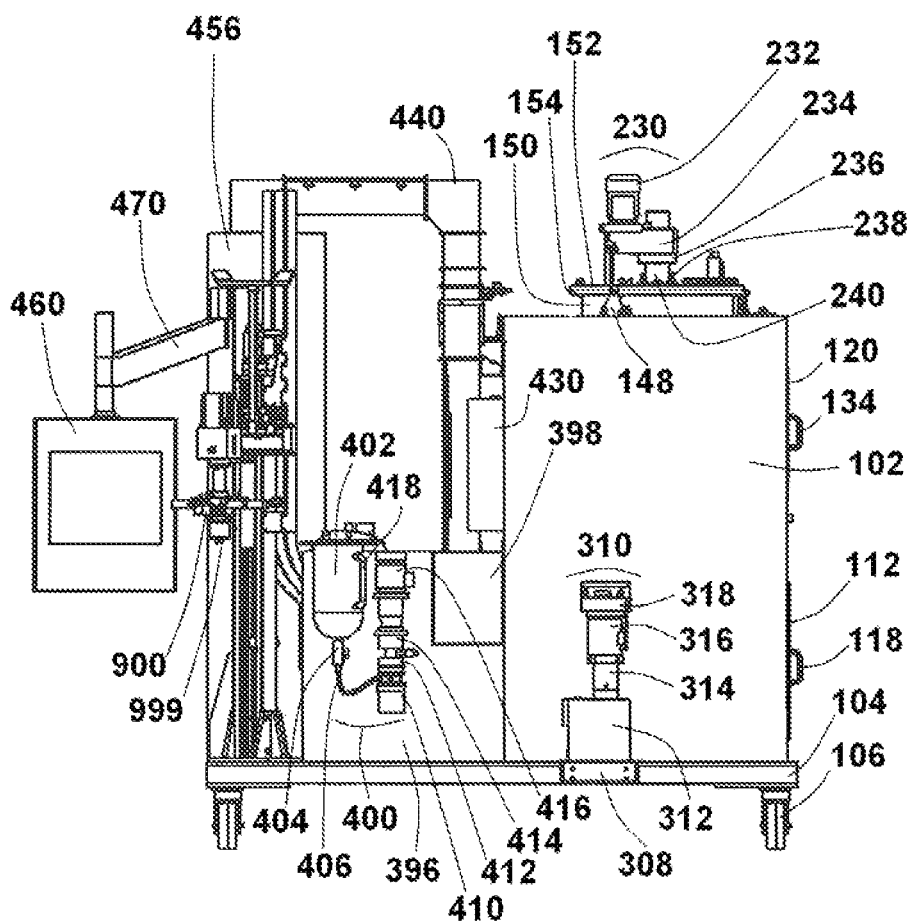
FIG. 3 is a schematic illustration of the end-on view of the feed system section with oil circulation system and catalyst system.

Stirrer 230 as illustrated in FIG. 3 is comprised of stirrer motor 232 attached to a gear reduction box 234 connected to stirrer shaft 240 through flexible connector 236 and seal 238 that can be a lip seal, oil seal, mechanical seal and the like and is preferably a mechanical seal. Stirrer shaft 240, in FIG. 2a, attaches to stir blade 250 that comprises at least two horizontal blades 252 and at least two vertical blades 254. The purpose of the stirring is one of maintaining sufficient motion of the fluid to achieve uniformity of temperature throughout the reservoir tank 150. The rotation of the stir blade 250 within the tank should be sufficiently slow that a vortex is not formed and disturbance of any sediment that can potentially form at the base of the tank is minimized and preferably avoided. The horizontal blades 252 and vertical blades 254 can be rectangular to square in cross-section, propeller or boat style, ploughshare style, and the like and are preferably rectangular. The vertical blades 254 can be offset within a range 0° to 90° from perpendicular orientation relative to horizontal blades 252 and are preferably offset within a range 30° to 60° from perpendicular orientation and most preferably are offset at a 45° angle. The leading edge of vertical blade 254 preferably is oriented in closest proximity to the wall of reservoir tank 150 in the direction of rotation of stir blade 250 such that the material is moved away from the walls of the reservoir tank 150 toward the center of the reservoir tank 150. Alternatively, the vertical blade 254 can also be angled, and preferably at least partially contoured away from vertical over a range of 0° to 45° such that deflection of the fluid is moved upwardly along the wall of reservoir tank along the length of that wall. Preferably, the vertical blade is offset at an angle within a range of 30° to 60° from perpendicular orientation and is at least partially contoured away from vertical over a range from 0° to 30°. Most preferably the vertical blade is offset at an angle within a range of 45° from perpendicular orientation and is at least partially contoured away from vertical over a range from 0° to 10°. The stirrer shaft 240, horizontal blades 252, and vertical blades 254 can be made of many metals, including aluminum, steel, tool steel, vanadium steel, hardened steel, carbon steel, stainless steel, nickel steel and the like and is preferably constructed of 304 stainless steel or its equivalent.

Without intending to be bound by theory, the motion of the fluid within the tank is one of a convection cell wherein the direction of motion of the fluid is upward along the wall of reservoir tank 150 then across the upper level of fluid and down toward the center of the fluid along stirrer shaft 240 and across the bottom of the fluid back toward the wall. Stirring propagates this flow and directs the body of fluid in a convolute and preferably spiral pathway transcribing the convection cell to maintain the uniformity of the temperature within the tank.

Wherein necessary, a multiplicity of additional stir blades can be added to the stir blade 250 that can be similar or different in design, dimension, and configuration as that described supra. Attachment of the optional additional blades can be to the stirrer shaft 240, to the horizontal blades 252 and/or to the vertical blades 254 and many combinations thereof. Positioning of the optional additional vertical blades 254, can be at many distances radially and outwardly from the stirrer shaft 240 and positioning of the optional additional horizontal blades 252 can be at many points or multiplicity of points along the length of stirrer shaft 240. A multiplicity of stir blades 250 can be oriented about the stir shaft 240 as well and can be the same or different as other stir blades similarly attached.

Also within reservoir chamber 110 is fluid pump 200 fixedly attached to mounting bracket 208 which passes through an opening 206 in housing 102 in FIGS. 2 and 2a. For purposes of clarification, opening 206 is in the operation or front side of housing 102 and is illustrated in FIGS. 2 and 2a as the rear wall of the reservoir chamber 110. Additional details for the fluid pump 200, fluid flow pathways, and attachments follow hereinbelow.

Attached to the inner wall 126 of housing 102, FIGS. 2 and 2a, is thermally rated lighting fixture 242 that comprises a conventional mounted fixture 244, wire cage 246, and thermally rated glass shield 248 about the light bulb, not shown. The thermally rated lighting fixture 242 can be mounted at many locations within reservoir chamber 110 and is preferably located near the base of reservoir tank 150 for greatest visibility within the reservoir chamber. The thermal rating of the glass shield 248 must exceed the anticipated maximum temperature anticipated for usage of that specific reservoir chamber 110.

FIG. 2 further illustrates vacuum pump 340 and inert gas and vacuum assembly 800 attached to the side panel of housing 102. A perforated plate 350 through penetrates the rear wall of the reservoir chamber 110 and is described in detail below. Attached to the opposite side panel of housing 102 is oil circulation pump 310. Extending from behind housing 102 is pivotable arm 360 to which is attached at least one fluid line support 362, manual latches 364, and mix head 900. Additional details of each of these attachments follows hereinbelow.

It is to be understood that the details as herein described for an exemplary tank assembly are equally applicable to each of a multiplicity of tank assemblies such that each of the three reservoir tanks 150 in FIG. 2 have within them and/or within the reservoir chamber 110 a comparable multiplicity of equipment as described supra.

Returning now to FIG. 3, the illustrated view is of filling system section 1 as viewed in FIG. 2 that has now been rotated to the right. Reservoir tank 150 and tank cover 152 are suspended within housing 102 that is mounted on frame 104 and wheels 106 as before. The handle 118 on reservoir chamber access door 112 and handle 134 on fluid filter access door 120 appear as positioned on the access or front view as detailed supra. Load cell 148, preferably a multiplicity thereof, is visible as described hereinabove connected to the top of housing 102 and optionally to the annular flange 154 circumferentially surrounding reservoir tank 150.

Attached, preferably by bolting, to frame 104 is bracket 308 onto which is mounted, preferably by bolting, oil circulation pump 310. The conventional oil circulation pump 310 comprises an oil tank 312, oil pump 314, motor 316, and oil cooler 318. The oil circulation pump 310 recirculates oil to and from the mix head 900 as described herein below. Alternatively, other equivalent designs known to those skilled in the art can be used.

Attached to housing 102 and frame 104, preferably by welding, is backing plate and frame 396. Attached, preferably by bolting, is power supply 398 and optional catalyst system 400. The exemplary but not limiting conventional catalyst system 400 comprises a tank 402, "Y"-strainer 404 to filter catalyst fluid, manual valve with limit switch 406, flexible tubing 408 to flowmeter 410, catalyst pump 412, through coupling 414 to motor 416. Catalyst fluid level is monitored by visual fluid tube 418 attached to the side of catalyst tank 402. Optionally the catalyst system 400 can be purged and/or pressurized by air or inert gas and is preferably purged by nitrogen. Alternatively, other equivalent designs known to those skilled in the art can be used.

Attached to the operational or front view of housing 102 and illustrated here end-on is heater box 430. Located behind backing plate and frame 396 and heater box 430 is wire trough 440 that connects with the main electrical panel 456. Wire trough 440 is attached to housing 102 as it traverses both the length and height of housing 102 to accommodate the wiring for the majority of the unit. For purposes of clarity it is illustrated here end-on. Mix head 900 is mounted on a pivotal arm 360 which is not identified in this view for sake of clarity. Similarly, touch screen 460 is mounted on pivotal arm 470 only partially illustrated in this view for sake of clarity. Details of these assemblies follow hereinbelow.

Figure 4:
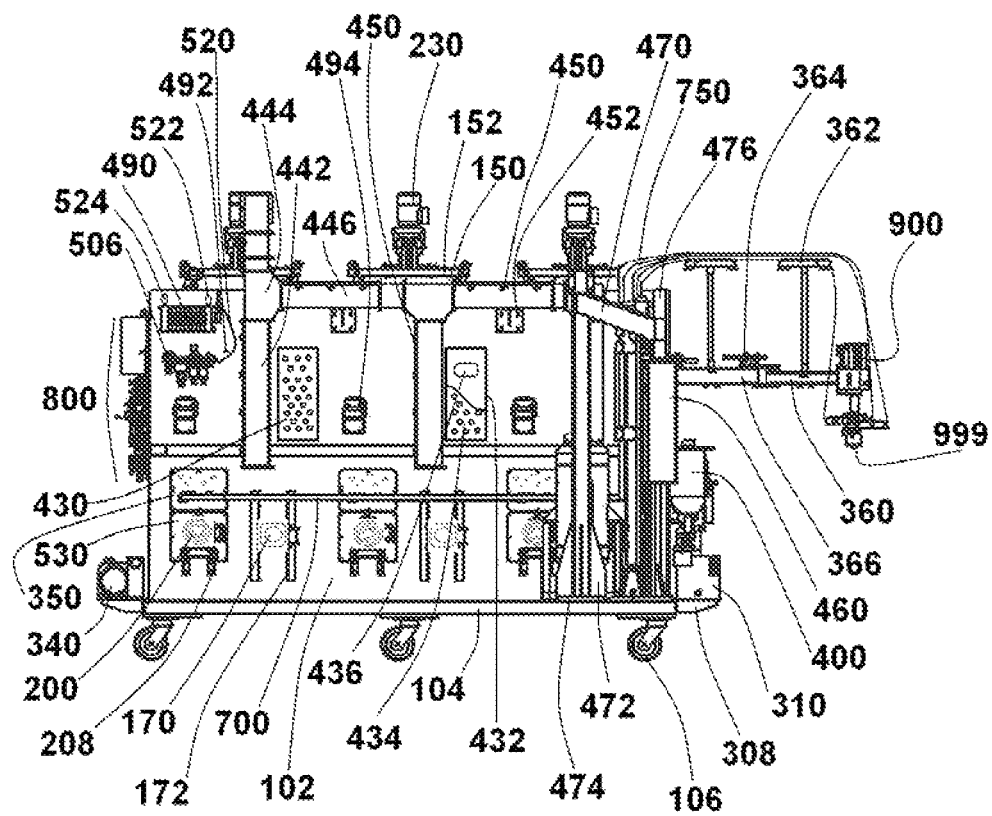
FIG. 4 is a schematic illustration of the operational or front view of the feed system section.

Turning now to FIG. 4, the operational or front view of feeding system section 1 once again reflects a rotation of the unit to the right as viewed. Reservoir tank 150 and tank cover 152 are suspended within housing 102 that is mounted on frame 104 and wheels 106 as before. FIG. 4 further illustrates vacuum pump 340 and inert gas and vacuum assembly 800 attached to the side panel of housing 102. Attached to the opposite side panel of housing 102 is oil circulation pump 310 and catalyst system 400 which appear to overlap in this particular orientation. Specific components for oil circulation pump 310 and catalyst system 400 have been detailed above and are omitted here for sake of clarity.

Wire trough 440 that connects with the main electrical panel 456, not shown for sake of clarity, comprises tubular and angular sections that can be of many cross-dimensional geometries, preferably square, through which pass the wiring for the various assemblies. The sections can be made of industrial grade plastic and many metals, including aluminum, steel, tool steel, vanadium steel, hardened steel, carbon steel, stainless steel, nickel steel and the like and is preferably constructed of carbon steel or its equivalent. The wire trough 440 comprises flanged vertical sections 442, flanged horizontal sections 446, flanged "T" sections 444, and various length flanged adapter sections 448 that are connectedly attached, preferably by bolting. Conventional gasketing material, not shown, can be and preferably is positioned between the appropriate flanges of the various sections. Vertical sections 442 and horizontal sections 446 preferably have removable faces, preferably attached by at least one more preferably a multiplicity of hinges 450 and latches, not shown to allow access to the internal wiring assemblages that pass therethrough. The hinged portions also contain conventional gasketing material, not shown, circumferentially about the entire area of the opening. The wire trough 440 is attached, preferably by screws and/or bolts, to at least one and preferably a multiplicity of "L"-brackets 452 attached directly to housing 102, also preferably by screws and/or bolts.

Heater box 430 is attached to housing 102, preferably by screws and/or bolting, and contains the electrical components 436 for the respective multiplicity of resistance heating elements 190, FIG. 2a, for reservoir chamber 110. The heater box comprises a frame 432, preferably square to rectangular covered by an attached, preferably by screw and/or bolting, perforated plate 434 to prevent accidental electrocution of personnel.

Figure 4A:
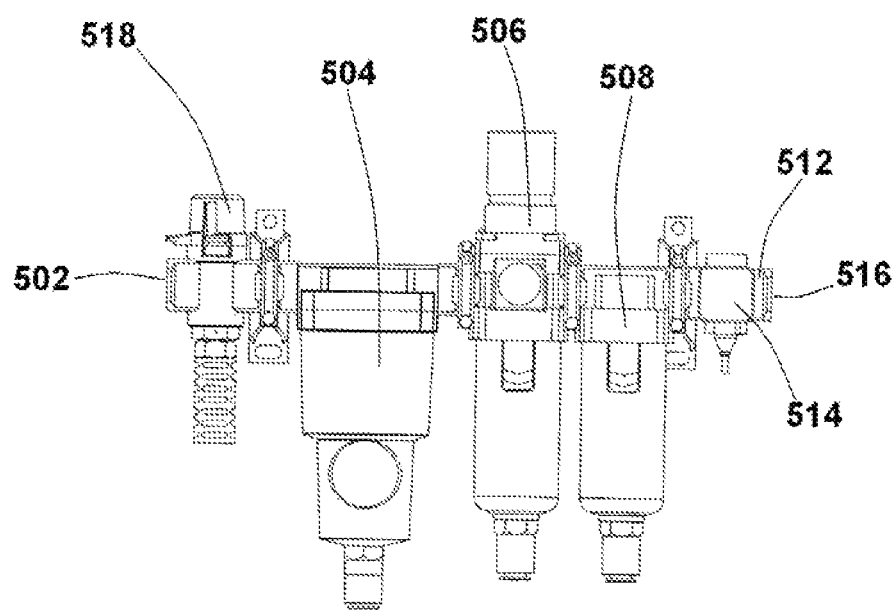
FIG. 4a is a schematic illustration of the air filter regulator and conditioner

Also attached to housing 102 is solenoid bank 490, thermocouple port 492, and flowmeter remote core 494 connectedly attached to flowmeter 168, in FIG. 2, to remove the expensive control mechanisms from the temperature controlled region inside reservoir chamber 110. The air filter regulator and conditioner 500, detailed in FIG. 4a, comprises an air inlet 502 into and through an exhaust muffler and water separator 504 attached to a filter regulator 506 and mist separator 508 to and through a cross interface 512 to which is attached a pressure switch and through air outlet 516. Air into the air filter regulator and conditioner 500 is controlled by valve 518 and is processed as it flows through the heretofore described assembly and tubing 520 to the inlet filter 522 to and through the solenoid bank 490 and out the exhaust filter 524. The tubing 520 can be interchangeably connected to either of filters 522 or 524 as the direction of flow is not restrictive thus allowing inlet and exhaust filters to serve opposite purposes for this assembly. Air inlet 502 is connected to inert gas and vacuum assembly 800 as detailed hereinbelow.

Returning to FIG. 4, stirrer 230 is attached to tank cover 152 as described supra. Fluid circulating pump 200 is attached to mounting bracket 208 and thus to housing 102 as hereinabove described. Blower 170 is attached to bracket assembly 172, preferably with bolts and passes through housing 102 into duct 160 within reservoir chamber 110 in FIG. 2a.

Figure 4B:
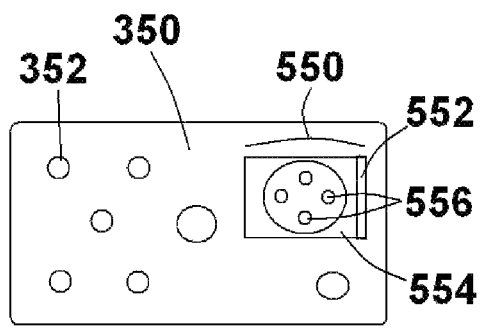
FIG. 4b is a schematic illustration of the perforated plate with bracket.
Figure 4C:
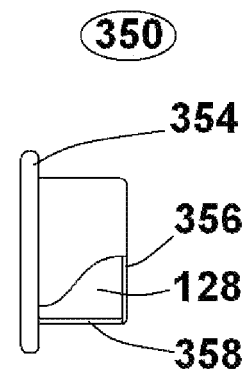
FIG. 4c is a partially cut-away illustration of a side-view of the perforated plate.

A perforated plate 350 through penetrates housing 102 as described hereinabove and is detailed in FIGS. 4b and 4c. In FIG. 4b the surface of perforated plate 350 as visualized in FIG. 4 comprises a plate through which penetrate at least one and preferably a multiplicity of perforations 352 that can be the same, different, and a multiplicity of diametrical dimensions and geometries, preferably round, as necessitated by the communications to and through the perforations. The perforations can be modified for direct through penetration without attachment and/or can be fittingly accommodated, preferentially by threading, to allow removable and/or affixed attachments. Continuing with detail in FIG. 4c, perforated plate 350 is an assemblage of the cover plate 354, flanged walls 358, and backplate 356. The flanged walls 358 are attached to the cover plate 354, preferably by welding, and the backplate overlays insulation 128 comparable to that used in housing 102 with attachment preferably by screws, bolts, and/or rivets. It is to be noted that this same assemblage is used to construct the reservoir chamber access door 112 and fluid filter access door 120 illustrated in FIG. 2.

Attached to the surface of perforated plate 350 is "L"-bracket assembly 550 comprising vertical plate 552 attachedly connected to perforated plate 350, preferably by welding, and face plate 554 through which penetrate at least one and preferably a multiplicity of bulk head fittings 556 that can be vertically and/or horizontally aligned on face plate 554 to accommodate connection of rigid cable 700, FIG. 4 described hereinbelow.

Figure 4D:
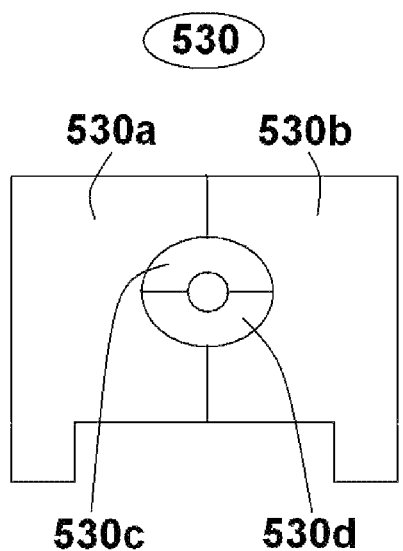
FIG. 4d is a schematic illustration of the insulated assembly.
Figure 4E:
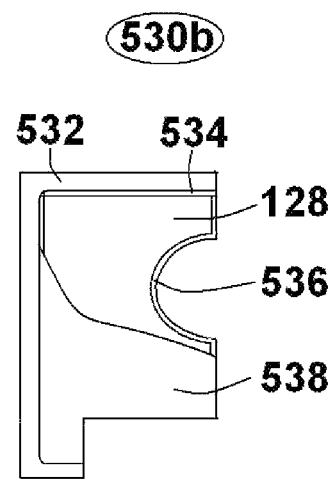
FIG. 4e is a partially cut-away illustration of the backplate view of the insulated assembly.

A similar construction is illustrated for the insulated assembly 530, FIG. 4 and detailed in FIGS. 4d and e, that comprises two approximately minor images 530a and 530b, FIG. 4d, such that they fit cleanly and unconstrictedly above the shaft, not shown, of fluid circulating pump 200. Construction of approximate minor image component 5b as viewed from the backplate 538 comprises a face plate 532, flanged walls 534, semicircular wall 536, and insulation 128. The flanged walls 534 are attached to face plate 532, preferably by welding, and the backplate is attached to flanges on the flanged walls 534, preferably by screws, bolts, and/or rivets The modularity of construction of perforated plate 350 and insulated assembly 530, and thus the approximately minor images 530a and 530b, is of particular note in that it provides an easily manipulatable assembly that readily accommodates the structures passing therethrough without necessitating a multiplicity of separate and individual through penetrations of the housing 102. The perforated plate 350, insulated assembly 530, and thus the approximately minor images 530a and 530b, the reservoir chamber access door 112, and fluid filter access door 120 can be fitted with conventional gaskets and/or equivalent seals as necessitated by the particular component. Preferably, the reservoir chamber access door 112 and fluid filter access door 120 are thusly fitted with conventional gasketing, not shown, circumferentially about the interface with the reservoir chamber 110, FIG. 2.

Returning once again to FIG. 4, touch screen 460 is mounted on pivotal arm 470 that, in turn, is mounted on frame 104. Pivotal arm 470 attaches rotatably and pivotably to a support post with buttressed base 472 attached to baseplate 474 that is attachedly connected to frame 104, preferably by bolting. Pivotal arm 470 also attaches rotatingly and pivotally to a support post 476 to which is rotatably attached touch screen 460.

Also visible in FIG. 4 is pivotable arm 360 and pivotal support arm 366 to which is attached at least one fluid line support 362, manual latches 364, and mix head 900. Further detail is provided in FIG. 4f wherein in one embodiment, mix head 900 is attached to mounting plate 368, preferably by screws and/or bolts that is attached, preferably by welding, to pivotable arm 360. Mounting base 372 is attached to pivotable arm 360, preferably with screws, into which is inserted support pipe 370 that can freely and yet constrictively move within mounting base 372 without being loose-fitting. The upper end of support pipe 370 is threadingly inserted into a coupling, not shown, on the underside of fluid line support 362. Pivotable arm 360 is attached, preferably by welding, to bracket plates 376 which extend across bearing assembly housing 374 in which are contained bearings, not shown, about which the pivotable arm 360 moves freely. Bearing assembly housing 374 is attached, preferably by welding, to pivotal support arm 366 to which is attached a second bearing assembly housing 374. Bracket plates 378 attach, preferably by bolts, to positionable sled 392.

Figure 4F:
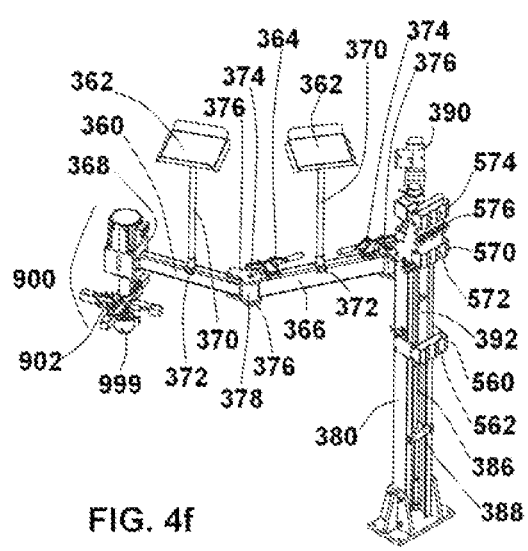
FIG. 4f is a schematic illustration of a pivotable arm assembly with mix head.

The manual latch 364 can be a simple clamp as illustrated in FIG. 4f and can be a ratchet, a rod that can be inserted into a multiplicity of holes in bracket plate 378 and can be a combination of the above. The latching mechanism can further be automated optionally. Once the pivotable arm 360 and/or pivotal support arm 366 are in the requisite position, the latching mechanism is implemented to maintain that position. For purposes of illustration, only the manual latch is 364 is shown and it is understood that equivalent structures as are known to those skilled in the art can be suitably used to achieve the stated purpose.

The support column 380 is attached to buttressed brackets 382, preferably by bolts, which in turn are attached to baseplate 384, preferably by welding. The baseplate 384 is attached to frame 104 preferably by bolts. Within support column 380 is attached a rotatable screw 386 through at least one and preferably a multiplicity of brackets 388. Screw 386 is rotated by motor 390 to move positionable sled 392 vertically along support column 380 and thus ultimately adjusts the position of the mixing head 900. Attached to support column 380, preferably by bolts is rigid cable attachment plate 560 and cable attachment plate 570. The rigid cable attachment plate 560 has a contoured profile 562 into which fit the rigid cables 700, from FIG. 4. A cover plate, not shown, of comparable contoured profile attaches, preferably with screws and/or bolts, over the rigid cables 700 into the rigid cable attachment plate 560 to hold them into position.

Similarly, cable attachment plate 570 has a contoured profile 572 into which fit the rigid cables 700, from FIG. 4, and a cover plate, not shown, of comparable contoured profile attaches, preferably with screws and/or bolts, over the rigid cables 700 into the rigid cable attachment plate 560 to hold them into position. Rigid cable 700 is fittingly attached to bulk head fittings 576. Also attached to bulk head fittings 576 is flexible cable 750, from FIG. 4 that fit into contoured profile 574 and is held in place by a cover plate, not shown, of comparable contoured profile attached, preferably with screws and/or bolts, over the flexible cables 750 into the cable attachment plate 570 to hold them into position.

Figure 4G:
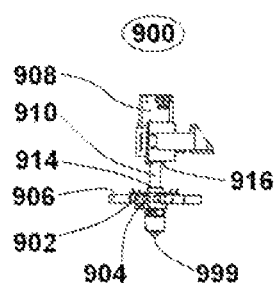
FIG. 4g is a schematic illustration of the mix head.

Returning to FIG. 4, flexible cables 750 pass up and onto fluid line supports 362 and then attach to mix head 900 at one of the multiplicity of inlet valves 902 as detailed in FIG. 4g on arm 906. The flexible cables 750 are not shown for sake of clarity. Also on arm 906 is outlet valve 904 through which the fluid passes to be recirculated back to the reservoir tank 150 as described hereinbelow. Mix head 900 is further comprised of motor 908 attached to a mix shaft, not shown, that passes through shaft housing 910 and into mixing chamber 912.

Figure 4H:
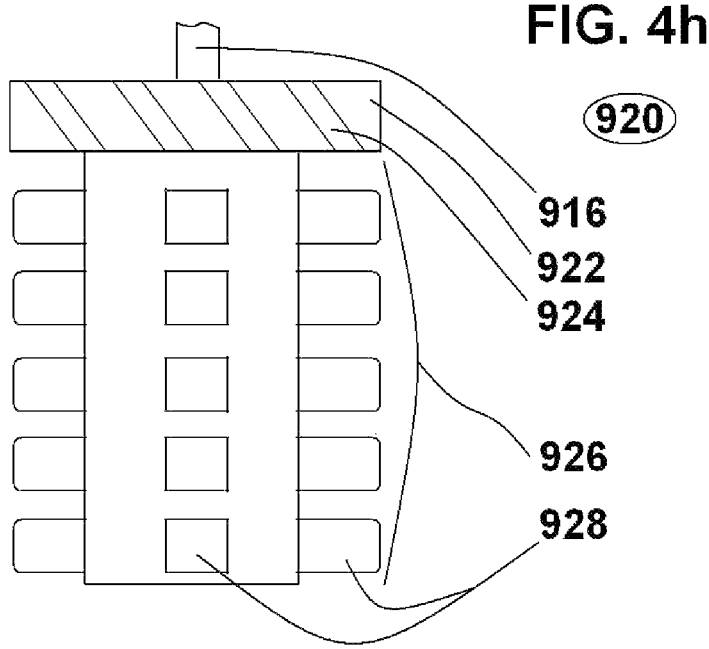
FIG. 4h is a schematic illustration of a cylindrical mixing head.
Figure 4I:
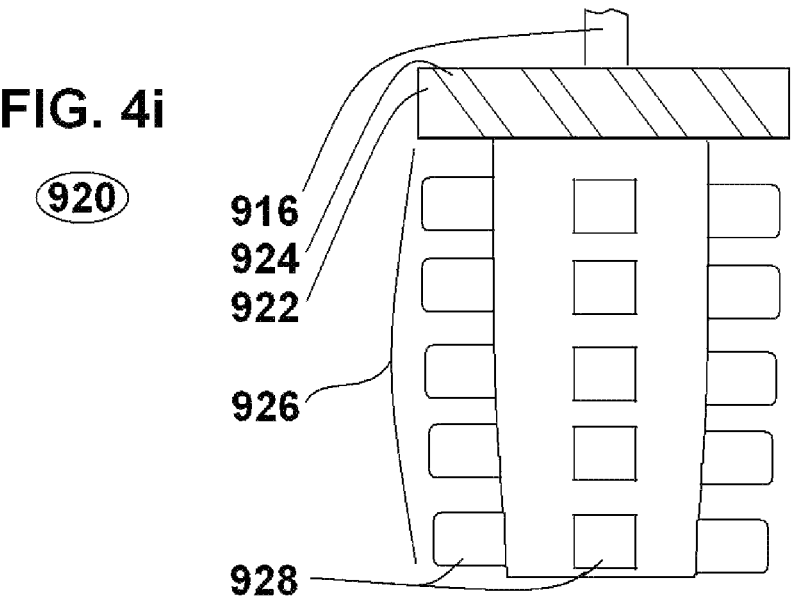
FIG. 4i is a schematic illustration of a tapering cylindrical mixing head.

Turning now to FIGS. 4h and 4i, the mix shaft 916 is attached to mixing head 920 that can be approximately cylindrical, as in FIG. 4h, to approximately taperingly cylindrical, as in FIG. 4i. Mixing head 920 has a feed portion 922 comprising angular fins 924 that rotate in the direction of the incoming fluid to direct it downwardly and into the mixing portion 926. The mixing portion 926 contains a multiplicity of mixing pins 928 that can be arranged in parallel rows circumferentially along the length of the mixing portion as in FIG. 4h or, alternatively, can be arranged spirally and circumferentially as in FIG. 4i. The mixing pins 928 can be of any multiplicity and of many sizes and shapes as is known to those skilled in the art and are preferably approximately square as viewed end-on and illustrated in FIGS. 4h and 4i. Alternatively, the mixing head 920 can be static such that the fluid moves through a fixed convoluted pathway of fins and the equivalent as differs from the preferred dynamic and rotatable agitated pathway illustrated hereinabove. The preferred dynamic and rotatable pathway can vary from rotation rates of zero (0) rpm to approximately 9,000 rpm and preferably rotates from approximately 4,000 rpm to approximately 6,000 rpm. It is to be understood that other configurations and designs as known to those skilled in the art are included herein by way of reference and FIGS. 4h and 4i are included exemplarily without intending to be limited.

Returning to FIG. 4, a flexible braided and preferably stainless steel cable, not shown for sake of clarity, connects the pump 314 of oil circulation pump 310, detailed in FIG. 3, to an inlet port 914, FIG. 4g, at the base of shaft housing 910 and a second return flexible cable 750, not shown as above, attaches to an outlet port 916 for return of the circulating oil to oil circulation pump 310, FIG. 3. The oil passes into and through a mechanical seal, not shown, within the shaft housing 910 to prevent undesirable up-siphoning of fluids feeding into and through mix head 900 into the shaft and motor areas of the mix head 900.

Figure 4J:
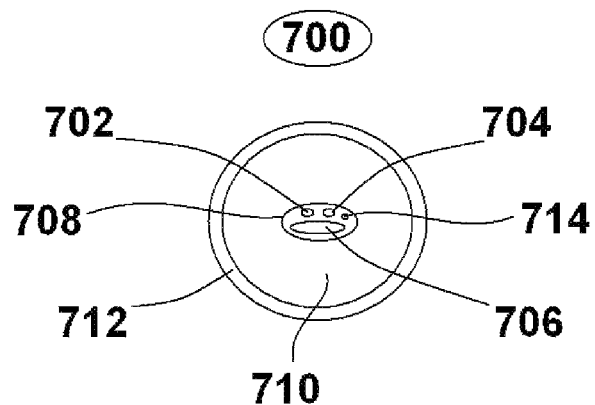
FIG. 4j is a cross-sectional view of a solid cable.

Turning now to FIG. 4j, rigid cable 700 is constructed of supply line 702, return line 704, and at least one heating element 706 that is oriented parallel to the direction of the supply line 702 and return line 704. Heating element 706 can be positioned below the supply line 702 and return line 704 as illustrated and optionally can be placed above singly or above and below in combination as needed to maintain the temperature of the fluid being transported therethrough. Immediately surrounding and effectively bundling the combined heating element 706, supply line 702, and return line 704, is insulating sleeve 708, preferably Teflon® or equivalent. Surrounding the insulating sleeve 708 is an insulation layer 710 that, in turn, is surrounded by rubber sleeve 712. At least one thermocouple 714 is inserted within insulating sleeve 708 adjacent and in contact with at least one of the supply line 702 and/or the return line 704. Preferably, the thermocouple 714 is inserted within insulating sleeve 708 adjacent and in contact with the supply line 702. More preferably, a multiplicity of thermocouples 714 is inserted within insulating sleeve 708 adjacent and in contact with the supply line 702 periodically along the length of rigid cable 700. Optionally a continuous thermocouple 714 can be inserted within insulating sleeve 708 adjacent and in contact with at least one of the supply line 702 and/or the return line 704.

Figure 4K:
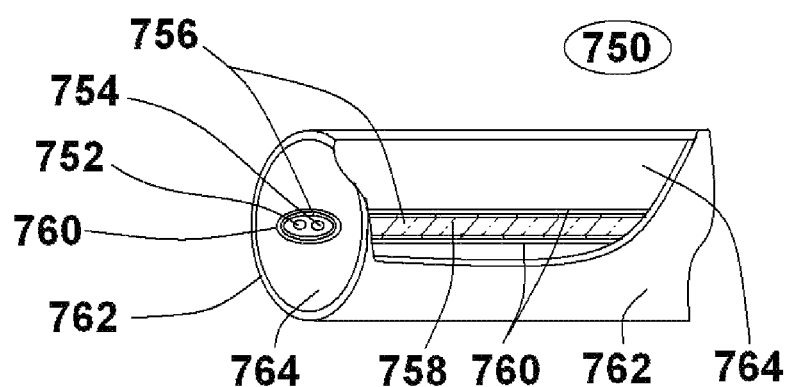
FIG. 4k is a partially cut-away illustration of a flexible cable.

FIG. 4k illustrates flexible cable 750 that comprises a supply line 752 and return line 754 about which is spirally wrapped heating trace 756. A thermocouple 758 is wrapped about the spirally wrapped heating trace 756 partially along the length of flexible cable 750 and preferably continuously along the length of flexible cable 750. Insulating sleeve 760, preferably Teflon® or equivalent, complete surrounds spirally wrapped heating trace 756 and thermocouple 758 along the length of flexible cable 750. The insulating sleeve 760 is wrapped in insulation 764 and this in turn is wrapped with rubber sleeve 762. Alternatively, at least one heating trace can be in contact, above and/or below, with at least one of supply line 752 and/or return line 754 as is equivalent to similarly constructed rigid cable 700. Preferably, the spirally wrapped heating trace is used as hereinabove described.

Figure 5:
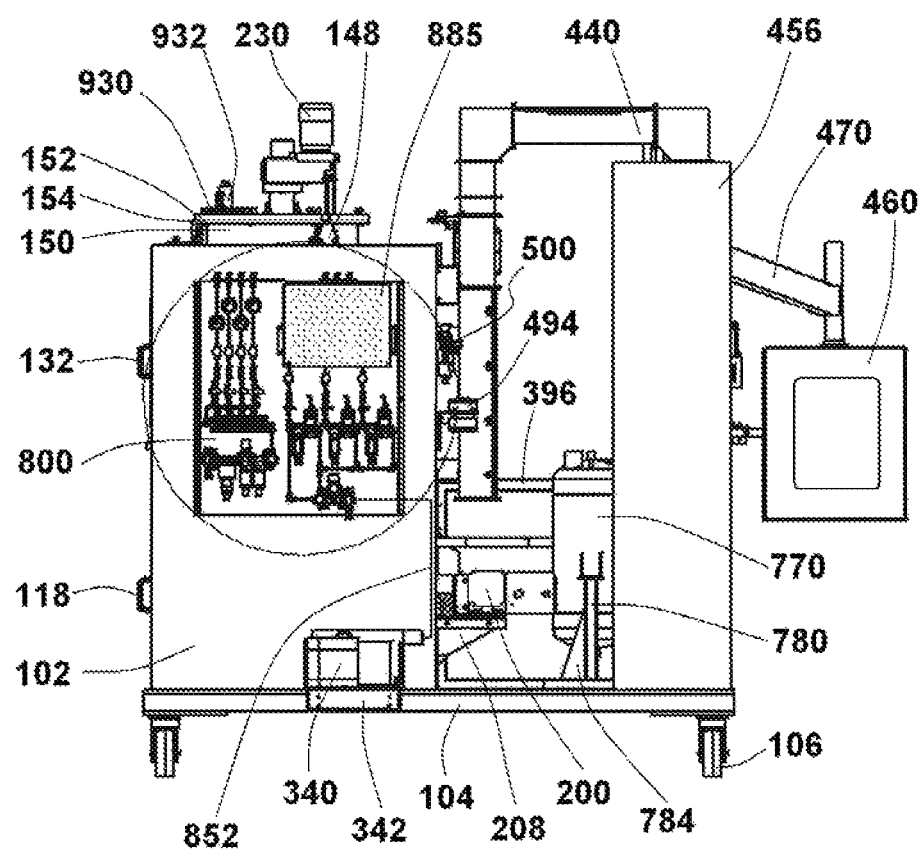
FIG. 5 is a schematic illustration of the end-on view of the feed system section with touch screen, main electrical panel, solvent tank, and inert gas and vacuum assembly.

Turning now to FIG. 5, the end-on view of feeding system section 1 once again reflects a rotation of the unit to the right as viewed. Housing 102 is similarly attached to frame 104 with wheels 106 as described supra. Vacuum pump 340 is attachedly mounted, preferably bolted to bracket 342 and affixed, preferably bolted, to frame 104. Reservoir tank 150 and tank cover 152 are suspended within housing 102 and stirrer 230 is attached to tank cover 152 as before. The handle 118 on reservoir chamber access door 112, not shown, and handle 134 on fluid filter access door 120, not shown, appear as positioned on the access or front view as detailed supra. Load cell 148, preferably a multiplicity thereof, is visible as described hereinabove connected to the top of housing 102 and optionally to the annular flange 154 circumferentially surrounding reservoir tank 150.

Air filter regulator and conditioner 500 and flowmeter remote core 494 are attached to the operational or front view side of housing 102 as heretofore described. Also illustrated are wire trough 440, main electrical panel 456, pivotal arm 470, touch screen 460, backing plate and frame 396, fluid circulating pump 200, and mounting bracket 208 all described supra.

Figure 5A:
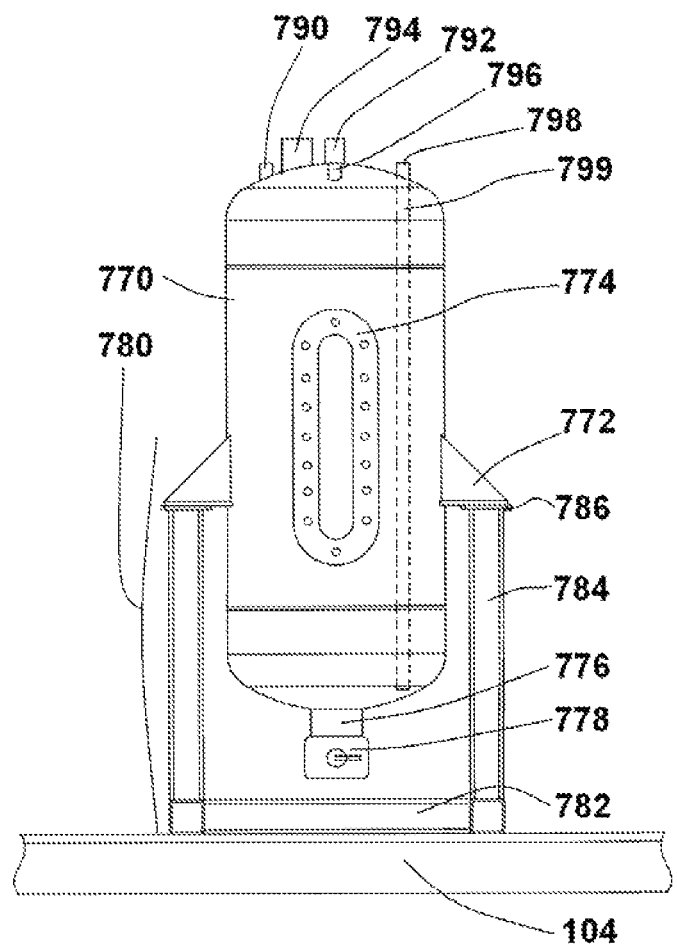
FIG. 5a is a schematic illustration of the solvent tank and bracket.

Solvent tank 770 and support bracket 780 are illustrated in end-on view in FIG. 5 and detailed face-on in FIG. 5a. Support bracket 780 is constructed from a U-shaped base 782 attachedly connected to frame 104, preferably by bolting, to which are attached, preferably weldingly, two buttressed vertical supports 784. Attached, preferably by welding, to the top of the buttressed vertical support 784 is mounting plate 786. Attached, preferably by welding, to each side of solvent tank 770 is angular bracket 772 that, in turn, is attached, preferably by bolts, to mounting plate 786. View port 774 is sealingly attached, preferably bolted with conventional gasketing, to solvent tank 770. Attached to the lowest point of solvent tank 770 is drain 776 and manual valve 778, preferably a ball valve. At the top of the solvent tank 770 is gas inlet 790, pressure relief valve 792, and manual fill port 794. An optional multiplicity of inlets 796 can be attached to the top of solvent tank 700 as well. Fluid outlet 798 is similarly attached to the top of solvent tank 700 and is fitted inside solvent tank 700 with an immersion tube 799 that extends to nearly the bottom of solvent tank 700 as indicated by the dotted lines. Inlets and outlets as hereinabove described are preferably welded to and through-penetrate the top of the solvent tank 700 and most preferably are threaded for attachment of appropriate gas and fluid lines as described hereinbelow.

Figure 5B:
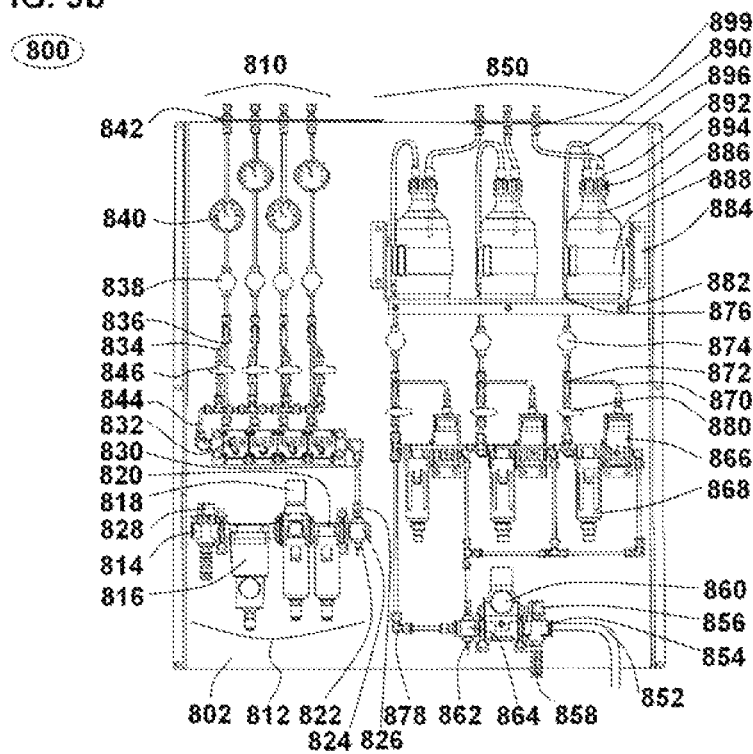
FIG. 5b is an expanded view illustration of the inert gas and vacuum assembly.

The optional inert gas and vacuum assembly 800 in FIG. 5 and detailed in FIG. 5b comprises an inert gas assembly 810 and a vacuum assembly 850 both of which are mounted on backplate 802 which can be made of many metals, including aluminum, steel, tool steel, vanadium steel, hardened steel, carbon steel, stainless steel, nickel steel and the like and is preferably constructed of 304 grade stainless steel or equivalent. Backplate 802 is flanged for attachment to housing 102, preferably by bolting, and to allow the various fittings described hereinbelow to be individually mounted, preferably by bolting.

The inert gas assembly 810 comprises the inert gas filter regulator and conditioner 812, detailed in FIG. 5b, that, in turn, comprises an inert gas inlet 814 into and through an exhaust muffler and filter 816 attached to a filter regulator 818 and accumulator 820 to and through a cross interface 822 to which is attached a pressure switch 824 and through inert gas outlet 826. Inert gas into the inert gas filter regulator and conditioner 812 is controlled by valve 828 and is processed as it flows through the heretofore described assembly and tubing 830 to the inlet of a multiplicity of pressure regulators 832 such that the multiplicity is equivalent to at least the sum of the number of reservoir tanks 150, and optionally the mix head 900 as exemplarily illustrated in FIG. 2, and optionally the tank 402 for catalyst, FIG. 3.

Each of the multiplicity of pressure regulators 832 connects to an equivalent multiplicity of assemblies as herein described following from a single pressure regulator 832 for sake of clarity. Inert gas flows into and through pressure regulator 832 into tubing 834 through "T" 836 into and through valve 838, preferably a needle valve, and through pressure gauge 840 to and through bulkhead fitting 842. Optionally the inert gas can bypass the pressure regulator 832 through tubing 844 to and through valve 846, preferably a ball valve, into "T" 836 and then as described above. The inert gas can be air, nitrogen, argon, carbon dioxide, and the like and is preferably nitrogen.

Turning now to the vacuum assembly 850 in FIG. 5b, vacuum pump 340 (FIG. 5) is attached through vacuum tubing 852 to vacuum inlet 854 and is controlled by the valve 856 on the exhaust muffler filter 858. Attached to exhaust muffler filter 858 is main vacuum regulator 860 and cross interface 862 to which is attached pressure switch 864. The cross interface 862 connects to a multiplicity of vacuum regulators 866 and water separators 868 equivalent to at least the multiplicity of reservoir tanks 150 exemplarily illustrated in FIG. 2. Following a single pathway for sake of clarity, the water separator 868 is connected by vacuum tubing 870, obscured in this view and thus indicated by dotted line, to "T" 872 to and through valve 874, preferably a needle valve, to bulkhead fitting 876. Bypass vacuum line 878 connects to an equivalent multiplicity of valves 880, preferably ball valves and thus to "T" 872 and as above.

Bulkhead 876 through penetrates flanged U-shaped shelf 882 that is attached to housing 102, preferably by bolting. Attached, preferably by bolts, screws, and/or rivets, to the flanges 884 of flanged U-shaped shelf 882 is a U-shaped perforated plate 885 as illustrated in FIG. 5 but removed in FIG. 5b. A multiplicity of vapor/liquid trap bottles 886 equivalent to the number of reservoir tanks 150 exemplarily in FIG. 2 are positioned on the flanged U-shaped shelf 882 and held in place by belt clamp 888. Flexible tubing 890 attaches to bulkhead 876 and to compression fitting 892 on bottle cap 894. Flexible tubing 896 through-penetrates compression fitting 892 on bottle cap 894, into vapor/liquid trap bottle as well as passes through a cover plate on the top of and attached, preferably by screws, bolts, and/or rivets, to the U-shaped perforated plate, not shown, ultimately connecting to bulkhead fitting 899. An equivalent multiplicity of assemblages as herein described are similarly connected wherein only one is described exemplarily for the sake of clarity. The flexible tubing can be of many plastics and metal materials, and preferably is polyolefinic. Most preferably the flexible tubing 890 and 896 is polypropylene.

Figure 6:
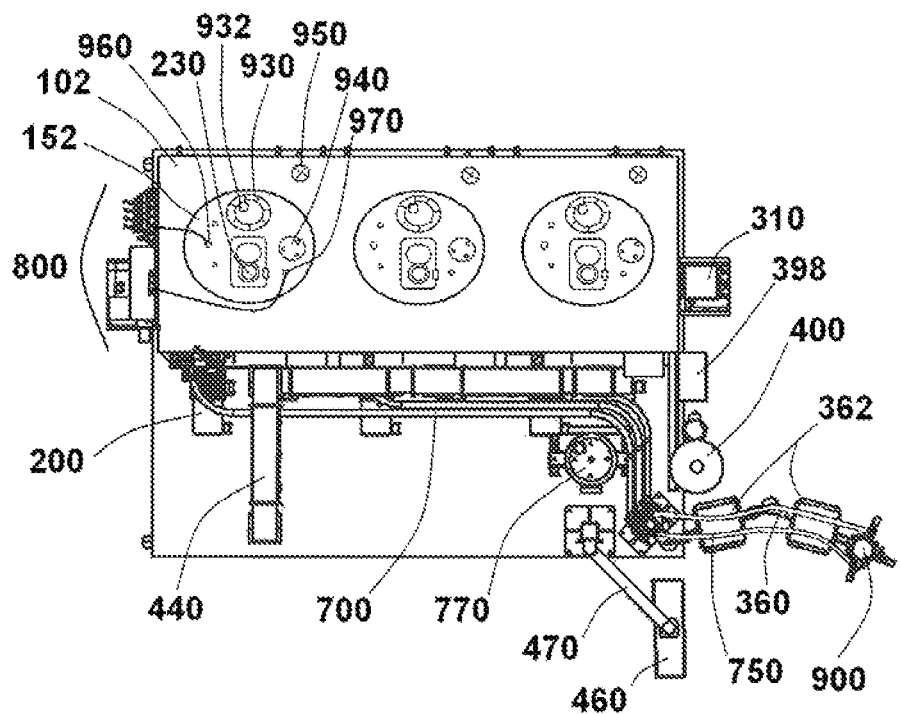
FIG. 6 is a schematic top view illustration of the filling system section.

Turning now to FIG. 6, this top view includes the tank cover 152, housing 102, the inert gas and vacuum assembly 800, wire trough 440, solvent tank 770, solid cables 700, touch screen 460 mounted on pivotal arm 470, flexible cables 750, mix head 900 on pivotable arm 360, fluid line supports 362, fluid circulating pump 200, catalyst system 400, power supply 398, and oil circulation pump 310 all described herein above. Supply port 950 is attached to and through housing 102. View port 930 and viewing light 932, also in FIG. 5, optional port 940, and stirrer 230 are attached to tank cover 152, preferably by bolting. Vacuum port 970 and inert gas port 960 are attachedly connected to and through tank cover 152 as well.

Figure 6A:
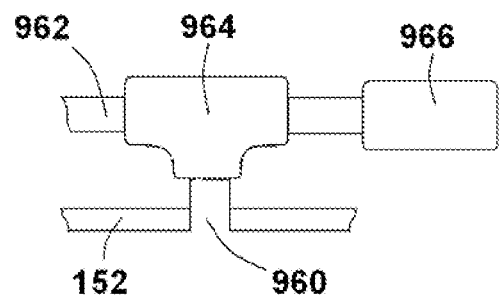
FIG. 6a is a schematic view of the attachments to the inert gas port on the tank cover.
Figure 6B:
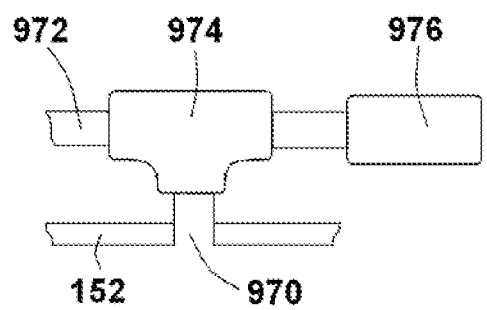
FIG. 6b is a schematic view of the attachments to the vacuum port on the tank cover.

In FIG. 6a inert gas tubing 962 connects with bulkhead 842, FIG. 5b, and "T" 964 that is directly attached to inert gas port 960 and pressure relief valve 966. Similarly, in FIG. 6b vacuum tubing 972 connects with bulkhead 899, FIG. 5b, and "T" 974 that is directly attached to vacuum port 970. At least one inert gas port 960 and one vacuum port 970 is illustrated herein by way of example without intending to be limited and it is to be understood that a multiplicity of inlet ports can be added optionally to and through tank cover 152 as necessitated by the process.

Figure 7:
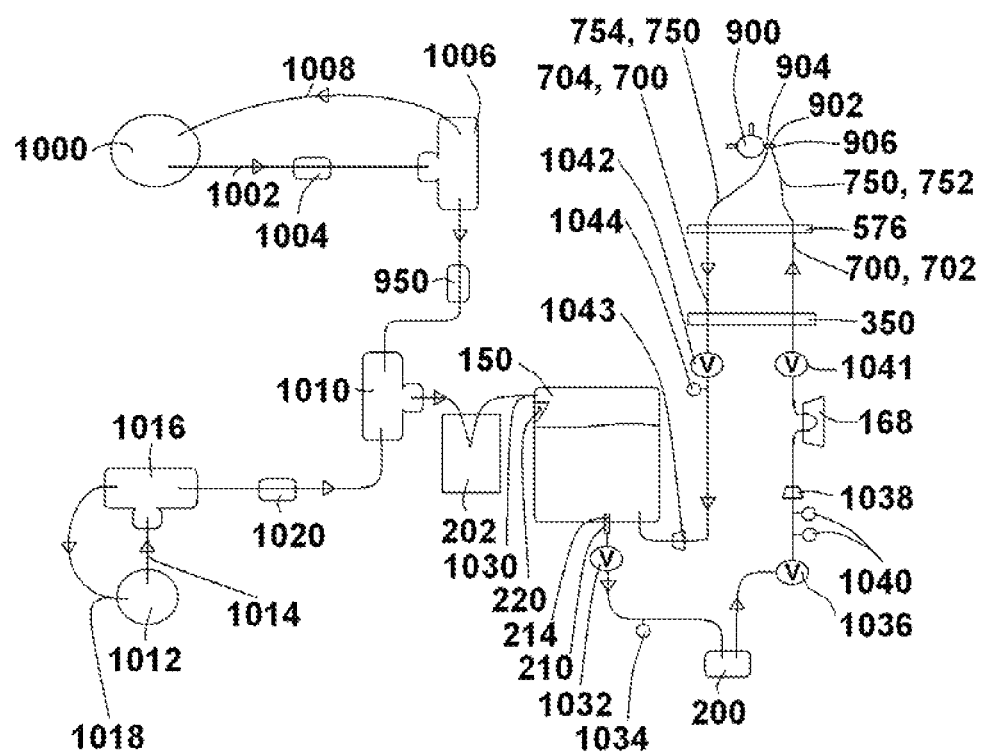
FIG. 7 is a flow chart of the fluid pathway through the filling system.

Now summarizing the flow of the fluids, FIG. 7, through the filling system and using one fluid as an example, fluid retained in a supply tank 1000 is transported through supply line 1002 by pump 1004 into three-way valve 1006 wherein the fluid can be returned to supply tank 1000 via return line 1008 or can be directed to and through supply port 950, FIG. 6 on top of housing 102. The fluid is transported into and through "T" 1010 into and through fluid filter 202, FIG. 2, through side port 1030, FIG. 2a, into reservoir tank 150. Alternatively, fluid can be transferred, preferably by pumping, from a satellite tank 1012, preferably a drum, through supply line 1014 into three-way valve 1016 wherein the fluid can be recirculated to satellite tank 1012 through return line 1018 or can be transported to and through refill port 1020, FIG. 2, into "T" 1010 to and through fluid filter 202 and forwardly as described hereinabove.

Fluid enters the reservoir tank 150 and flows down through perforated angular fluid regulating device 220 that tapers decreasingly in the direction of the bottom of reservoir tank 150. The perforations are positioned so as to allow excess fluid to drain out of the perforated angular fluid regulating device 220. The angularity is designed to allow some build-up of incoming fluid while directing the flow of that fluid taperingly into a fluid film along the wall of reservoir tank 150. Fluid level is maintained in the tank by alternation of inert gas pressure and/or vacuum through inert gas port 960, FIGS. 6 and 6a, and vacuum port 970, FIGS. 6 and 6b in combination with at least one and preferably a multiplicity of load cells 148, FIGS. 2, 2a, 3, and 5.

The fluid temperature is maintained by circulation of heated air in FIG. 2a wherein blower 170 draws air from the reservoir chamber 110 into and through duct 160 containing a multiplicity of resistance heating elements 190 into circumferential duct 162 through a multiplicity of baffles 180 and circumferential shroud 169 and back out into reservoir chamber 110. Fluid temperature is monitored by a multiplicity of thermocouples, not shown, in reservoir tank 150.

Following FIGS. 2a and 7, the thermally regulated fluid in reservoir tank 150 is transported out of the tank through optional standpipe 214 and fluid outlet 210 through valve 1032, preferably a ball valve to fluid circulating pump 200. The fluid flow is optionally monitored by pressure transducer 1034. Fluid circulating pump 200 contains seals that can be mechanical seals, fluid seals, and preferably are magnetic drive seals, most preferably being fluid purged magnetic drive seals wherein the fluid purge utilizes the fluid being pumped through the system.

The fluid is pumped through valve 1036 into and through adapter 1038 while monitoring pressure by at least one pressure transducer 1040. Fluid is transported from adapter 1038 into and through flowmeter 168, preferably a mass flowmeter, into and through valve 1041 to and through perforated plate 350, FIG. 4. Fluid is transported by the supply line 702 of rigid cable 700, FIG. 4j, to bulkhead fittings 576, FIG. 4f, and into supply line 752, FIG. 4k, of flexible cable 750, FIG. 4, to inlet valve 902 on arm 906 of mix head 900, FIG. 4g. The fluid is discharge into and through mix head 900 and outlet 999 for downstream processing as described hereinbelow or, alternatively, is recirculated through outlet valve 904, FIG. 4g, into the return line 754, FIG. 4k, of flexible cable 750, FIG. 4, through bulk head fittings 576, FIG. 4f, into the return line 704, FIG. 4j, of rigid cable 700, FIG. 4. It passes through perforated plate 350 into reservoir chamber 110 through valve 1042 into and through adapter 1043 while monitoring pressure by pressure transducer 1044. The fluid re-enters reservoir tank 150 through return fluid inlet 212, FIG. 2a. While the fluid is being transported through rigid cable 700 the temperature is being maintained by heating element 706, FIG. 4j, and monitored by at least one and preferably a multiplicity of thermocouples 714. Similarly, fluid temperature is maintained during transport in flexible cable 750 by spirally wrapped heating trace 756 and monitored by spirally wrapped thermocouple 758, FIG. 4k.

Solvent from solvent tank 770, FIGS. 5 and 5a, is transported through a flexible cable 750, not shown, to an inlet 902 in mix head 900 to rinse residual fluids from the components thereof the details of which follow from that hereinabove. The solvent is pressurized by inert gas from bulk head fittings 842, FIG. 5b. Transport to and return from the mix head follow that described supra and have not been presented here. Catalyst fluid from catalyst tank 402, FIG. 3, is pumped directly into the orifice of the mixing apparatus as will be described hereinbelow.

As shown in FIG. 1, the feeding system section 1 connects to the mixing system section 2. The material, comprising a mixture, dispersion, or a solution and preferably a solution, produced by mix head 900, FIG. 4, preferably freely flows from outlet 999 into a mixing unit as detailed in FIGS. 8a to 8f. This mixing system section 2 can including one or more of a mixing, melting, reaction, and/or blending section or sections 2 (shown as 2a to 2c, 2e, and 2f in respective FIGS. 8a, 8b, 8c, 8e, and 8f). The mixing system section 2 of the present invention includes dynamic 2a, extrusional 2b, and/or static 2c mixing components that can be used individually or as a plurality of two or more of these component types interconnectedly attached in series, in tandem, and/or in parallel. The material from outlet 999, FIG. 4, passes through inlet 1114a, 1114b, or 1114e in FIGS. 8a or 8e, 8b or 8f, and 8c respectively.

The inlet can be modified optionally by addition of a flanged shroud 1045 as illustrated in FIGS. 9a and 9b that can be of many shapes to uniformly contour to the shape of the inlet 1114a, 1114b, or 1114e, FIGS. 8a, 8b, 8c, 8e, and 8f, optionally flanged, and illustrated exemplarily as a rectangle without intending to be limited. Shroud 1045 comprises a baseplate 1046, optionally forming a flange, attached, preferably by welding, to wall 1047 and optional cover plate 1048 with optional inlet 1049 wherein inlet 1049 can be round, square, rectangular, oval, polygonal, and the like without limitation. The dimension of inlet 1049 accommodates outlet 999, FIG. 4, without size constraint. Attached to and penetrating through at least one wall 1044 is fitting 1050 to which is attached inlet 1052 and outlet 1054 that is preferably angled downwardly. Outlet 1054 can be tubular, slotted, and/or fan shape. Shroud 1045 is attachedly connected to an optionally flanged inlet 1114a, 1114b, or 1114e, FIGS. 8a, 8b, 8c, 8e, and 8f, preferably by bolts and/or screws.

Alternatively, the inlet can be modified optionally by addition of a flanged overflow shroud 1060 as illustrated in FIGS. 9c and 9d that can be of many shapes to uniformly contour to the shape of the inlet 1114a, 1114b, or 1114e, FIGS. 8a, 8b, 8c, 8e, and 8f, optionally flanged, and illustrated exemplarily as a rectangle without intending to be limited. Overflow shroud 1060 comprises a baseplate 1062, optionally forming a flange, attached, preferably by welding, to wall 1064 and optional cover plate 1066 with optional inlet 1068 wherein inlet 1068 can be round, square, rectangular, oval, polygonal, and the like without limitation. The dimension of inlet 1068 accommodates outlet 999, FIG. 4, without size constraint. Attached to and penetrating through at least one wall 1064 is fitting 1070 to which is attached inlet 1072 and outlet 1074 that is preferably angled downwardly. Outlet 1074 can be tubular, slotted, and/or fan shape. Overflow shroud 1060 is attachedly connected to an optionally flanged inlet 1114a, 1114b, or 1114e, FIG. 8, preferably by bolts and/or screws. Wherein wall 1064 is rectangular or square as illustrated in FIGS. 9c and 9d, it comprises a back wall 1082, side walls 1080, front walls 1084, and optionally tapered overflow walls 1086 attached together, preferably by welding, to form overflow outlet 1088. The overflow shroud 1060 can have an overflow outlet 1088 at the same or lower elevation than the level of inlet 1114a, 1114b, or 1114e, FIGS. 8a, 8b, 8c, 8e, and 8f, as accommodated by the particular apparatus to which it is attached. Alternatively, overflow shroud 1060 can be angled downwardly is indicated by the dotted line configuration in FIG. 9d. The downward angle can be from 0° to 45° or greater and is preferably from approximately 20° to approximately 30°. The angle can be for all of the length of the tapered overflow wall 1086 or for any portion of the length wherein the maximum length of the angled portion cannot include the necessary clearance past any equipment on which overflow shroud 1060 is attachedly connected.

Conventional surface treatments to reduce abrasion, erosion, corrosion, wear, and undesirable adhesion and sticture can be applied to the inner surface of flanged overflow shroud 1060 that can include at least one of nitriding, carbonitriding, and sintering, and/or can undergo high velocity air and fuel modified thermal treatments, and can be electrolytically plated. Other surface treatments for improvement of surface properties, enhancement of corrosion and abrasion resistance, improvement of wear, and/or reduction of clumping, agglomeration, and/or sticture can be used without intending to be limited.

The materials from outlet 999, FIG. 4, as well as optional catalyst delivered from the catalyst system 400, FIG. 3, can be introduced at atmospheric conditions or pressurized, purged with air or an inert gas such as, but not limited to, argon or nitrogen preferentially, or can be subjected to a vacuum or partial vacuum to expedite flow into mixing system section 2. The inert gas or vacuum passes into shroud 1045, FIGS. 9a and 9b, to and through inlet 1052 and passes out through outlet 1054. Similarly, the inert gas or vacuum passes into overflow shroud 1060, FIGS. 9c and 9d, to and through inlet 1072 and passes out through outlet 1074.

Figure 8A:
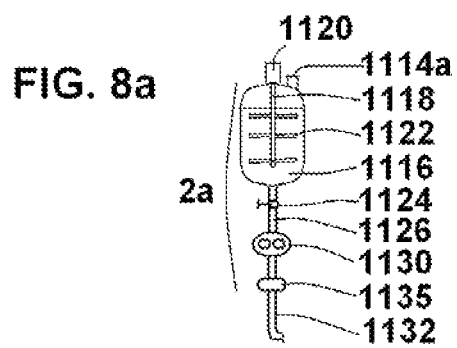
FIG. 8a is a schematic illustration of a mixing vessel, medium pressure pump, and coarse screen changer.

The mix head outlet 999, FIG. 4, delivers material to the dynamic section 2a, FIG. 8a, at inlet 1114a for the thermally controlled mixing vessel 1116. The vessel chamber can be subatmospheric as modified by vacuum, atmospheric or purged with air or inert gas, for example argon or preferably nitrogen. Components can be added continuously or portionwise with warming to temperature as required by a particular process. Mixing is achieved by rotation of the rotor 1118 controlled by motor 1120. Attached to rotor 1118 are mixing blades 1122 exemplary of which can be propeller or boat style, ploughshare style, delta or sigma style in single, double, or multiple configurations, and helical or helical dispersion blades. Alternatively, the vessel can be a kneader, Buss kneader, or Farrel internal mixer or it can be a ribbon blender, Banbury-type blender, horizontal mixer, vertical mixer, planetary mixer or equivalent devices known to those skilled in the art.

On reaching the appropriate pour point, valve 1124 is opened and the fluid or molten material passes into and through pipe 1126 and is drawn into booster pump 1130. The booster pump 1130 can be, for example, a centrifugal pump or a positive displacement reciprocating or rotary pump. Preferably, the booster pump 1130 is rotary and can be a peristaltic, vane, screw, lobe, progressive cavity, or more preferably, a gear pump. The gear pump can be high precision or preferably is open clearance and generates an intermediate pressure, typically up to approximately 33 bar, and preferably less than approximately 10 bar. The pump pressure can vary, and need be sufficient to force the melt through coarse filter 1135 that can be a candle filter, basket filter, or screen changer, and is more preferably a basket filter of 20 mesh or coarser. The coarse filter 1135 removes larger particles, agglomerates, or granular material from the melt as it flows to and through pipe 1132. The dotted line 1140a indicates the connection to optional diverter valve 1300 or, alternatively, to melt pump 1180.

Figure 8B:
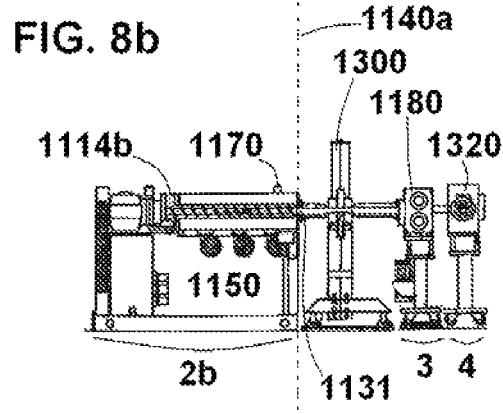
FIG. 8b is a schematic illustration of an extruder, diverter valve, gear pump, and screen changer.

Alternatively, the mix head outlet 999, FIG. 4, delivers material to the extrusional mixing section 2b, FIG. 8b at inlet 1114b to an extruder 1150 that optionally can be, but is not limited to, a single screw, twin screw, multiple screw or ring extruder, or a ram extruder and is preferably a single screw, and more preferably is a twin screw extruder. The sections or zones of the screw should feed, mix, and convey the material simultaneously providing sufficient energy, thermal and mechanical, to melt, mix, and/or uniformly disperse and distribute the material or materials for the pelletization to follow. The extruder 1150, preferably the twin screw extruder, optionally can be purged with air or an inert gas, of which nitrogen or argon are preferential but not limiting, and additionally can have one or more vent ports 1170 some or all of which can be fitted with one or more vacuum attachments or other exhaust mechanism or mechanisms as is understood by those skilled in the art. Vent ports or appropriate exhaust mechanisms facilitate removal of gases, unwanted volatiles such as residual monomer or byproducts, and/or impurities. Venting should be used with caution and positionally placed such that any volatile components essential to the formulation are not lost or compromised after introduction to the mixing process. The configuration of the screw should be satisfactory to achieve an appropriate level of feeding, mixing dispersively and/or distributively, melting, blending, and throughput rate determined by the formulation and processing requirements. The extruder 1150 is attachedly connected to optional diverter valve 1300 or, alternatively, and optionally to melt pump 1180 as shown in FIG. 8b at the locus similarly identified by the dotted line 1140a for dynamic mixing section 2a illustrated in FIG. 8a.

Figure 8D:
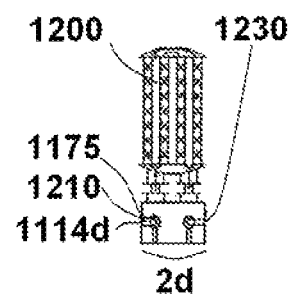
FIG. 8d is a schematic illustration of a vertically configured static mixer with attached bypass diverter valve.
Figure 8C:
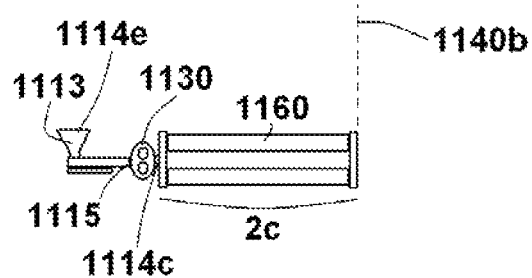
FIG. 8c is a schematic illustration of a feed screw, gear pump, and static mixer assembly.

Analogously, the mix head outlet 999, FIG. 4, delivers material to inlet 1114e of feed screw 1113 and thus can be connected via feed screw outlet 1115 to inlet 1114c in the static mixing section 2c in FIG. 8c and/or to inlet 1114d in the bypass static mixing section 2d in FIG. 8d. Process operations can dictate the use of a booster pump 1130 and/or a melt pump 1180 to facilitate transfer and pressurization of the material flow into the static mixer 1160. Static mixer 1160 is connected to optional diverter valve 1300 or, alternatively, and optionally to melt pump 1180 positionally as indicated by dotted line 1140b in FIG. 8c.

Mixing sections can be used alone or in combination where dynamic, extrusional, and/or static mixing as described herein are connected in series and/or in parallel. Exemplary of this is dynamic mixing section 2a attached directly to static mixing section 2c at inlet 1114c or extrusional mixing section 2b attached directly to static mixing section 2c at inlet 1114c or, alternatively, to static mixing section 2c at inlet 1114d of bypass static mixer 1200 as detailed below. Extrusional mixing section 2b alternatively, can be attached to another extrusional mixing section in series and/or in parallel of similar or different design type or configuration. Temperatures and process parameters can be the same or different in the various mixing sections and mixing units can be attached in combinations greater than two serially or otherwise.

The conventional limitations of FIGS. 8a, 8b, and 8c alone or serially in combination as heretofore described remain problematic in that cooling, should it be necessary and though present in these components, does not have a level of control and narrowness of definition of degree in temperature to acceptably be able to produce high quality pellets of low melting point and/or of narrow melting range materials. Secondarily, the mixing sections as described above are limited in their capacity to achieve efficient and uniform dispersive mixing and are further limited in their ability to reduce or eliminate phase separation of blended materials including reactive components, pastes, formulations, dispersions, and solutions, by way of example. Furthermore, non-polymeric materials and materials of minimal or no shear sensitivity defined herein as materials that change viscosity with change in temperature but do not exhibit a change or only a very small change in viscosity by introduction of shear, for example, necessitate high control of thermal energy, frictional generation of heat, and mechanical energy, where applicable, thus requiring heating and/or cooling to effect a processable melt, defined herein as a material capable of being melted, extruded and pelletized, without leading to undesirable degradation. For these materials the temperature transition from fluid to more viscous semi-solid or solid is typically narrow and can be low relative to ambient temperature, and control of this is extremely limited in mixing sections heretofore described. Additionally, for reaction processes including reactive polymerization processes, variation in and rigorous control of temperature and time are critically important to assure proper activation of catalyst where used, completion to the desired degree of reaction, and thus molecular weight for polymers, and completion of the desired reaction or reactions as well as to prevent potential degradation and/or undesirable cross-reaction.

Figure 8E:
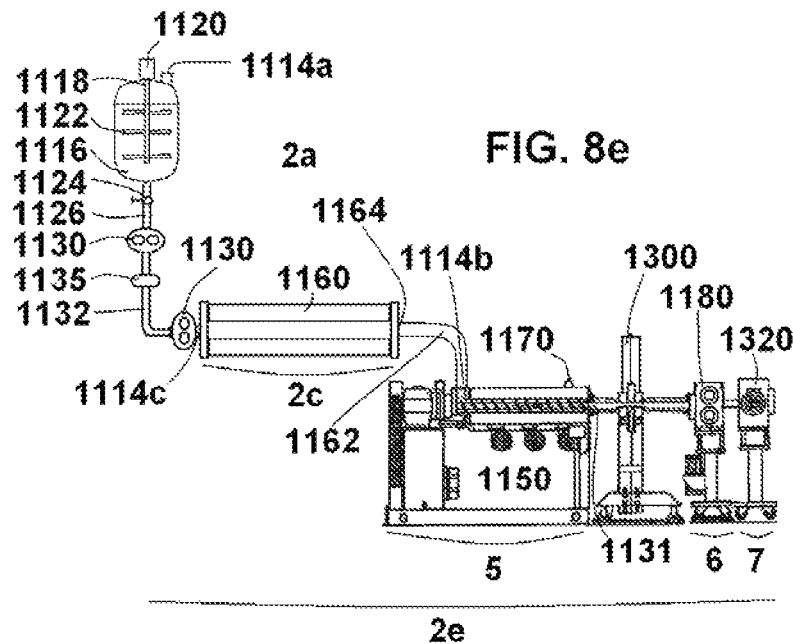
FIG. 8e is a schematic illustration of a mixing vessel, medium pressure pump, coarse screen changer, gear pump, static mixer, extruder, diverter valve, gear pump, and screen changer is series.

In consideration of these challenges, FIG. 8e illustrates an alternative process in which the dynamic mixing section 2a (FIG. 8a) is fixedly attached to booster pump 1130 affixed to inlet 1114c of static mixer 1160. An insulated conveyance pipe 1162 is connectedly attached to static mixer outlet 1164 and inlet 1114b of extruder 1150, preferably serving as a cooling or finishing extruder. The screw configuration of extruder 1150 can provide rigorous mixing and propagation of the melt to and through the zones or sections of the extruder distal from the inlet 1114b. One or more side feeders 1110 illustrated without attachment to extruder 1150 can be variably positioned at inlets along the extrusion zones as needed for a particular process.

Alternatively, FIG. 8f includes an extrusional mixing section comparable to 2b, previously described for FIG. 8b, fixedly and optionally attached diverter valve 1300, melt pump 1180, and screen changer 1320, and described hereinbelow. Static mixer 1160 is attached thereto at inlet 1114b and connectedly attached at static mixer outlet 1164 to conveyance pipe 1162 subsequently attached to extruder 1150, described hereinabove, at inlet 1114b.

For vessel mixing, FIG. 8a, volatile components are added at inlet 1114a or preferably at inlet position 1175 proximal to inlet 1114d, FIG. 8d. Where vessel mixing is attached serially to static mixing (not shown in FIGS. 8a to 8f), addition of the any volatiles is preferably performed at the inlet of the static mixer as is exemplified by a modification of inlet 1114c for static mixer 1160, FIG. 8c, as is understood by one skilled in the art. For extrusional mixing, volatile components are added at inlet 1114b and preferably at an inlet positionally near the end of the extruder 1150 as indicated by inlet position 1170, FIG. 8b, or, alternatively, at inlet position 1175 proximal to inlet 1114d, FIG. 8d. For extrusional mixing serially attached to static mixing prior to gear pump 1180 (not shown in FIGS. 8a to 8f), addition of volatile components can be accomplished at the inlet of the static mixer as is exemplified by a modification of inlet 1114c for static mixer 1160, FIG. 8c, as previously described for serial vessel and static mixing. For static mixing, introduction of volatiles can be done at inlet 1114c in FIG. 8c or for volatiles at inlet position 1175 proximal to inlet 1114d in FIG. 8d.

The use of melt pump 1180 and/or filter 1320 is strongly and optionally dependent on the containment of volatile ingredients in the formulation. Pressures can be sufficient from extrusional mixing 2b to forego use of melt pump 1180, whereas use of static and/or dynamic mixing, 2c or 2a respectively, can require facilitation of pressurization to insure progress through and egress of the material or formulation from the apparatus. The filter 1320 provides a safety mechanism, where employed, to insure oversize particles, lumps, amorphous masses, or agglomerates are not propagated to the static mixer 1160, FIG. 8f, or downstream pelletization section 8, following FIG. 1 and detailed hereinbelow. Alternatively, introduction of volatile components can be performed at inlet position 1175 proximal to inlet 1114d in FIG. 8d as previously delineated. Where additional pressurization and/or screening are a requisite process component, introduction via inlet position 1175 proximal to inlet 1114d is a preferred approach.

Various levels of mixing and shear, when applicable, are achieved by the differing styles of mixing processes. Static mixing typically has the least shear and relies more on thermal energy. Dynamic mixing depends to a large degree on blade design and mixer design. Extrusional mixing varies with type of screw, number of screws, and the screw profile and is quite capable of significant generation of shear energy. Therefore, energy is introduced into the mixing process in terms of one or both of shear and mechanical energy, where applicable, and thermal energy with additional heating being generated by frictional forces of the material as it is propagated through the mixing devices as well as by exotherms releasing heat as a consequence of reaction or reactive polymerization. Additionally, energy can be consumed by endothermic reaction or reactive polymerization processes resulting in a reduction of thermal energy and thus temperature. Heating and/or cooling of the units can be achieved, for example, electrically, by steam, or by circulation of thermally controlled liquids such as oil or water. Mixing continues until the material or formulation reaches, for example, an appropriate temperature, molecular weight, degree of reaction completion, or other criterion of consistency or viscosity as determined or known specifically for the process by those appropriately skilled in the art.

Returning to FIG. 1 and using FIG. 8f as a reference for clarification, the mixing system section 2 is represented by first extruder 1150, subsequently pressurized in section 3 by melt pump 1180 for filtration in section 4 through filter 1320. The filtered material can optionally pass to and through a second mixing process, section 5, represented by a combination of the static mixer 1160 followed by extruder 1150, with additional pressurization, section 6, by melt pump 1180 and filtration, section 7, by filter 1320. As indicated in FIG. 1, material from the first pressurization 4 can go directly to the pelletization section 8 or can undergo a second mixing section followed by pressurization and filtration prior to transport to the pelletization section 8.

Figure 10:
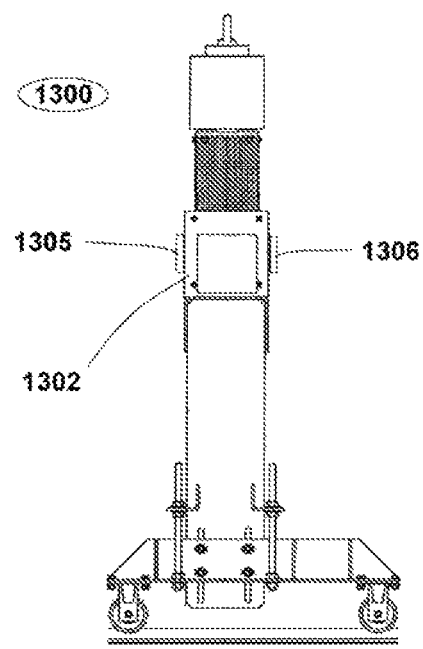
FIG. 10 is a schematic illustration of a diverter valve.

Referring again to FIGS. 8a to 8f, on exit from the mixing stage 2a, 2b, 2c, 2d, 2e, 2f, or any combination thereof, as well as following the first extrusive mixing state in 2f, the molten or fluidized material optionally passes to and through optional diverter valve 1300, FIG. 10. The component or components of the mixing section 2 are optionally attachedly connected to the diverter valve 1300 as indicated in FIG. 8d where the outlet 1230 of the bypass static mixer 1200 is attached to inlet 1305 of diverter valve 1300, FIG. 10. Alternatively, in FIGS. 8b, 8e, and 8f, outlet 1131 of extruder 1150 is attached to inlet 1305 diverter valve 1300. FIG. 10 illustrates inlet 1305 and outlet 1306 attached to housing 1302 of diverter valve 1300. The movable diverter bolt, not illustrated, can be actuated electromechanically, hydraulically, pneumatically and many combinations thereof.

Referring again to FIGS. 8a to 8f, on exit from the diverter valve 1300 through outlet 1306, FIG. 10, molten or fluidized material optionally passes to and through optional melt pump 1180 that generates additional pressure on the melt, preferably at least approximately 10 bar and more preferably between approximately 20 to approximately 250 bar or more. Pressures required are dependent on the material being processed and are significantly affected by the pelletization process (section 8 of FIG. 1) that follows mixing as well as on the throughput rate or flow rate of the process. Melt pump 1180 can be a centrifugal or positive displacement reciprocating or rotary pump, and preferably is a rotary pump that can be a peristaltic, vane, screw, lobe, progressive cavity, or gear pump, and more preferably is a gear pump. Seals should be compatible with the material being processed, chemically and mechanically, the details of which are well understood by those skilled in the art.

Figure 8F:
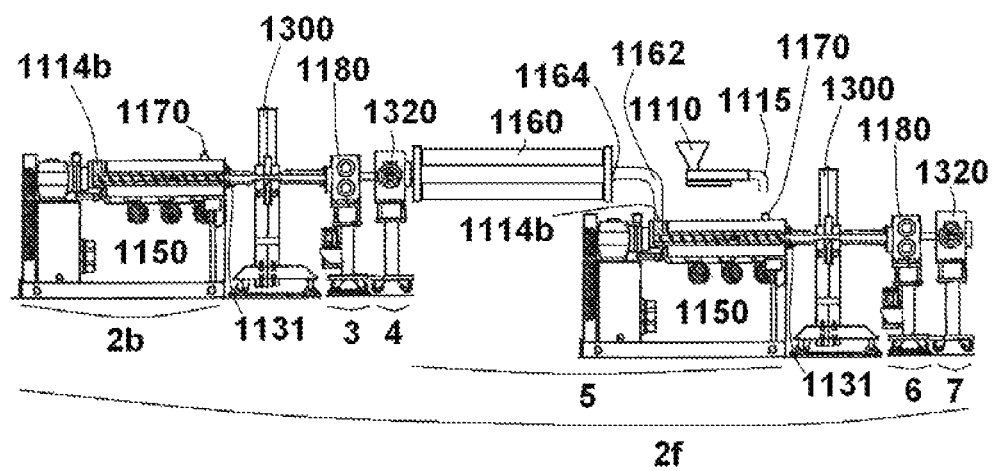
FIG. 8f is a schematic illustration of a feeder, an extruder, diverter valve, gear pump, screen changer, static mixer, extruder, diverter valve, gear pump, and screen changer is series.

The pressurized melt passes through an optional filter 1320, FIGS. 8b and 8e, and at least one optional filter 1320 in FIG. 8f, that can be a basket filter, a candle filter, or a screen changer, wherein the screen changer preferably is of 320 mesh or coarser, and more preferably is a multilayer screen changer of two or more screens of differing mesh, and still more preferably is a series of filters exemplary of which is 20 mesh, 40 mesh, and 80 mesh. The screen changer can be manual, plate, slide plate, rotary plate, belt, band, single or dual bolt, and can be continuous or discontinuous.

Figure 11:
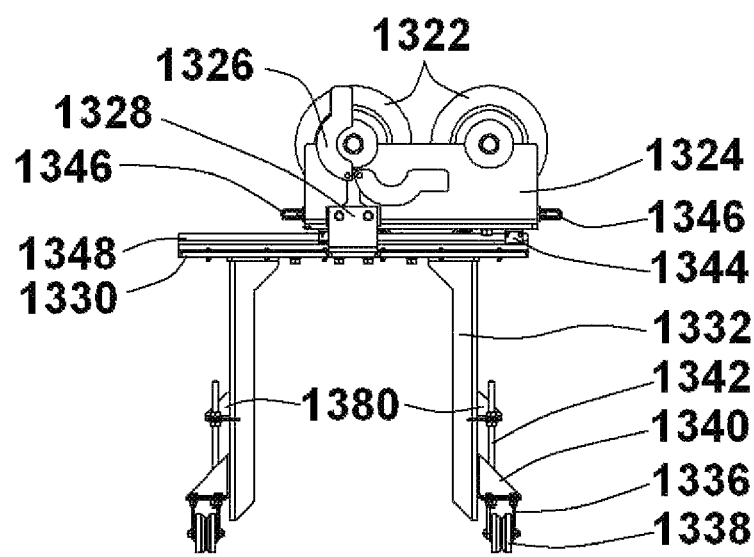
FIG. 11 is an end-on schematic illustration of a manually exchangeable filter.
Figure 12:
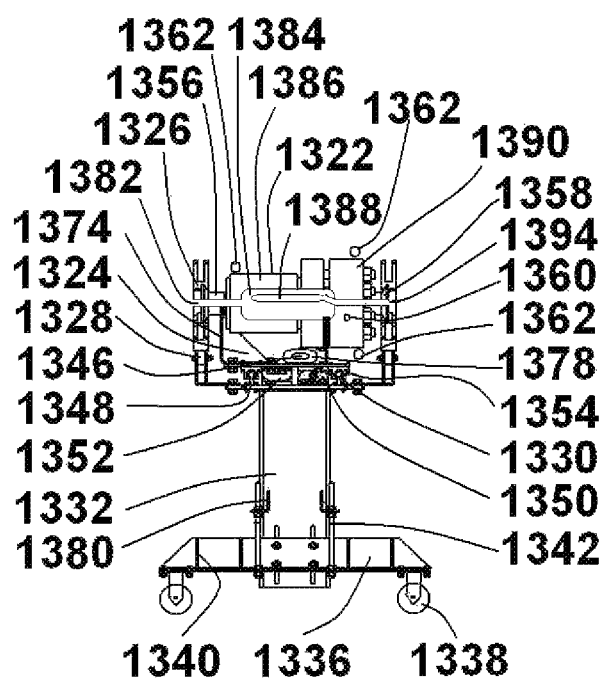
FIG. 12 is a front view schematic illustration of a manually exchangeable filter.

Most preferably the pressurized melt passes through at least one optional filter 1320 that is a manually exchangeable filter and preferably a manually exchangeable candle filter as illustrated in FIGS. 11, 12, and 13. FIG. 11 illustrates at least one and preferably a multiplicity of filter housings 1322 on support bracket 1324. The support bracket 1324 is attached to the top of slideable baseplate 1344. Clamp 1326 is attached to a clamp stand 1328, preferably by bolts, that is attached to fixed baseplate 1330. The fixed baseplate 1330 is attached, preferably by bolts, to stand 1332 that is subsequently attached, preferably by bolts, to L-beams 1336 with a multiplicity of angular braces 1340. A multiplicity of wheels 1138 are attached, preferably bolted, to L-beam 1336. Threaded rods 1342 through angled L-bracket 1380 allow adjustment of the angularity of stand 1332. Handles 1346 are attached to support bracket 1324 to push/pull the support bracket 1324 with filter housings 1322 along rails 1348.

FIG. 12 illustrates the filter housing 1322, clamp 1326, clamp stand 1328, support bracket 1324 with handle 1346, stand 1332, L-beam 1336 with angular braces 1340 and wheels 1338, and threaded rods 1342 through angle L-brackets 1380. Rails 1348 are attached to baseplate 1330 as are bottom slide stops 1350, preferably by bolting. Support bracket 1324 is attached to slideable baseplate 1344 (FIG. 11) under which are attached, all preferably by bolting, top slide stops 1352 and slides 1354 that contain bearings, bushings, and the like as are known to those skilled in the art.

Attached to the end of filter housing 1322 is inlet clamping boss 1356 and outlet clamping boss 1358. The filter housing 1322 can be heated, preferably by a multiplicity of band heaters with heating cables 1360. Attached to the top and/or bottom of the filter housing 1322 is a multiplicity of lift rings 1362 for lifting, replacing, and/or subsequent cleaning of the individual filter housings. Each filter housing 1322 contains at least one and preferably a multiplicity of filter cartridges. More preferably the filter cartridges are candle filters and most preferably they are pleated candle filters.

Figure 13A:
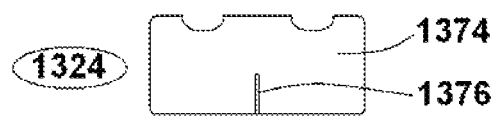
FIG. 13a is the outlet end-on view of the support bracket for the manually exchangeable filter.
Figure 13B:
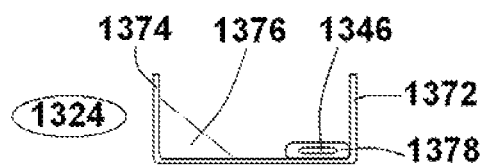
FIG. 13b is side view of the support bracket for the manually exchangeable filter showing handle and angle bracket.
Figure 13C:
FIG. 13c is the inlet end-on view of the support bracket for the manually exchangeable filter.

FIGS. 13a, b, and c illustrate the support bracket 1324 as viewed from the inlet end, FIG. 13a, from the side, FIG. 13b, and from the outlet end, FIG. 13c, to illustrate the cradling design cuts for portions of the filter housing 1322, to accommodate handle 1346, and to illustrate angle support 1376. Support bracket 1324 preferably is made from a single plate that has been bent to form the outlet end bracket 1372, FIG. 13c, and the inlet end bracket 1374, FIG. 13a, to support the filter housing 1322 as shown in FIG. 12. Handle 1346 is attachedly connected, preferably by bolts and/or screws, to plate 1378 wherein plate 1378 is attached to the base portion of support bracket 1324 and the outlet end bracket 1372, preferably by welding as shown in FIG. 13b. Angle support 1376 is attachedly connected preferably by welding and most preferably by welding at approximately the mid-width of inlet end bracket 1374 and the base portion of support bracket 1324 as shown in FIGS. 13a and b.

Figure 14:
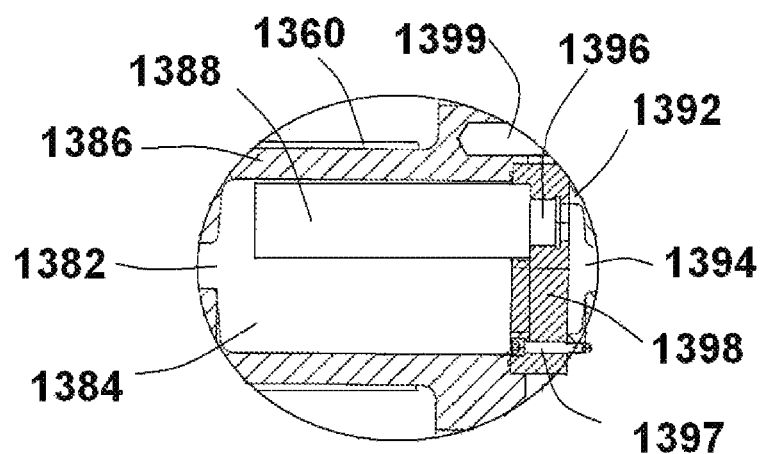
FIG. 14 is an exploded view of the filtration chamber assembly showing flow direction.

The flow direction, for FIG. 12 and detailed in FIG. 14, of the molten material is through the inlet orifice 1382 in the inlet clamping boss 1356 into the filter chamber 1384 within the filter housing component 1386 of filter housing 1322. The molten material passes from outside the filter 1388 across and into the inside of the filter 1388 into the outlet chamber 1390 in the outlet housing component 1392 of filter housing 1322 into the outlet orifice 1394 in and through outlet clamping boss 1358. The filter 1388 can be attached at the outlet end, preferably threadingly attached, to internal filter housing component 1398. The internal filter housing component 1398 is attached, preferably by bolts and/or screws 1397, to outlet housing component 1392 of filter housing 1322. The filter housing component 1386 and the outlet housing component 1392 of filter housing 1322 are attachedly connected, preferably by bolts 1399. The at least one and preferably a multiplicity of lift rings 1362 are attachedly connected to at least one of the filter housing component 1386 and the outlet housing component 1392 of filter housing 1322 and are preferably threadingly attached. The inlet clamping boss 1356 is clamped to melt pump 1180, FIGS. 8b, 8e, and 8f, and outlet clamping boss 1358 attaches to the pelletizing section 8 described hereinbelow.

Static mixer 1160 in FIGS. 8c, 8e, and 8f can be used to heat the mixture being formed to generate a uniform molten mass or can be used effectively as a melt cooler to reduce the temperature of the molten mass. When static mixers are used in series, each unit can be used to heat and further mix the material or formulation wherein the temperatures, design, geometries and configurations, physical sizes, and process conditions can be the same or different among mixers. A static mixer in the series can be heating the material to achieve better temperature and melt uniformity, and improved dispersive and distributive mixing, where applicable, whereas a second static mixer can actually be cooling the material to facilitate further processing, for example. A static mixer 1160 or melt cooler is a heat exchanger of the coil type, scrape wall, shell and tube design, or U-style tube design or other comparable style and preferably is a shell and tube design that includes static mixing blades of appropriate configuration within the individual tubes to further mix the material and bring more of the material into intimate contact with the wall of the tube outside of which is a flow preferably of, but not limited to, oil or water to provide warming or cooling as appropriate. The temperature and flow rate of the circulating medium is carefully regulated by a control unit, not shown. An important criterion for selection of conditions in static mixing or melt cooling is to do a maximum amount of work to effect mixing with a minimum pressure drop while maintaining the pressure required for proper admixture. Pressures generated by the extruder 1150 and/or the melt pump 1180, where present, should be sufficient to maintain flow of the molten or fluid mass through the filter 1320, where applicable, into and through the bypass static mixer 1200, FIGS. 8*b* and 8*d*, and into and through the pelletization section 8, FIG. 1 and described hereinbelow. Alternatively, an optional melt pump 1180 can be positionally attached to outlet 1230, FIG. 2*d* and inlet 1305, FIG. 10, to maintain or increase pressure into and through the pelletization section 8, FIG. 1 and detailed below.

Figure 15:
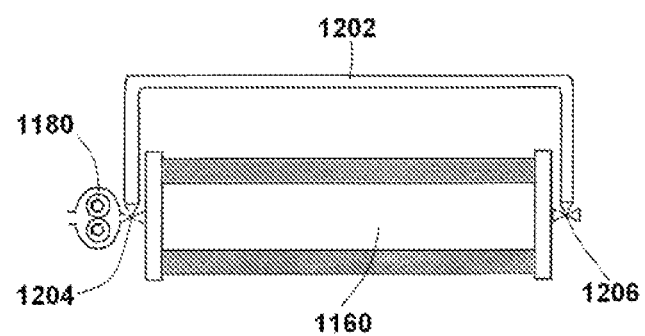
FIG. 15 is a schematic illustration of a comparative static mixer with gear pump and bypass pipe connected by three-way valves.

The optional bypass static mixer 1200 in FIG. 8*d* has a distinct advantage over prior art devices that would have to physically be removed from the melt flow pathway for maintenance or cleaning, and is not always necessary in a particular process. To simplify this challenge, a "spool" or straight large bore pipe that can or can not have a coolant connection can be inserted into the pathway to allow flow effectively bypassing the unnecessary static mixer. Alternatively, a bypass line 1202 can be inserted into the flow path as shown in FIG. 15 with a diverter valve 1204 used to switch flow from the static mixer 1160 into the bypass line 1202. Similarly a second diverter valve 1206 can be used to reconnect the bypass flow back into the mainstream at or near the outlet of static mixer 1160.

Figure 16:
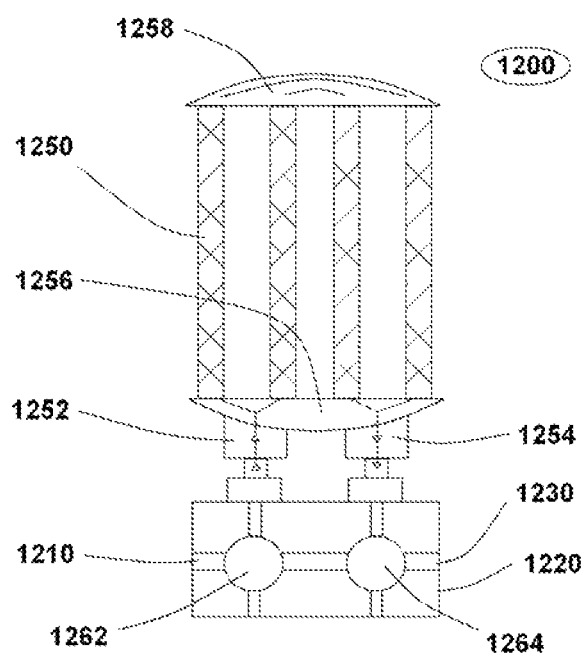
FIG. 16 is a schematic illustration of a vertically configured static mixer with attached bypass diverter valve.

The outlet of optional filter 1320 is attachedly connected to the bypass static mixer 1200 in FIG. 2*d* via inlet 1210 of bypass diverter valve 1220 detailed in FIG. 16. Inlet 1210 directs melt flow into the static mixing component 1250 of the bypass static mixer 1200 through static mixer inlet 1252. The melt flow passes through static mixing component 1250 and exits through static mixer outlet 1254 into the outlet 1230 of the bypass diverter valve 1220. A two-pass or double pass heat exchanger is illustrated in FIG. 16 wherein the base 1256 of the static mixing component 1250 is attachedly connected as described through inlet 1252 and outlet 1254 to the bypass diverter valve 1220. The top 1258 of the static mixing component 1250 is distal from the bypass diverter valve 1220. The orientation of the static mixer 1200 and bypass diverter valve 1220 as herein described can be pendulous, horizontal, or vertically disposed or can be positionally inclined at many angles inclusive between the aforementioned positions.

The valve components 1262 and 1264 are preferably in the form of movable bolts, valve component 1262 being upstream of the static mixing component 1250 and valve component 1264 is similarly downstream. The bolts contain, but are not limited to, two (2) bores exemplary of which is valve component 1264, or three (3) bores of which valve component 1262 is an example, or more bores. The respective bores can have various orientations, for example, they can be straight-through, form a 90° turn, or be in the shape of a "tee or T", and are specifically placed along the length of the bolt. Each of these bores is positionally placed by means of a fluid-controlled cylinder or equivalent device, and will adjustably maintain good alignment with the proper inlets and/or outlets of the bypass diverter valve 1220, based on the desired position required by the operator running the process, as will be understood by those skilled in the art. The positioning of the fluid powered cylinders, and thus the each bolt's position, can be controlled by manually operating a fluid flow valve or by automatic control such as by PLC, or both.

Use of surface treatments and coatings for components in section 2 of FIGS. 8*a* to 8*f*, including vessels, extruders, gear pumps, screen changers, polymer diverter valves (FIG. 10), and static mixers or melt coolers are contemplated by the present invention and are included herein by way of reference without intending to be limited. Nitriding, carbonitriding, electrolytic plating, electroless plating, thermal hardening, flame spray techniques, and sintering techniques are exemplary of these surface treatments and coatings.

Figure 17:
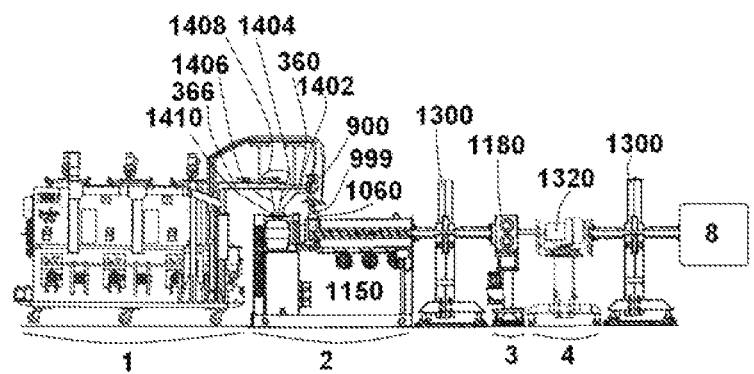
FIG. 17 is a schematic illustration of a feeding system section 1 with controllably positionable mix head, a mixing section 2 with pressurization 3 and filtration 4 prior to pelletization section 8.

Turning now to FIG. 17, a simplified schematic illustration of a preferred embodiment of the present invention is shown in which a feeding system section 1 provides the mixed materials to mixing section 2 in which an extruder 1150 further processes and/or reacts the material propagating it to and through a diverter valve 1300 into a pressurization section 3 in the form of a melt pump 1180 to and through a filtration section 4 in the form of a filter 1320 and preferably a manually exchangeable candle filter to and through a diverter valve 1300 into pelletization section 8 described hereinbelow. Fluid material from feeding system section 1 is provided to mix head 900 through outlet 999, as described hereinabove, into and through overflow shroud 1060 into the throat, not shown, of extruder 1150. Mix head 900 contains a positional sensor to identify its location over the throat of the extruder 1150. There is also at least one other limit switch, preferably a proximity switch, that can extend from at least one of the mix head 900, the pivotable arm 360, and/or the pivotal support arm 366. Alternatively, the limit switch or proximity switch can be on a bracket attachedly connected to at least one of these devices. The switch and/or bracketed switch 1402 can be attached to the mix head 900. Alternatively, the switch and/or bracketed switch 1404 can be attached to the pivotable arm 360. In yet another variant, the switch and/or bracketed switch 1406 can be attached to the pivotal support arm 366. In yet another option, the switch and/or bracketed switch 1408 can determine the position of pivotable arm 360 relative to that of the pivotal support arm 366. The option chosen is dependent on the final configuration of the feeding system section 1 relative to that of the feed throat and overflow shroud 1060 of extruder 1150. The proximity switch can be at least one of infrared, capacitive, inductive, and/or electromagnetic and is preferably electromagnetic. The switch and/or bracketed switch 1402, 1404, 1406, and/or 1408 passes over metal plate 1410 fixedly attached to a flat area or to a bracketed flat area on extruder 1150 and as proximally located to the feed throat and overflow shroud 1060 as is practicably possible. The area of the metal plate 1410, preferably a magnetic metal plate, is the same as the area of the feed throat into which the fluid from the outlet 999 of mix head 900 can successfully deliver the fluid. The actual position of the outlet 999 relative to the feed throat of the extruder varies with the material being delivered and can be located exemplarily to reduce build-up in a particular locus, to facilitate enhanced feeding into the screw mechanisms of the extruder 1150, to reduce the distance between outlet 999 and the screw elements of the extruder 1150, to facilitate delivery of the fluid to areas most efficiently purged as heretofore described, and the like as is known to those skilled in the art.

Figure 18:
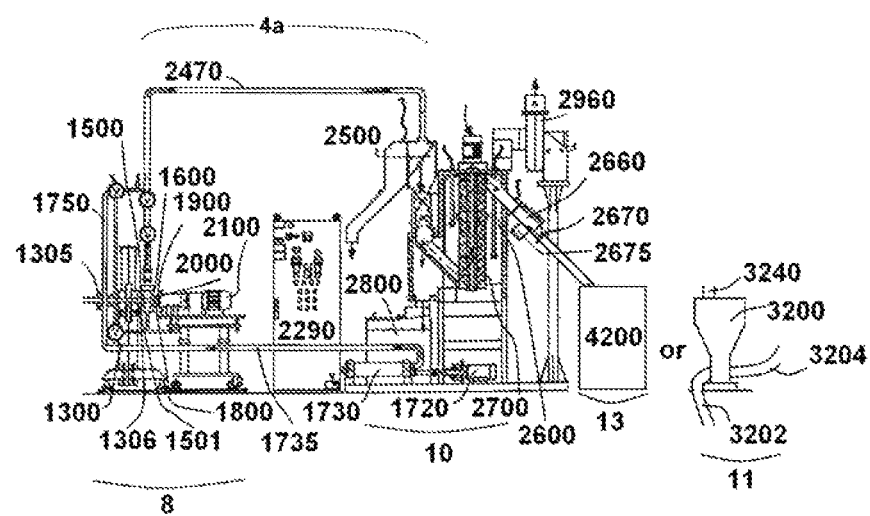
FIG. 18 is a schematic illustration of a pelletization system and dryer.

Referring again to FIGS. 8a to 8f, the outlet of filter 1320 is connected to the inlet 1305 of diverter valve 1300 and the outlet 1306 is connected to the pelletization section 8 at inlet 1501 of the die 1520, with details illustrated in FIGS. 18, 19, 20a, 20b, 21, 22, 23, 24, and 25. FIG. 18 further illustrates transport to and through a drying process as described below.

Figure 19:
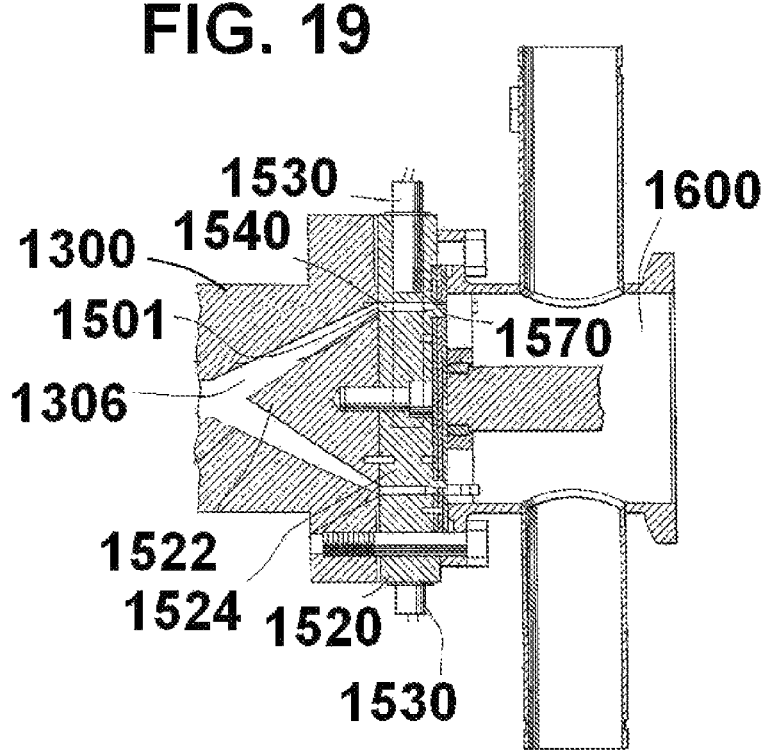
FIG. 19 is a schematic illustration of a one-piece die plate with heating elements in three configurations.

The die 1520 in FIG. 19 is a single-body style including a nose cone 1522 attached to die body 1524 into which are fitted heating elements 1530 and through which are bored multiple die holes 1540 that vary in number and orientation pattern and are preferably approximately 3.5 mm in diameter or smaller. The die holes 1540 can be many combinations of design including, but not limited to, increasing or decreasing taper or cylindrical or many combinations thereof and segments can vary in length as necessitated by the process and materials. Preferably, the die holes 1540 are placed singularly or collectively in groups or pods in one or more concentric rings as determined by the diameter of the outlet 1306 of the diverter valve 1300 fittedly attached thereto. The die holes 1540 can be at least one of round, oval, square, rectangular, triangular, pentagonal, hexagonal, polygonal, heart-shaped, star-shaped, dumbbell or dogbone shape, and many other geometries and designs without intending to be limited.

Figure 20A:
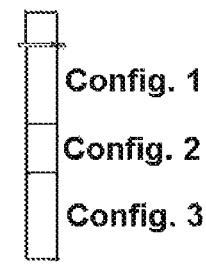
FIG. 20a illustrates the three configurations of the heating element extracted from the die plate.
Figure 20B:
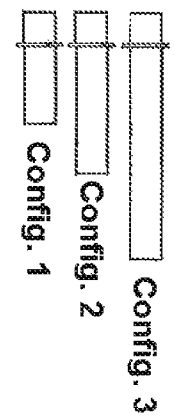
FIG. 20b illustrates the three configurations of the heating element positionally placed individually in side view.

Heating elements 1530 can be a cartridge or more preferably a coil type element and can be of sufficient length inside the die body 1524 to remain outside the circumference of the die holes as illustrated in FIG. 19 and detailed in FIGS. 20a and 20b as configuration 1, or can extend into and near the center of the die body without passing the center in length, configuration 2 in FIGS. 20a and 20b, or can extend past the center in length but not of sufficient length to contact the ring of die holes diametrically opposed, (configuration 3). Positioning of the die holes will vary as would be readily recognized by one skilled in the art to accommodate the appropriate configuration of the heating elements 1530 and one or more lengths or designs of heating elements are optionally included within the scope of the present invention.

Alternatively, die 1520 can be of single-body construction heated by at least one band heater, not shown, that replaces heating elements 1530 and circumferentially surrounds the die body 1524. In yet another alternative, at least one coil heater, also not shown, can be used circumferentially surrounding die 1520 comparable in application to the band heater. Similar modifications are intended to be understood as embodiments of the present invention in this and other die designs described hereinbelow.

Figure 21:
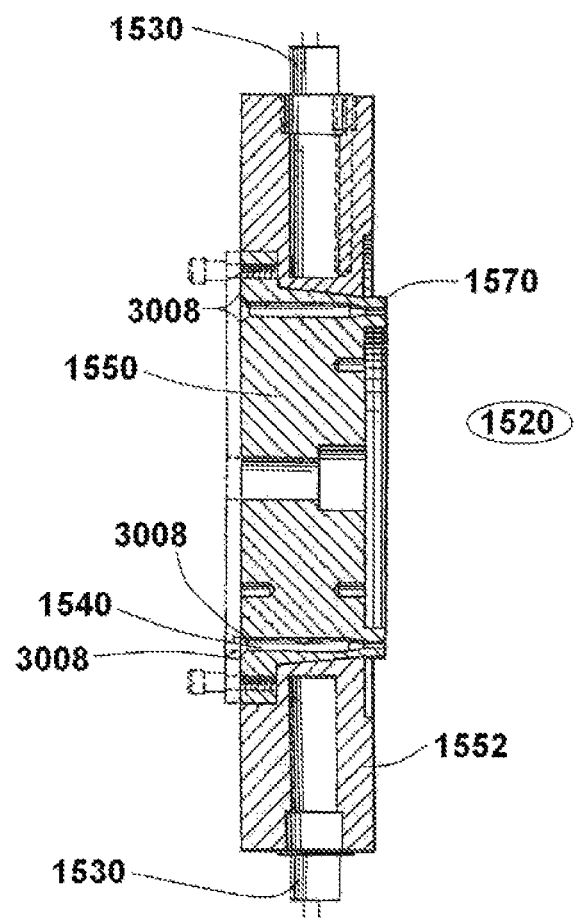
FIG. 21 is a schematic illustration of a removable-center die.

A preferred design of die 1520 is illustrated in FIG. 21 in that the die body is of a removable center or insert configuration. The heating elements 1530 are of a cartridge or, more preferably, a coil configuration and are inserted into the outer die body component 1552 whereby they are constrained in length to suitably fit within the confines of the outer die body component 1552. The die holes 1540 are contained within removable insert 1550 and are variable in design, dimension, and placement as detailed in the foregoing discussion. The removable insert 1550 is fixedly attached to outer die body component 1552 by known mechanisms.

Figure 22:
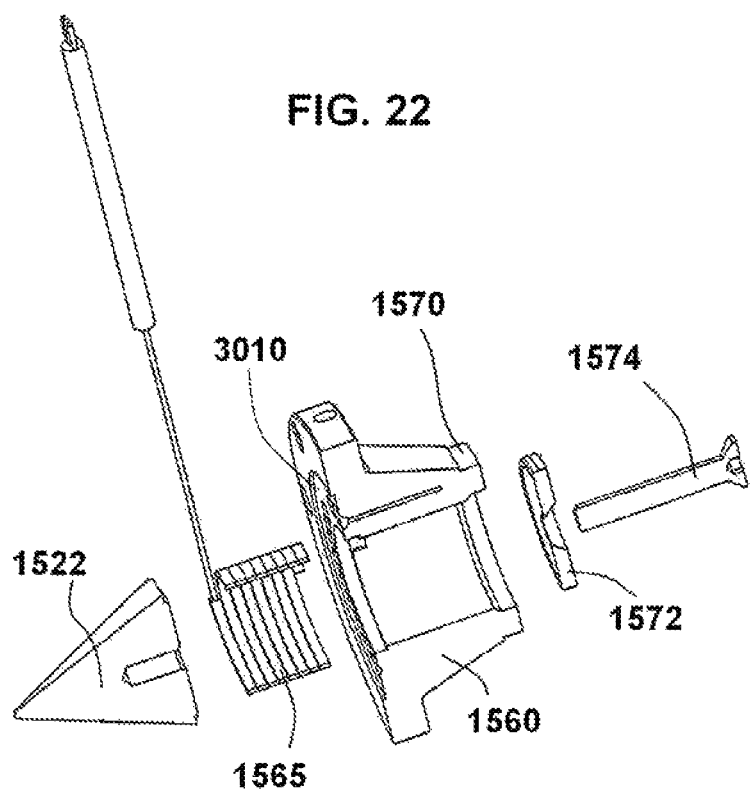
FIG. 22 is an expanded view illustration of the components of a removable center-heated die.

FIG. 22 shows an alternative design of die 1520 in that the die body is of a removable center or insert configuration with multiple heating zones for enhanced heating efficiency and more facile thermal transfer to the molten or liquid materials as they pass through the die holes 1540. The outer die body component, not shown, is comparable to that described for FIG. 21. The heated removable insert 1560 of the alternative design has an open center to which is fitted a heating element 1565, preferably a coiled heating element, that can be thermally controlled in common with other heating elements in the outer die body component or more preferably, is autonomously regulated thermally thus allowing multizone heating capacity within the die 1520.

Figure 23:
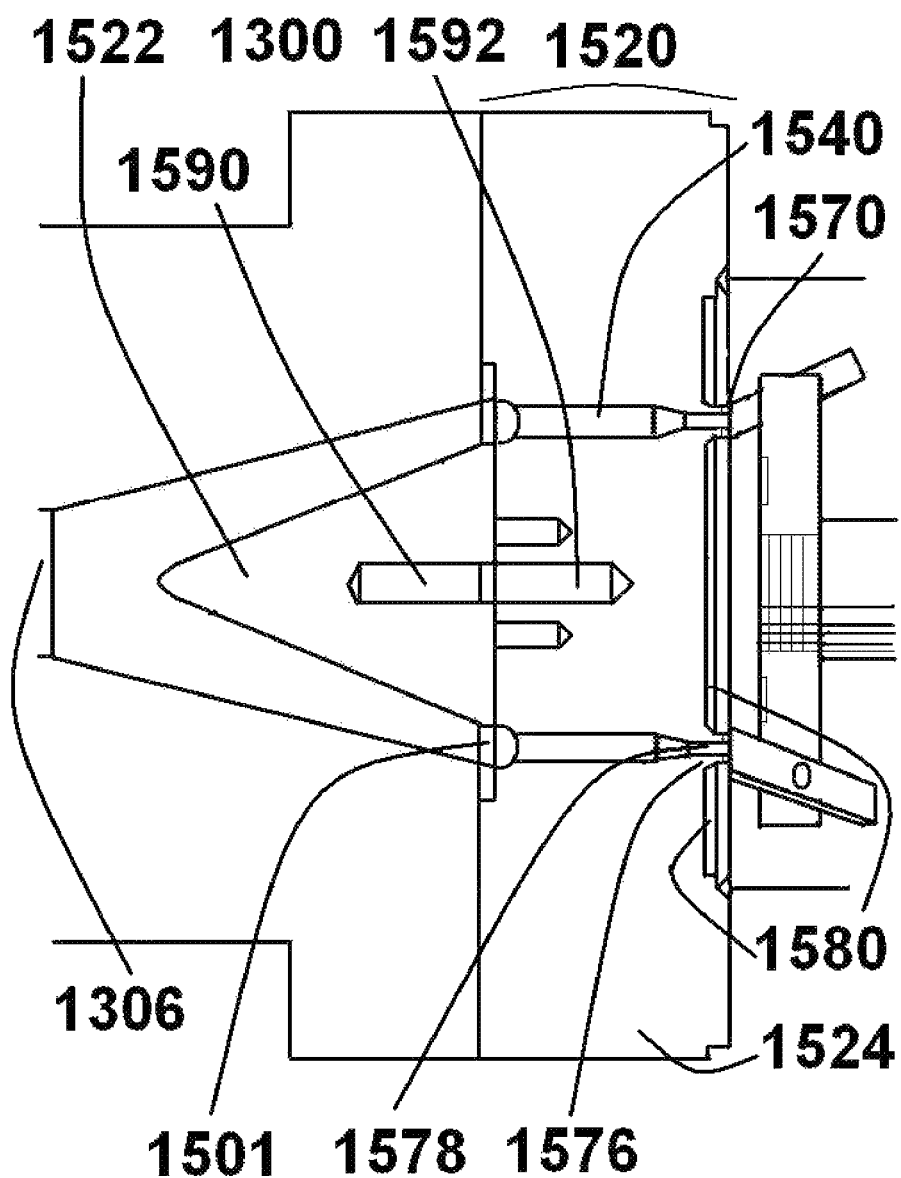
FIG. 23 is a schematic illustration of a single-body insulated die.

The die 1520 illustrated in FIG. 23 is an alternative single-body style similar in design to that heretofore describe in FIG. 19 attached to diverter valve 1300 at outlet 1306 via inlet 1501 of the die 1520. Nose cone 1522 is similarly attached to die body 1524 into which are fitted heating elements as before, not shown, and through which are bored multiple die holes 1540 that vary in number, orientation and design as previously described. Preferably, the die holes 1540 are placed singularly or collectively in groups or pods in one or more concentric rings as determined by the diameter of the outlet 1306 of the diverter valve 1300 fittedly attached thereto as before. Die body 1524 contains insulating chamber 1580 circumferentially positioned about the die body protrusions 1576 through which penetrate outlets 1578 of the die holes 1540. The insulating chamber 1580 can contain air or other inert gas and more preferably is a vacuum as is known to those skilled in the art.

Figure 24:
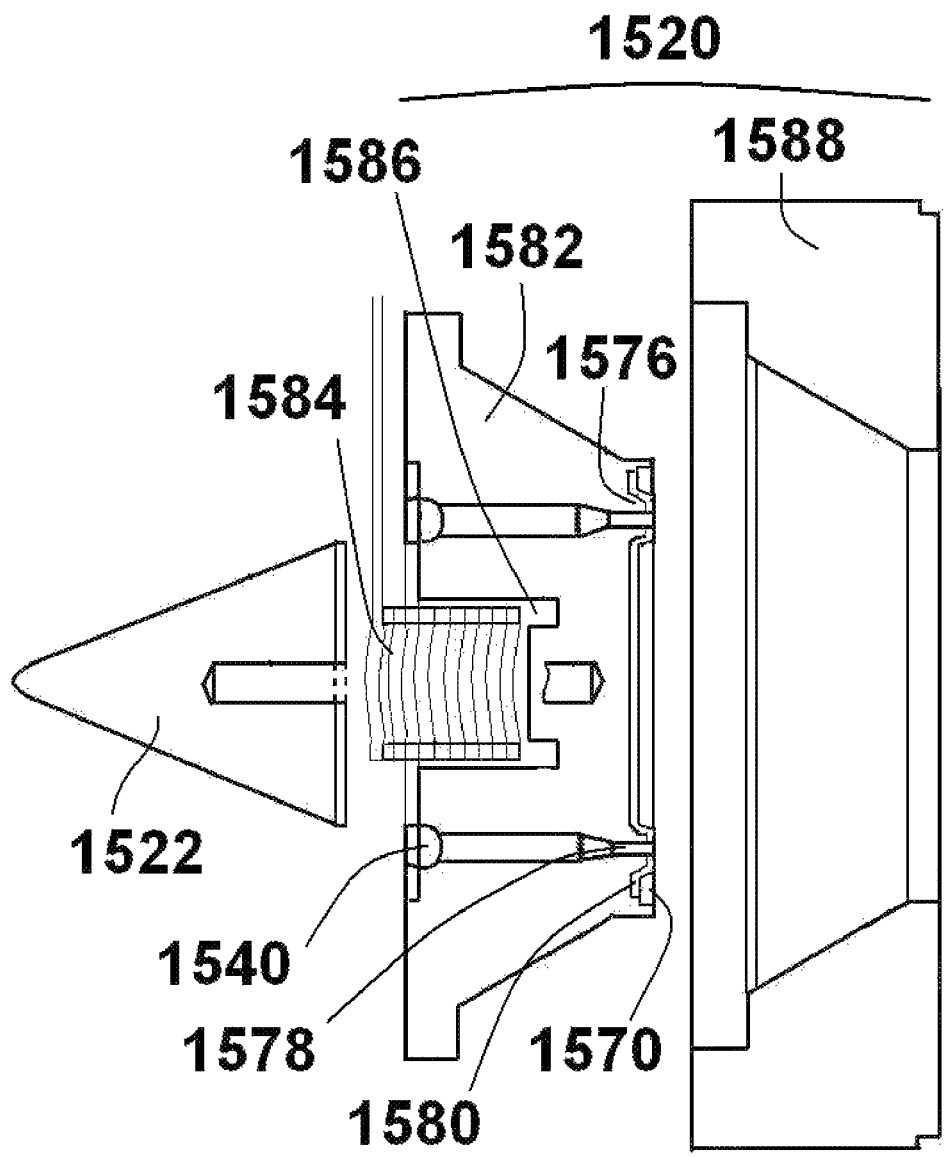
FIG. 24 is an expanded view illustration of an insulated tapered body removable insert die.

FIG. 24 illustrates an alternative tapered insert center-heated configuration for die body 1520 in which the tapered removable insert 1582 is constructed with recess 1586 into which fits coiled heater 1584. Covering this assembly is attachedly connected nose cone 1522 as described hereinbelow. Tapered removable insert 1582 contains insulating chamber 1580 circumferentially positioned about the die body protrusions 1576 through which penetrate outlets 1578 of the die holes 1540. The insulating chamber 1580 can contain air or other inert gas and more preferably is a vacuum as heretofore discussed. The multiplicity of die holes 1540 vary in number, orientation and design as previously described and are placed singularly or collectively in groups or pods in one or more concentric rings as determined by the diameter of the outlet 1306 of the diverter valve 1300 fittedly attached thereto as before. Tapered removable insert 1582 is fittingly positioned in die base 1588 to which is attachedly, albeit removably, connected.

Figure 25:
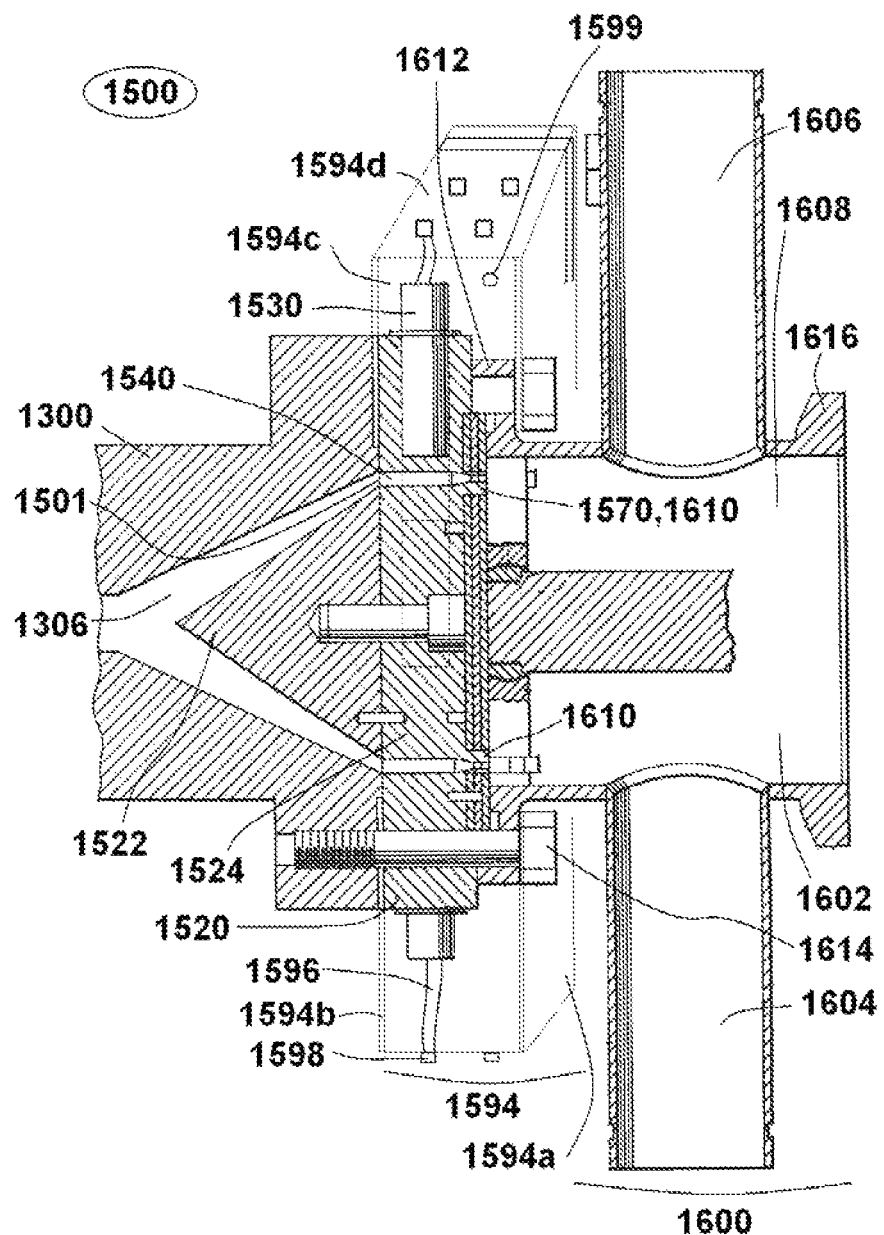
FIG. 25 is a schematic illustration of a die body with cutting shroud and shield.

Yet another design configuration for die 1520 is illustrated in FIG. 25 in which a shield 1594 is attachedly connected to die 1520. Heating element cable 1596 is attachedly connected to heating element 1530 and passes through shield 1594 at orifice 1598. Air or other inert gas can be purged into shield 1594 through orifice 1599 to provide additional protection from exposure of the die 1520 to possible vapors thusly reducing the likelihood of or avoiding possible ignition of those vapors. (Reference numbers for FIG. 25 follow those from FIG. 19.) Purging can be accomplished by allowing flow of purge gas through unsealed or marginally sealed assembly junctions, not shown. Alternatively, an optional purge outlet orifice, not shown, can be affixed to shield 1594 facilitating directed purge therethrough and facilitating optional recycling and/or purification of the purge as is understood by those skilled in the art.

Shield 1594, as illustrated in FIG. 25, can be an assembly of backplate 1594a, faceplate 1594b, side plates 1594c, and end plates 1594d connected, by welding for example, and attachedly connected to the die body 1524. Alternatively, the shield 1594 can be an assembly of the backplate 1594a, side plates 1594c, and end plates 1594d attachedly connected to the die body 1524 or to the diverter valve 1300. Face plate 1594b can be attachedly connected to die body 1524 and is sealingly fitted onto the assembly and attachedly and removable affixed in position by bolting, clamping and many similar mechanisms as are known to those skilled in the art.

In yet another configuration, shield 1594 can be an assembly of the faceplate 1594b, side plates 1594c, and end plates

1594*d* attachedly connected to the die body 1524. Backplate 1594*b* can be attachedly connected to diverter valve 1300 and is sealingly fitted onto the assembly and attachedly and removable affixed in position by bolting, clamping, and many similar mechanisms as are known to those skilled in the art.

The shield 1594 is illustrated in FIG. 25 as a square to rectangular assembly by way of example and is not intended to be limiting. As such the shield 1594 can be round, oval, hexagonal, polygonal, many geometries, and many combinations of geometries to accommodate structural design, facilitate functional operation, and/or to achieve aesthetic preferences as obviated by the apparatus and the maintenance necessitated thereof.

The die 1520 in all configurations (FIGS. 19, 20*a*, 20*b*, 21, 22, 23, 24, and 25) can contain an appropriate fixedly attached hardface 1570 that is preferably an abrasion resistant, wear resistant, and where required, a corrosion resistant material and through which pass the die holes 1540 for extrusion of the molten or liquid extrudate. Tungsten carbide, titanium carbide, ceramics and combinations thereof, are common materials for hardface applications as is understood by those skilled in the art and are cited by way of example alone or in combination without intent to be limiting or otherwise restrictive within the scope of the present invention.

The bolting mechanism for the nose cone 1522 is exemplarily illustrated in FIG. 22 by way of example without limitation. A cover plate 1572 is positionally attached by bolt 1574 to the face of the die body 1520 or removable insert 1550 or heated removable insert 1560, FIGS. 19, 21, and 22 respectively, that can be less than or at least equal to the height dimension of the hardface 1570. Alternatively, gasket material or other materials for sealing of the cover plate 1572 can be used as required. Alternatively, nose cone 1522 can be attached as illustrated in FIG. 23 wherein a rod, not shown, is threaded at both ends and is threadingly inserted into threaded nose cone recess 1590 and threaded die body recess 1592.

Diverter valve outlet 1306, FIGS. 19, 23, and 25, is comprised of an inner bore that is tapered diametrically and conically in increasing diameter to create a chamber continuously and proportionately larger than nose cone 1522 that inserts therein. The volume of the chamber thusly generated allows unobstructed flow of the process melt or other molten or liquid material to flow from the diverter valve 1300 into the die hole 1540. Alternatively, an adapter (not shown) can be attached to diverter valve outlet 1306 which is accordingly tapered as described herein to accommodate the nose cone 1522.

The diverter valve outlet 1306 and alternative adapter (not shown), nose cone 1522, and die body 1524 in FIGS. 19, 23, and 25 as well as the removable insert 1550, FIG. 21, heated removable insert 1560, FIG. 22, tapered removable insert 1582 and die base 1588, FIG. 24, can be made of carbon steel, thermally hardened carbon steel, stainless steel including martensitic and austenitic grades, thermally hardened and precipitation-hardened stainless steel, or nickel to improve resistance to abrasion, erosion, corrosion, and wear. Nitriding, carbonitriding, electrolytic plating and electroless plating techniques are for enhancement of these resistance properties are included herein by way of reference.

To provide a smooth surface for die holes 1540 in FIGS. 19, 21, 23, 24, and 25 thusly reducing erratics from manufacturing processes including bore marks, conventional technology for the die holes 1540 can include treatment by electron discharge machining (EDM) utilizing a wire that is circumferentially rotated about the die hole subsequently enhancing surface smoothness, improving uniformity of the die hole geometry, and controllably and uniformly increasing the die hole diameter. Alternatively, high-velocity abrasive and polishing grits of uniformly fine grain size can be passed through the die holes to effect improved smoothness within the die hole. Additionally, inserts to reduce abrasion and adhesion can be placed into the lands of die holes 1540. Fluoropolymer, ceramic, and tungsten carbide inserts are non-limiting examples. Other surface treatments for improvement of surface properties, enhancement of corrosion and abrasion resistance, and improvement of wear can be used without intending to be limited.

Figure 27:
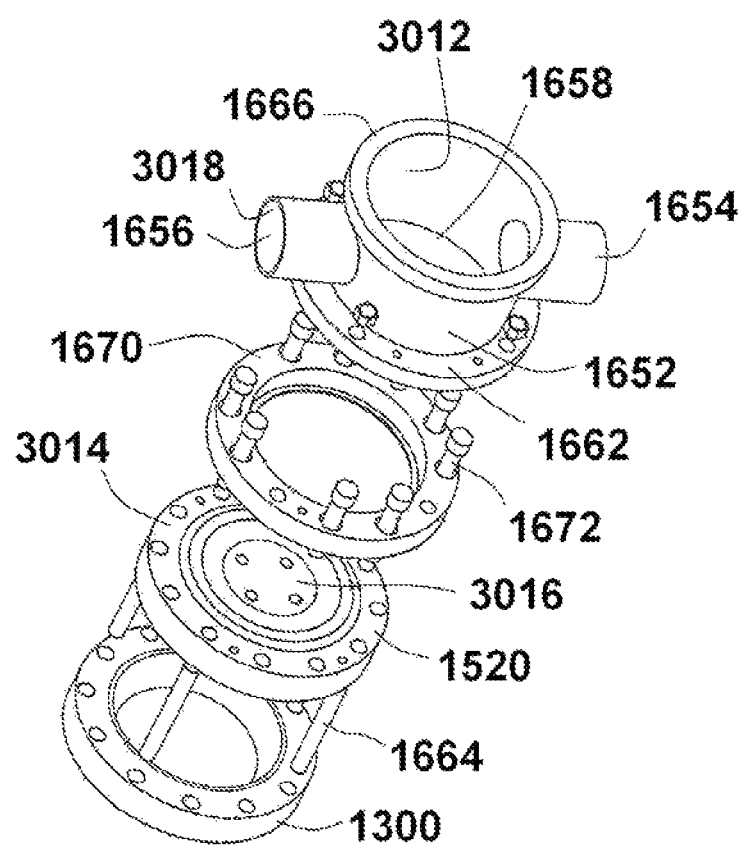
FIG. 27 is an expanded view illustration of a comparative two-piece cutting shroud.
Figure 28A:
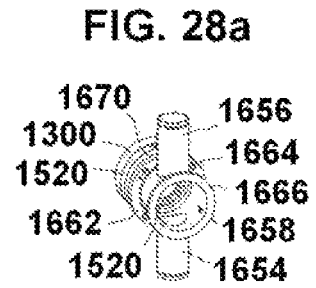
FIG. 28a is a schematic illustration of a complete assembly of a comparative two-piece cutting shroud.

Referring once again to FIG. 18, the die 1520 is fixedly attached to cutting shroud 1600 as shown in FIGS. 19 and 25 and detailed in FIGS. 27, and 28*a*, *b*, and *c*. FIG. 25 illustrates a configuration of a one-piece cutting shroud 1600 that comprises a housing 1602 to which is connected inlet pipe 1604 and outlet pipe 1606 of similar diameter and geometry and diametrically opposed positionally and interconnectedly attached to a rectangular, square, or preferably cylindrical or other geometrically open cutting chamber 1608 surrounding and of sufficient diameter to completely encompass the die face 1610 (representationally equivalent to the surface of hardface 1570 in FIGS. 19, 21, 22, 23, 24, and 25). Housing 1602 has mounting flange 1612 through which a plurality of mounting bolts 1614 pass to sealingly attach the cutting shroud 1600 and die 1520 to diverter valve 1300. Flange 1616 on housing 1602 allows attachment to the pelletizer 2100 (see FIG. 18) as is detailed below. Components that are free to rotate within the cutting chamber 1608 are described hereinafter.

Figure 26:
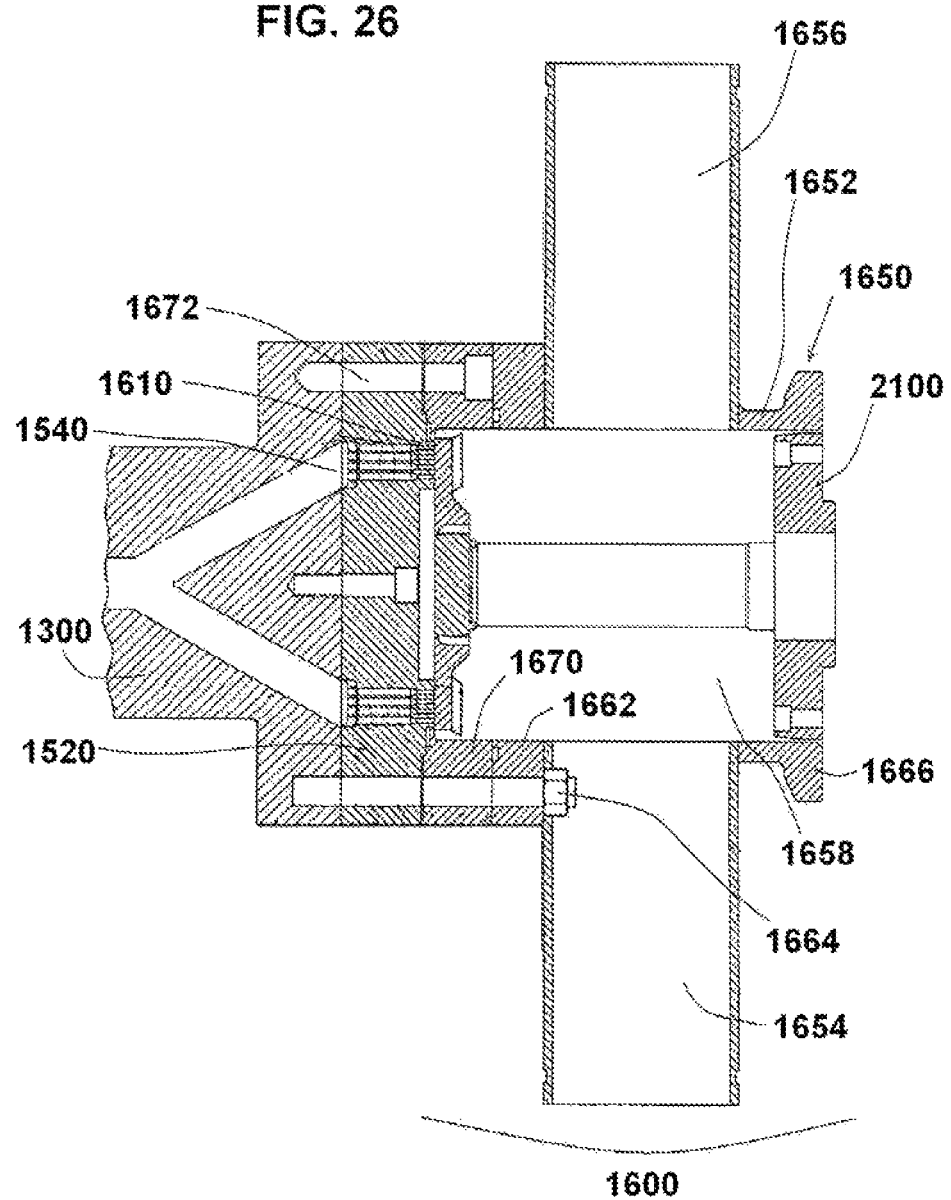
FIG. 26 is a schematic illustration of a die body and two-piece cutting shroud.

Similarly, FIG. 26 illustrates a two-piece configuration of cutter shroud 1600 comprising a main body 1650 with housing 1652 to which is connected inlet pipe 1654 and outlet pipe 1656 of similar diameter and geometry and diametrically opposed positionally and interconnectedly attached to a rectangular, square, or preferably cylindrical or other geometrically open cutting chamber 1658 surrounding, and of sufficient diameter to completely encompass, the die face 1610 (representationally equivalent to the surface of hardface 1570 in FIGS. 19, 21, 22, 23, and 24) comparably described above and as completely assembled as herein described. Housing 1652 has mounting flange 1662 through which a plurality of mounting bolts or studs 1664 pass. Mounting flange 1662 sealingly attaches to adapter ring 1670 of comparable diameter, both inside and outside dimensions, through which pass a plurality of countersink bolts 1672. Mounting bolts or studs 1664 and countersink bolts 1672 are preferably alternating positionally and sealingly attach the components of and thus the complete cutting shroud 1600 and die 1520 to diverter valve 1300. Flange 1666 on housing 1652 of the main body 1650 allows attachment to the pelletizer 2100 (see FIG. 18) as is detailed below. Components that are free to rotate within the cutting chamber 1608 in FIG. 25 and/or cutting chamber 1658 in FIG. 26 are described hereinafter. Separate attachment of the adapter ring 1670 to and through the die 1520 allows the main body 1650 to be removed for cleaning or maintenance while leaving die body 1520 sealingly attached to diverter valve 1300.

An exploded view of the two-piece configuration of cutting shroud 1600 is illustrated in FIG. 27 with a complete assembly illustrated in FIG. 26. Reference numbers are retained to be consistent wherein similar parts have similar numbers in FIGS. 26, 27, and 28*a*.

Figure 28B:
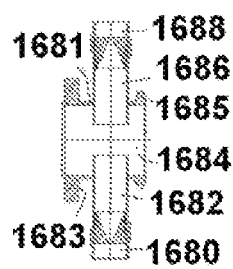
FIG. 28b is a cross-sectional illustration of an alternative cutting shroud inlet and outlet design.
Figure 28C:
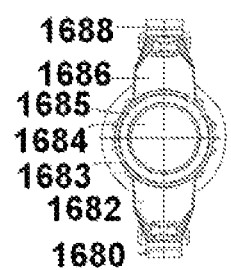
FIG. 28c is a schematic face-view illustration of the alternative cutting shroud inlet and outlet design of FIG. 28b.

FIGS. 28*b* and 28*c* illustrate an alternative design for the cutting shroud inlet and outlet in that inlet 1680 is fixedly attached to a rectangular or square inlet tube 1682 that taperingly increases along its length as it approaches the housing 1681 to which it is attachedly connected and within which is cutting chamber 1684. Similarly attached to housing 1681 and diametrically opposed to inlet tube 1682 is rectangular or square outlet tube 1686 that taperingly decreases along its length to outlet 1688 to which it is fixedly attached. Flange 1683 and flange 1685 in FIGS. 28b and 28c compare in design and purpose to flanges 1662 and 1666 in FIG. 28a previously described.

FIGS. 28a, b, and c illustrate a preferred diametrically opposed inlets and outlets. Alternatively, the inlets, 1654 and 1680, and outlets, 1656 and 1688, can be located at an angle from approximately 20° to a preferred 180° relative to and defined by the position of outlet to inlet and can be opposingly or staggeringly attached to housing 1681 by way of example. Dimensions of the inlet and outlet can be the same or different and the inlet and outlet can be similar or different in design. Preferably, the inlet and outlet so identified are of similar dimension and design, and are diametrically opposed. Cutting shroud 1600 as illustrated in FIGS. 25, 26, 27, and 28a, b, c, generically exemplifies fluid flow into inlet pipes 1604, 1654, and 1682 with flow through cutting chambers 1608, 1658, and 1684 respectively. Effluent flow from the respective cutting chambers exits through respective outlet pipes 1606, 1656, and 1686.

Returning to FIG. 27, for conventional surface treatments to reduce abrasion, erosion, corrosion, wear, and undesirable adhesion and sticture, the inner surface 3012 of flange 1666 and the lumens 3018 of inlet pipe 1654 and outlet pipe 1656 (lumen not shown) can be nitrided, carbonitrided, sintered, can undergo high velocity air and fuel modified thermal treatments, and can be electrolytically plated. The exterior surface 3014 and exposed surface 3016 of die body 1520 can be treated similarly. It is understood that variations illustrated in FIGS. 19, 21, 22, 23, 24, 25, 26, and 28a, b, c, can be treated similarly. Other surface treatments for improvement of surface properties, enhancement of corrosion and abrasion resistance, improvement of wear, and/or reduction of clumping, agglomeration, and/or sticture can be used without intending to be limited.

Once again returning to the illustration in FIG. 18, pelletizer 2100 is shown in the non-operational open position. Attached to the pelletizer is optional flow guide 2000, and cutter hub 1800 with cutter blades 1900. Upon operation of the equipment, pelletizer 2100 is moved into position such that it can be fixedly attached to flange 1616 of the one-piece configuration of cutting shroud 1600 or flange 1666 on the main body 1650 of the two-piece configuration of cutting shroud 1600 as detailed in FIGS. 25 and 26, respectively. Attachment is most preferably made, but not limited to quick disconnects but can be through many mechanisms. In the operating configuration, the cutter hub 1800 and cutter blades 1900 freely rotate within the cutting chamber 1608 (FIG. 25) or 1658 (FIG. 26). Details of all illustrated components are contained within the ensuing discussions.

Figure 29:
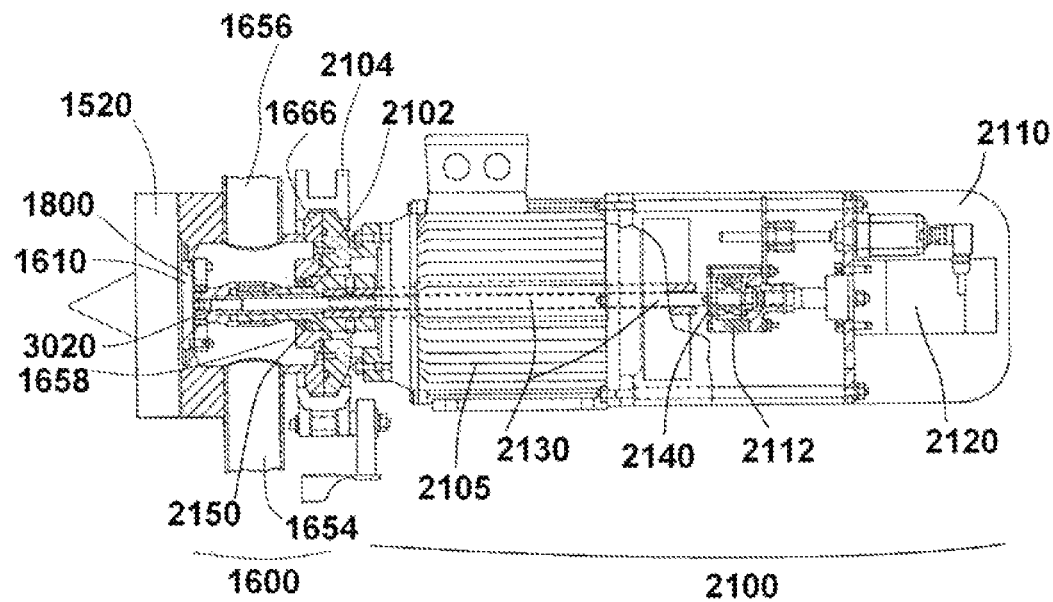
FIG. 29 is a schematic illustration of a pelletizer with attached cutting shroud showing the die.

The pelletizer 2100 is shown diagrammatically in FIG. 29 and can be positionally adjustable in terms of cutter hub 1800 relationally to die face 1610. FIG. 29 represents the pelletizer 2100 in operational position wherein it is sealingly attached via pelletizer flange 2102 to cutting shroud flange 1666 tightly held by removable quick disconnect clamp 2104, for example. Positional adjustment of the pelletizer can be achieved manually, spring-loaded, hydraulically, pneumatically, or electromechanically, or can be achieved by combinations of these mechanisms acting cumulatively in one direction or opposingly in counter-direction of forces applied to insure appropriateness of position as necessitated to achieve even wear, increased longevity, avoidance of undue extrusion leading to melt wrap around the cutter hub or the die face 1610, and consistency of the pelletized product. A preferred design is of the hydraulic-pneumatic mechanism detailed in FIG. 29 comprising a motor 2105, housing 2110, and containing hydraulic cylinder 2120 engagedly attached to coupling 2112. A rotor shaft 2130 connects coupling 2112 to the cutter hub 1800 at the die face 1610 and passes through thrust bearing 2140 and sealing mechanism and preferably a mechanical sealing mechanism 2150 in fluid contact with cutting chamber 1658 of cutting shroud 1600. Inlet pipe 1654 and outlet pipe 1656 indicate flow direction of fluids into the cutting chamber 1658, admixture of fluids and pellets in the cutting chamber 1658, and subsequently, flow of the pellet slurry formed away from the cutter hub 1800 as well as die face 1610 and out of the cutting chamber 1658.

Figure 30:
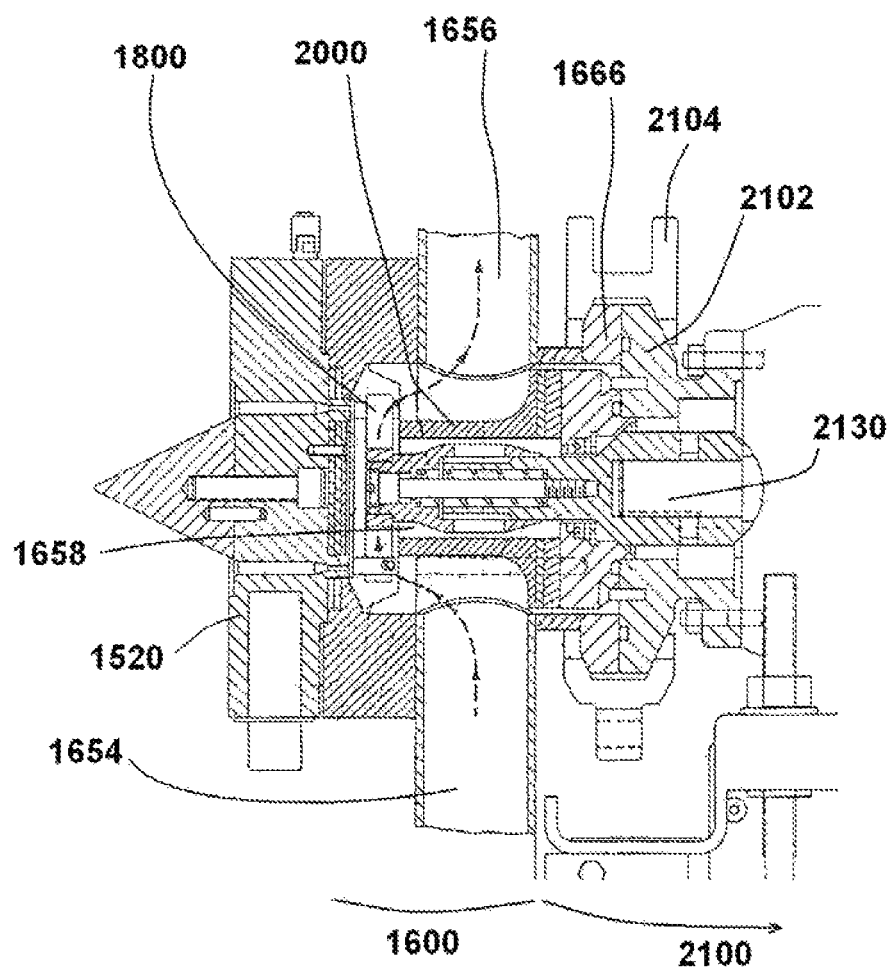
FIG. 30 is a schematic illustration of a die attached to a cutting shroud containing a flow guide.
Figure 31A:
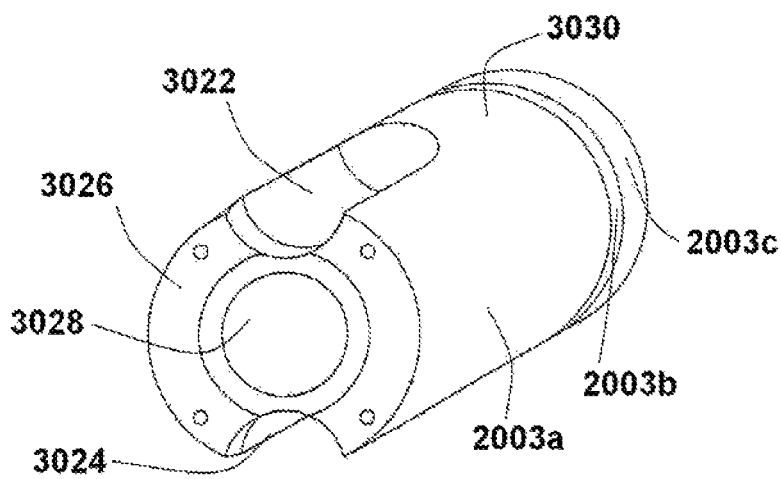
FIG. 31a is a schematic illustration of a comparative flow guide.
Figure 31B:
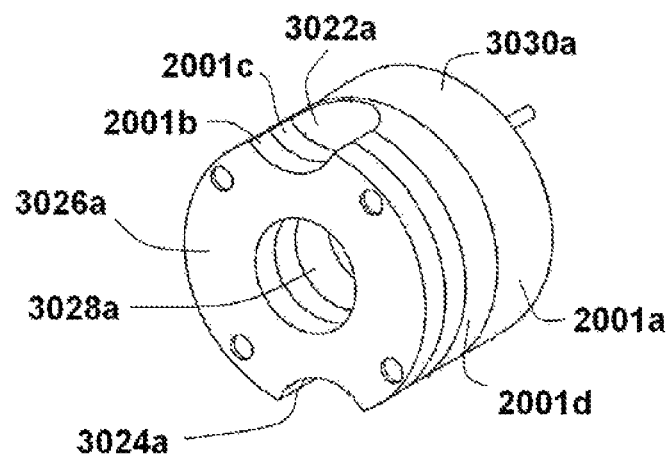
FIG. 31b is a schematic illustration of a second configuration of a comparative flow guide.

To increase fluid velocity through the cutting chamber 1658, improve pellet quality, reduce freeze off, avoid wrapping of melt around die face 1610, generate or increase head pressure, and improve pellet geometry, FIG. 30 illustrates a preferred configuration in which flow guide 2000 is positioned in the cutting chamber 1658 effectively reducing the fluid volume of that region. The die 1520, cutting shroud 1600, and pelletizer 2100, shown only partially, are positionally the same as in FIG. 29. The hollow shaft rotor preferably is attached to cutter hub 1800 in cutting chamber 1658 with appropriate inlet pipe 1654 and outlet pipe 1656 as previously described. The pelletizer 2100 is sealingly and removably attached to the cutting shroud 1600 through use of quick disconnect clamp 2104 on pelletizer flange 2102 and cutting shroud flange 1666 as before. FIGS. 31a and 31b show two exemplary configurations for flow guide 2000, in which sections can be of similar or different segmental length having consistent outside diameter that is less than the diameter of cutting chamber 1658 and can be varied in accordance with the requisite diminution of volume desired in that cutting chamber 1658. Flow guide spacer sections 2003 can be uniform circumferentially and diametrically as indicated singly by 2003a, or plurally in 2003b and 2003c, but can vary in segmental length and are not limited in plurality to two as shown. To direct and/or restrict flow, flow directing segments 2001 singly in 2001a or unlimited plurally in 2001b, 2001c, and 2001d, for example, are modified by longitudinally extending grooves that are arcuate in transverse configuration with the deepest grooved section positioned proximal to the cutter hub 1800. A preferred configuration of a series of segments is not intended to be limited as to number of segments and a single flow guide component of comparable geometry and functionality is well within the scope of the present invention.

Figure 32:
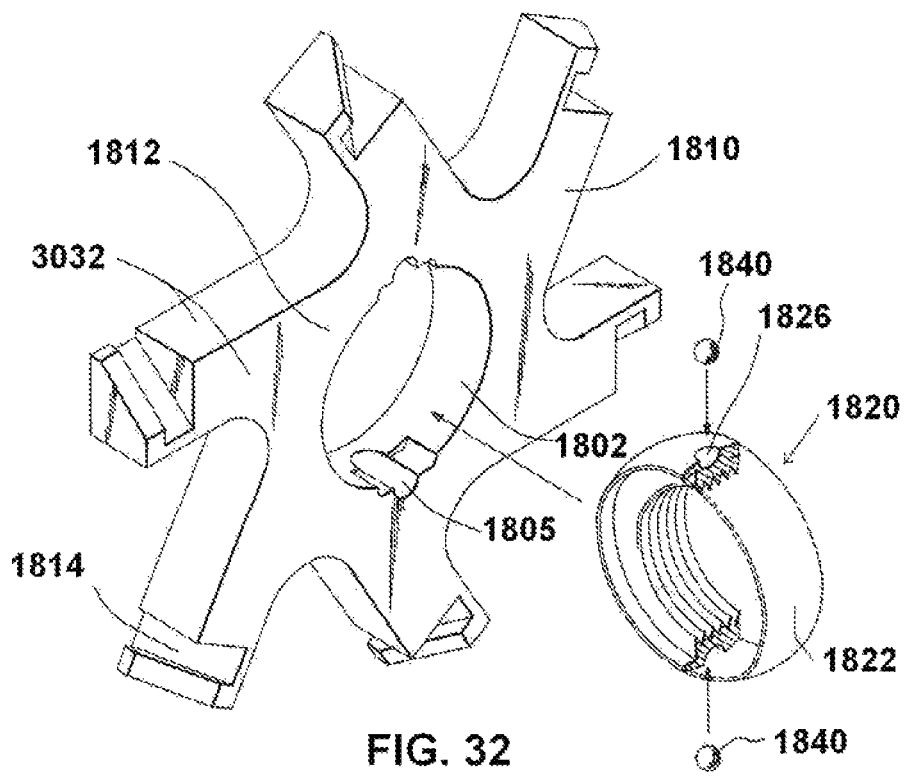
FIG. 32 is a schematic illustration of a comparative flexible cutter hub with exploded view of flexible hub component.

Continuing with FIG. 29, cutter hub 1800 is attached by screwing onto the threaded end of the rotor shaft 2130 of pelletizer 2100. The cutter hub 1800 can be rigidly mounted to the rotor shaft 2130 and can contain a number of cutter arms 1810 in balanced proportion placed circumferentially about the cutter hub 1800 as illustrated in FIG. 32. Alternatively, and preferably, the cutter hub 1800 is flexibly attached to rotor shaft 2130 using an adapter 1820 in which the adapter 1820 is attachedly and threadedly connected to rotor shaft 2130. Adapter 1820 has a partial spherical outer surface 1822 matching a similar partial spherical inner surface bore 1802 in the cutter hub 1800. Diametrically opposed and recessed into the partial spherical inner surface bore 1802 are longitudinal recesses 1805 that extend to the edge of the cutter hub 1800 and into that fit ball 1840. Similarly, diametrical recesses 1826 for ball 1840 are located on adapter 1820 positionally oriented such that longitudinal recess 1805 and diametrical recess 1826 align to interlockingly affix balls 1840 once adapter 1820 is inserted orthogonally into position and rotated to a position parallel to cutter hub 1800. This allows free oscillation of the cutter hub 1800 about the diametrically positioned balls 1840 on fixedly attached adapter 1820 to rotor shaft 2130 that permits rotational self-alignment of the cutter hub 1800.

Figures 33A, 33B, 33C:
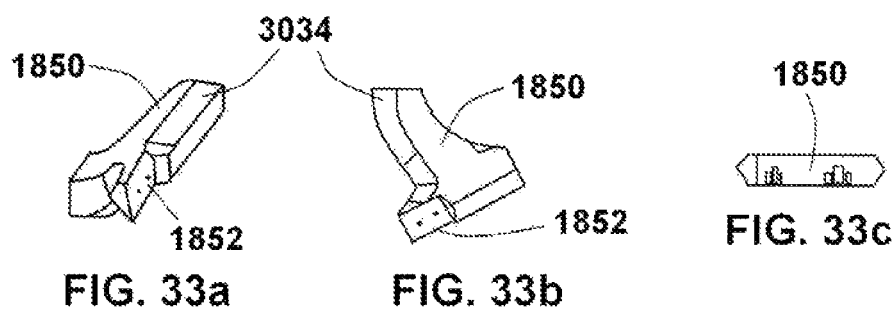

The cutter arms 1810 and body of cutter hub 1812 can be square or preferably rectangular in cross-section as shown in FIG. 32 or can be more streamlined to give an extended hexagonal cross-section as illustrated in FIG. 33c. FIGS. 33a and 33b shows segments of streamline cutter hub 1850. Cutter blades (not shown) are fixedly attached by screw or similar mechanism at flattened angular groove 1814, FIG. 32, or at flattened angular notch 1852, FIGS. 33a and 33b.

Figure 34:
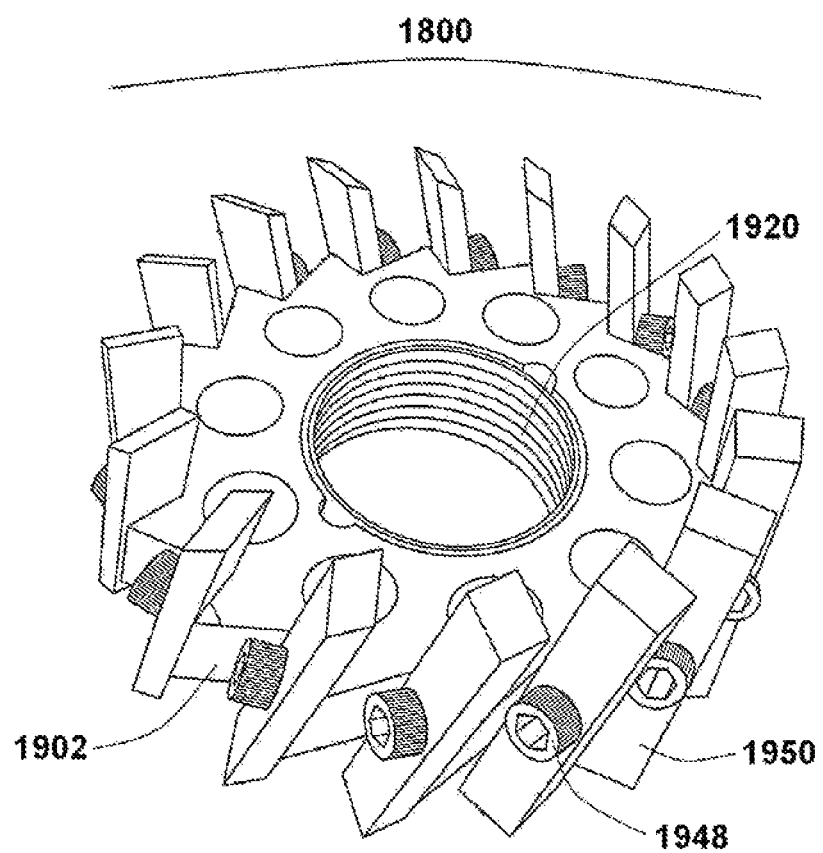
FIG. 34 is a schematic illustration of a steep angle cutter hub.

Alternatively, FIG. 34 illustrates a preferred steep-angle cutter hub 1800, in which cutter arms 1810 as shown in FIG. 29 are optionally replaced by cutter blade support 1902 to which are attached cutter blade 1950 preferably by screw 1948 while other mechanisms are known to those skilled in the art and are not limited as herein described. Adapter 1920 allows self-aligning flexibility with threaded attachment to rotor shaft 2130, FIG. 29, as detailed previously. Other cutter hub designs that are functionally equivalent are within the scope of the present invention as are known to those skilled in the art.

Figure 35A:
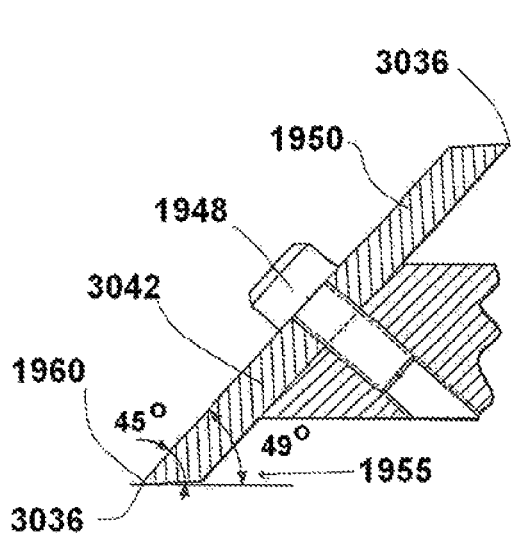
FIG. 35a is a schematic illustration of a comparative cutter hub with attached normal angle blade.
Figure 35B:
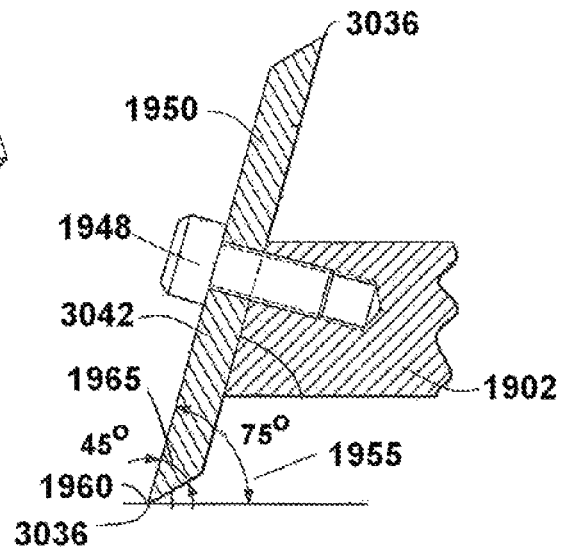
FIG. 35b is a schematic illustration of a steep angle cutter hub with attached blade.
Figure 35C:
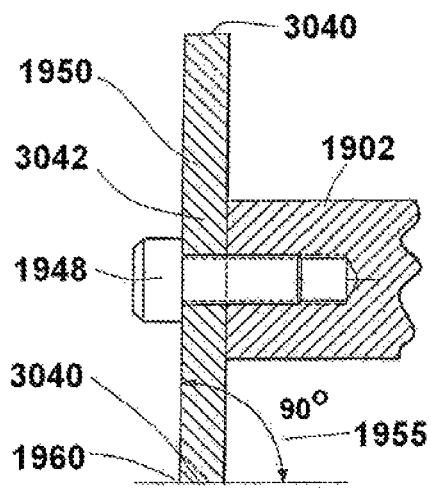
FIG. 35c is a schematic illustration of a comparative perpendicular angle cutter hub with attached non-tapered or square-cut blunted tip blade.
Figure 35D:
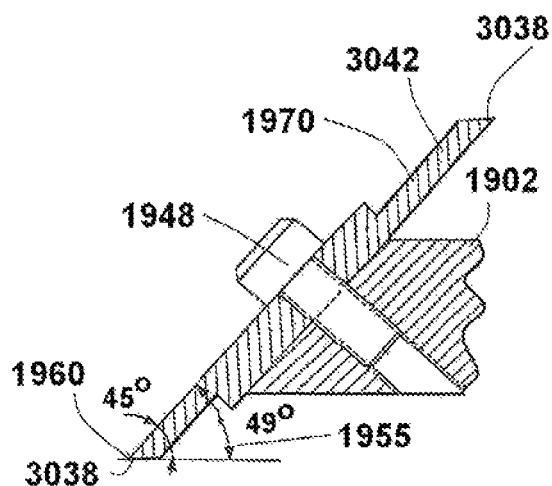
FIG. 35d is a schematic illustration of a cutter hub with attached reduced thickness blade at normal angle.

FIGS. 35a, b, c, and d illustrate various angularly inclined positions and shapes of the cutter blades 1950. The blade angle 1955 can vary from approximately 0° to approximately 110° or greater, FIGS. 35a, b, and c, relative to die hard face 1570, FIGS. 19, 21, 22, 23, 24, and 25, with a blade angle 1955 of between approximately 60° to approximately 79° preferred, FIG. 35b, and a blade angle of approximately 75° more preferred. The blade cutting edge 1960 can be square, beveled, or angled as has been demonstrated by prior art and is preferably at a blade cutting angle 1965 of approximately 20° to approximately 50° and more preferred at approximately 45°. Alternatively, and most preferred, is a half-thickness blade 1970 as illustrated in FIG. 35d that can be similarly attached, similarly angled, and with comparable blade cutting angles and preferences as described above. Additionally, blade designs, dimensionally and compositionally, can prove useful depending on other process parameters.

The cutter blade 1950 and half-thickness blade 1970 compositionally include, but not limited to, tool steel, stainless steel, nickel and nickel alloys, metal-ceramic composites, ceramics, metal or metal carbide composites, carbides, vanadium hardened steel, suitably hardened plastic, or other comparably durable material and can be further annealed and hardened as is well known to those skilled in the art. Wear-resistance, corrosion resistance, durability, wear lifetime, chemical resistance, and abrasion resistance are some of the important concepts influencing the utility of a particular blade relative to the formulation being pelletized. Blade dimensions of length, width, and thickness as well as number of blades used relationally with cutter hub design are not limited within the scope of the present invention.

Returning to FIG. 29, conventional surface treatments to reduce abrasion, erosion, corrosion, wear, and undesirable adhesion and sticture, can be applied to the outer surface 3020 of the exposed portion of the rotor shaft 2130 that extends out from the cutting shroud flange 1666 into cutting chamber 1658 and can be nitrided, carbonitrided, metallized by sintering, and electrolytically plated. The extent of the surface treatment on rotor shaft 2130 is reduced to the portion distal from cutting shroud flange 1666 when flow guide 2000 is utilized to reduce the volume of the cutting chamber 1658 as heretofore described.

Figure 36:
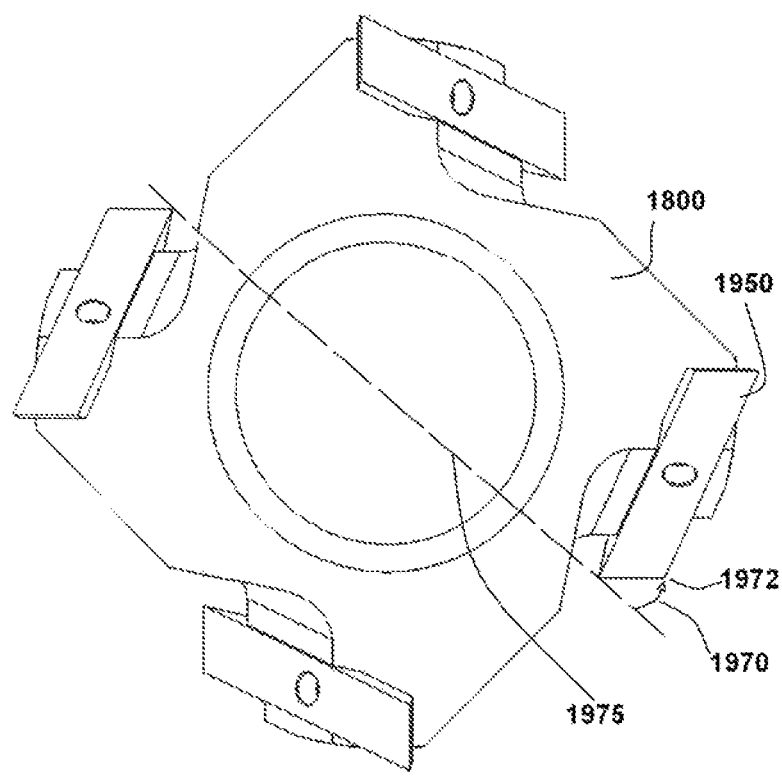
FIG. 36 is a schematic illustration of a cutter hub with cutting angle displaced from centerline of cutter hub.

Alternatively, cutter hubs 1800 as illustrated in FIG. 36 wherein the cutting angle 1970 relative to cutter hub centerline 1975 and distal tip 1972 of blade 1950 can vary from approximately 0° to approximately 60° or greater, preferably from approximately 25° to approximately 55°, and more preferably from approximately 40° to approximately 55° facilitating removal of the pellets from the die face 1610. It is understood that all variants illustrated in FIGS. 32, 33a, b, and c, 34, and 35a, b, c, and d are anticipated in the design of cutter hub 1800 illustrated in FIG. 36.

Similarly, conventional nitriding, carbonitriding, sintering, high velocity air and fuel modified thermal treatments, and electrolytic plating can also be applied to the surfaces of flow guide 2000 (FIG. 30) as detailed in FIGS. 31a and 31b. In particular, the outlet flow surfaces 3022 and 3022a, the inlet flow surfaces 3024 and 3024a, flow guide faces 3026 and 3026a distal from flange 1666 and flow guide faces (not shown) proximal to flange 1666, the flow guide lumen surfaces 3028 and 3028a, and the flow guide circumferential surface 3030 and 3030a. These same conventional treatments can be applied to the cutter hub and arm surfaces 3032 of cutter hub 1812 and cutter arms 1810 detailed in FIG. 32 and to cutter hub and arm surfaces 3034 of variant design cutter hub and cutter arms illustrated in FIGS. 33a and 33b. Cutter blade 1950 and half-thickness blade 1970 illustrated in FIGS. 35a, b, c, d may be similarly treated on the tip surface 3036 in FIGS. 35a and 35b, on tip surface 3038 in FIG. 35d, and edge surface 3040 in FIG. 35c. Alternatively, circumferential blade surface 3042 can optionally be treated conventionally as well. Other surface treatments for improvement of surface properties, enhancement of corrosion and abrasion resistance, improvement of wear, and/or reduction of clumping, agglomeration, and/or sticture can be used without intending to be limited.

FIG. 18 further illustrates the process by which pelletization is done via fluid flow into and through cutting shroud 1600 with subsequent transport of the pellet slurry produced into the bypass loop 1750. A transport fluid for use in the bypass loop 1750 and pellet transportation, is obtained from reservoir 2800 or other sources, and is transported toward the cutting shroud 1600 through pump 1720 that can be of a design and/or configuration to provide sufficient fluid flow into and through the optional heat exchanger 1730 and transport pipe 1735 to and into bypass loop 1750. The heat exchanger 1730 similarly can be of a design of suitable capacity to maintain the temperature of the transport fluid at a temperature appropriately suitable to maintain the temperature of the pellets being formed such that pellet geometry, throughput, and pellet quality are satisfactory without tailing, and where wrap-around of molten material on the cutting face, agglomeration of pellets, cavitation, and/or accumulation of pellets in the cutting shroud 1600 are maximally avoided. Temperatures and flow rates as well as composition of the transport fluid will vary with the material or formulation being processed. Transport medium/fluid temperatures are preferably maintained at least approximately 20° C. below the melting temperature of the material and preferably are maintained at a temperature of between approximately 30° C. to approximately 100° C. below the melt temperature.

Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the transport distance, vertical and horizontal, pressure level needed to suppress unwanted volatilization of components or premature expansion, pellet-transport fluid slurry flow through valving, coarse screening, and ancillary process and/or monitoring equipment. Pellet-to-transport fluid ratios should similarly be of varying proportions to be satisfactorily effective in eliminating or alleviating the above-mentioned complicating circumstances exemplary of which are pellet accumulation, flow blockage or obstruction, and agglomeration. Piping diameter and distances required are determined by the material throughput, thus the flow rate and pellet-to-transport fluid ratio, and time required to achieve an appropriate level of cooling and/or solidification of the pellets to avoid undesirable volatilization and/or premature expansion. Valving, gauges, or other processing and monitoring equipment should be of sufficient flow and pressure rating as well as of sufficient throughpass diameter to avoid undue blockage, obstruction or otherwise alter the process leading to additional and undesirable pressure generation or process occlusion.

Pump 1720 and heat exchanger 1730 in FIG. 18 are prone to abrasion, erosion, corrosion, and wear as well particularly from by-products of the pelletization process, and components (not shown) can optionally be surface treated utilizing conventional nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized as is known to those skilled in the art.

Figure 37:
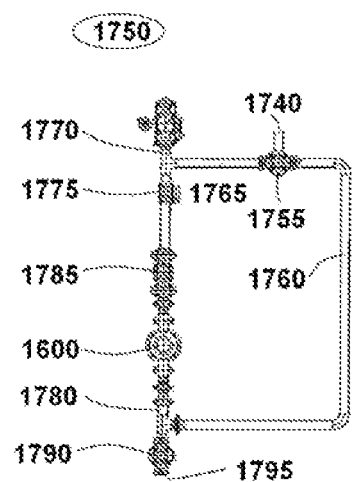
FIG. 37 is a schematic illustration of a comparative bypass.

The standard bypass loop 1750, as illustrated in FIG. 37, allows the transport fluid, preferably water, from inlet pipe 1740 to enter three-way valve 1755 and be redirected into the bypass flow or toward the cutting shroud 1600. To bypass the cutting shroud 1600, the transport fluid is directed by three-way valve 1755 into and through bypass pipe 1765 into outlet pipe 1770. To achieve this, blocking valve 1775 is closed. Alternatively, to allow transport fluid to flow to and through the cutting shroud 1600 the three-way valve 1755 is directed to allow flow into and through pipe 1760 and into pipe 1780 with blocking valve 1775 open and with drain valve 1790 closed. Transport fluid proceeds into and through cutting shroud 1600 and transports pellets into and through sight glass 1785 through blocking valve 1775 and into outlet pipe 1770 for down-stream processing as described below. To drain the system and allow cleaning or maintenance of the cutting shroud 1600 or die hardface 1570 or to replace any of the die 1520 components (FIGS. 19, 23, 25, and 26, for example), three-way valve 1755 directs flow into and through pipe 1765 and into outlet pipe 1770. With blocking valve 1775 now closed and drain valve 1790 open, the transport fluid remaining entrapped below 1775, in components 1785, 1600, 1760, and 1780 drains out drain 1795 for recycling or disposal.

Figure 38:
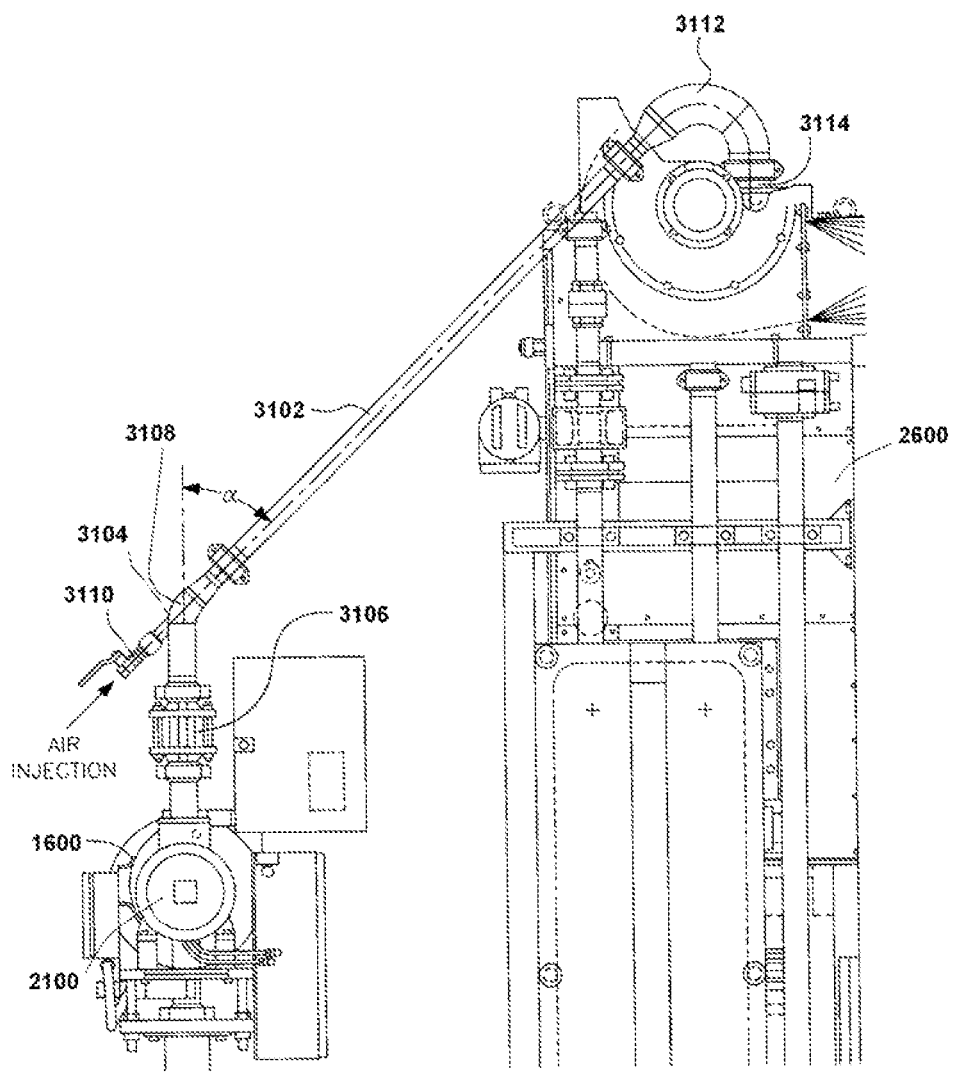
FIG. 38 is a schematic illustration showing the apparatus for inert gas injection into the slurry line from the pelletizer to the dryer.

Referring again to FIG. 18, once the pellet is sufficiently solidified for processing, it is transported via pipe 2470 to and through an agglomerate catcher/fluid removal unit 2500 and into the drying unit 2600, subsequently exiting the dryer for additional processing as described hereunder.

Wherein crystallization of the pellets is a part of the process, the standard bypass loop 1750 is optionally replaced with a direct pathway between the cutting shroud 1600 and the dryer 2600 such that pressurized air can be injected into that pathway as illustrated in FIG. 38. Air, or other inert gas, is injected into the system slurry line 3102 at point 3104, preferably adjacent to the exit from the cutting shroud 1600 and near the beginning of the slurry line 3102. This preferred site 3104 for air injection facilitates the transport of the pellets by increasing the transport rate and facilitating the aspiration of the transport fluid in the slurry, thus allowing the pellets and granules to retain sufficient latent heat to effect the desired crystallization. High velocity air is conveniently and economically injected into the slurry line 3102 at point 3104 using conventional compressed air lines typically available at manufacturing facilities, such as with a pneumatic compressor. Other inert gas including, but not limited to, nitrogen or argon can be used to convey the pellets at a high velocity as described. This high velocity air or inert gas flow is achieved using the compressed gas producing a volume of flow of at least approximately 100 cubic meters/hour using a standard ball valve for regulation of a pressure of at least approximately 8 bar into the slurry line which is standard pipe diameter, preferably approximately 1.6 inch (approximately 4.1 centimeters) pipe diameter.

Figure 39:
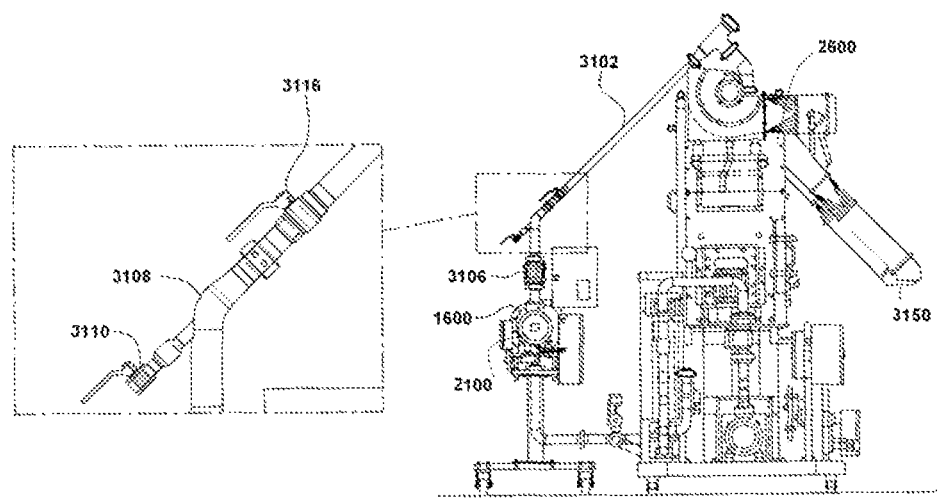
FIG. 39 is a schematic illustration showing the apparatus for inert gas injection into the slurry line from the pelletizer to the dryer including an expanded view of the ball valve in the slurry line.

To those skilled in the art, flow rates and pipe diameters can vary according to the throughput volume, level of crystallinity desired, and the size of the pellets and granules. The high velocity air or inert gas effectively contacts the pellet slurry generating vapor by aspiration, and disperses the pellets throughout the slurry line propagating those pellets at increased velocity into the dryer 2600, preferably at a rate of less than one second from the cutting shroud 1600 to the dryer exit 3150 (FIG. 39). The high velocity aspiration produces a mixture of pellets in an air/gas mixture that may approach approximately 98-99% by volume of air in the gaseous mixture.

FIG. 38 illustrates air injection into the slurry line 3102. The pellet slurry exits the cutting shroud 1600 into the slurry line 3102 through the sight glass 3106 past the angle elbow 3108 where the compressed air is injected from the air-injection inlet valve 3110 through the angled slurry line 3102 and past the enlarged elbow 3112 through and into dryer 2600. It is preferred that the air injection into the angled elbow 3108 is in line with the axis of the slurry line 3102 providing the maximum effect of that air injection on the pellet/water slurry resulting in constant aspiration of the mixture. The angle formed between the vertical axis of slurry line 3102 and the longitudinal axis of said slurry line 3102 can vary from approximately 0° to approximately 90° or more as obviated by the variance in the height of the pelletizer 2100 relative to the height of the dryer inlet 3114 to the dryer 2600. This difference in height can be due to the physical positioning of the dryer inlet 3114 of dryer 2600 in relation to the pelletizer 2100 or can be a consequence of the difference in the sizes of the dryer and pelletizer. A preferred angle range is from approximately 30° to approximately 60° with the more preferred angle being approximately 45°. The enlarged elbow 3112 into the dryer inlet 3114 facilitates the transition of the high velocity aspirated pellet slurry from the incoming slurry line 3102 into the dryer inlet 3114 and reduces the velocity of the pellet slurry into the dryer 2600. The position of the equipment, as shown in FIG. 39, allows transport of the pellets from the pelletizer 2100 to the dryer exit 3150 in approximately one second which minimizes loss of heat inside the pellet. This is further optimized by insertion of a second valve mechanism, or more preferred a second ball valve 3116, after the air-injection inlet valve 3110. This additional ball valve allows better regulation of the residence time of the pellets in the slurry line 3102 and reduces vibration that can occur in the slurry line. The second ball valve 3116 can allow additional pressurization of the air injected into the chamber and can improve the aspiration of the water from the pellet/water slurry. This can become especially important as the size of the pellets and granules decrease in size.

Abrasion, erosion, corrosion, wear, and undesirable adhesion and sticture can be problematic in transport piping as illustrated FIG. 18 for pipe 2470, in FIG. 37 for bypass loop 1750 piping exemplarily including pipes 1740, 1760, and 1765, as well as slurry line 3102 in FIG. 38. These pipes can be manufactured to form short radius and long radius right angles or, alternatively, can be bent to form short radius and long radius sweep angles or curves. Without intending to be bound by theory, it is anticipated that induced stresses can be introduced by such manipulations potentially leading to increased likelihood of wear-related failures due to abrasion, erosion, and/or corrosion, for example. Treatments including nitriding, carbonitriding, sintering, electrolytic plating, electroless plating, thermal hardening, plasma treatments, extrusion, rotational molding or "rotolining", slush molding, and combinations thereof can be utilized to improve the resistance to wear-related processes and to reduce adhesion and sticture. Other surface treatments for improvement of surface properties, enhancement of corrosion and abrasion resistance, improvement of wear, and/or reduction of clumping, agglomeration, and/or sticture can be used without intending to be limited.

The drying unit or dryer 2600, illustrated in FIG. 18, can be many types of apparatus for achieving a controlled level of moisture for materials that can be flake, globular, spherical, cylindrical, or other geometric shapes. It can be achieved, but is not limited by, filtration, vibratory filtration, centrifugal drying, forced or heated air convection, rotational drying, vacuum drying, or a fluidized bed and is preferred to be a centrifugal dryer, and is most preferred to be a self-cleaning centrifugal dryer 2600.

Figure 40:
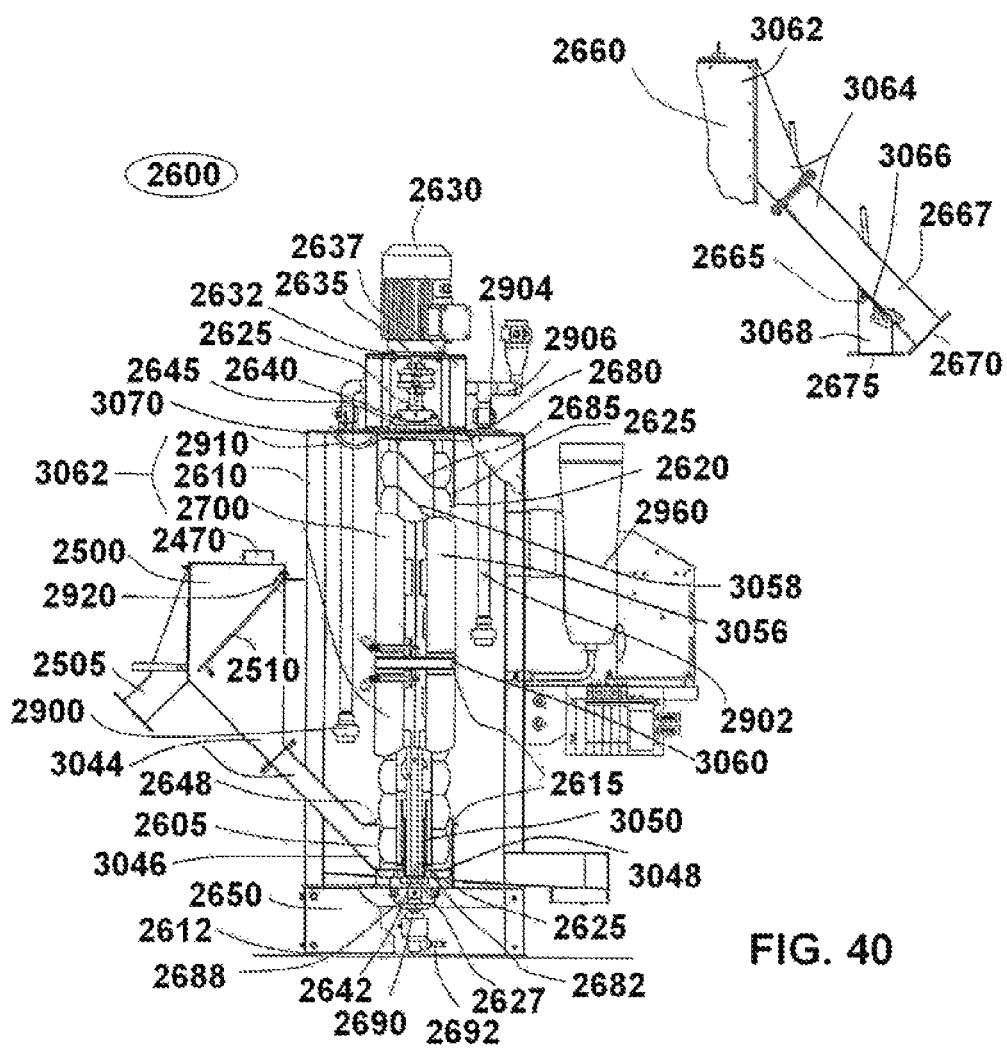
FIG. 40 is a schematic illustration of a comparative self-cleaning dryer.
Figure 41:
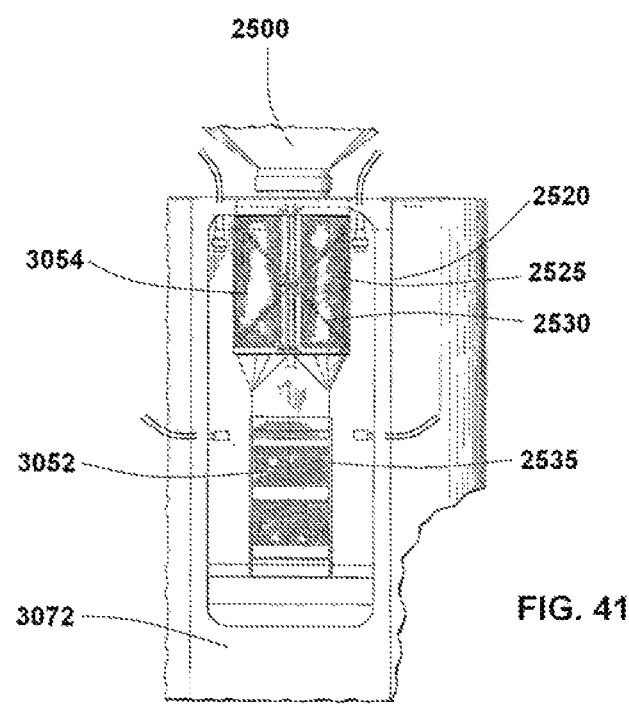
FIG. 41 is a schematic illustration of the fluid removal portion of the self-cleaning dryer in FIG. 40.
Figure 42:
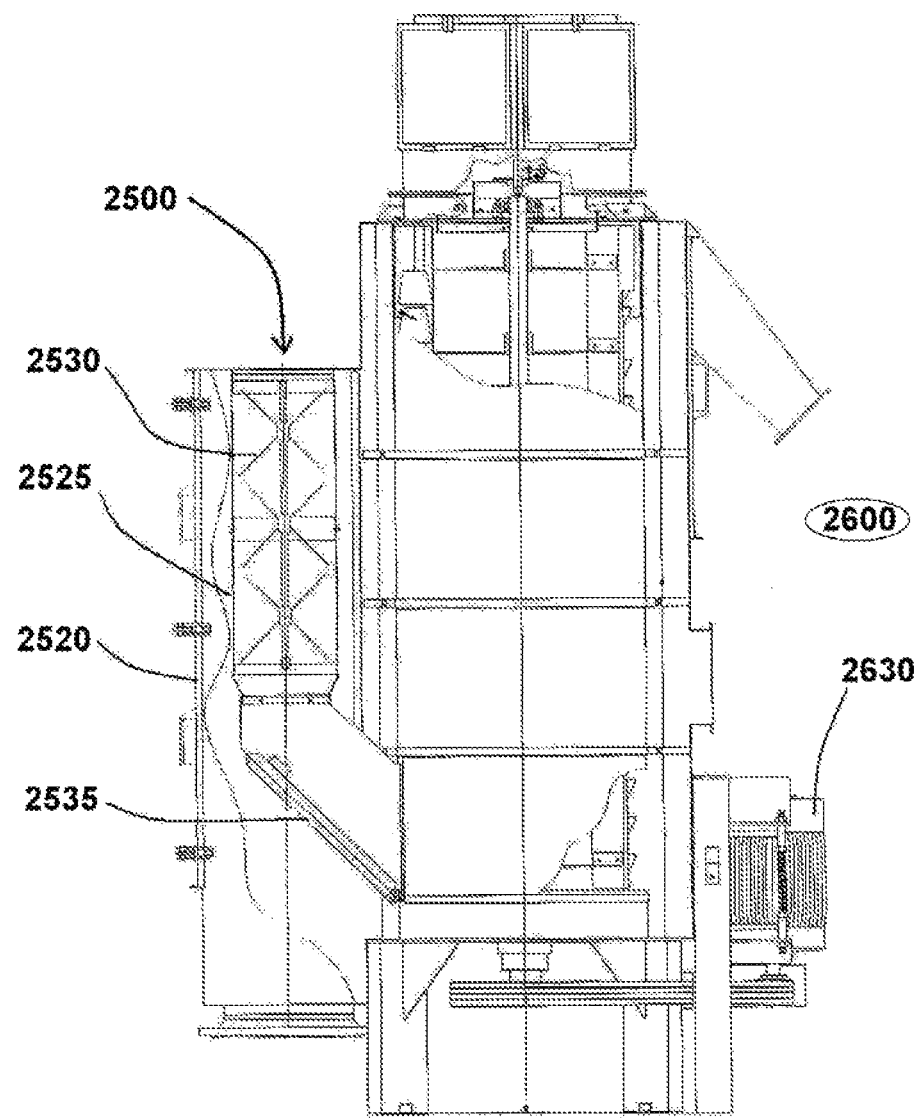
FIG. 42 is a schematic illustration of a second comparative dryer with attached fluid removal section.
Figure 43:
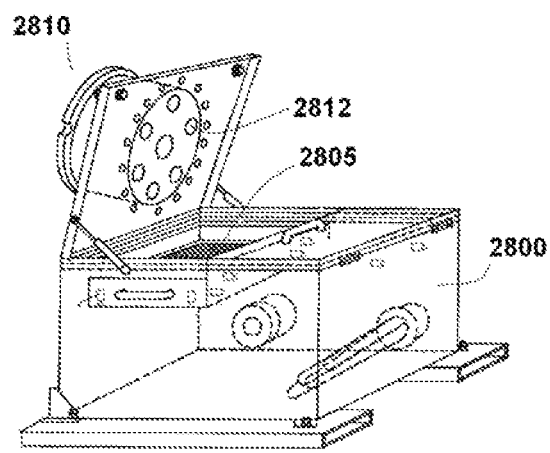
FIG. 43 is a schematic illustration of a reservoir.

Turning now to FIG. 40, the pipe 2470 discharges the pellets and fluid slurry or concentrated slurry into an agglomerate catcher 2500 that catches, removes and discharges pellet agglomerates through a discharge chute 2505. The agglomerate catcher 2500 includes an angled round bar grid, perforated plate or screen 2510 that permits passage of fluid and pellets but collects adhered, clumped, or otherwise agglomerated pellets and directs them toward the discharge chute 2505. The pellets and fluid slurry then optionally pass into a fluid removal device 2520, FIG. 41 with additional detail in FIG. 42, that includes at least one vertical or horizontal foraminous membrane screen 2525 containing one or more baffles 2530 and/or an inclined foraminous membrane screen 2535 that enables fluid to pass downwardly into a fines removal screen 2805 and therethrough to the water reservoir 2800 (FIGS. 18 and 43). The pellets that still retain fluid on their surfaces are discharged from fluid removal device 2520 into the lower end of the self-cleaning centrifugal dryer 2600 at a slurry inlet 2605, FIG. 40.

As illustrated in FIG. 40, the self-cleaning centrifugal pellet dryer 2600 includes but is not limited to a generally cylindrical housing 2610 having a vertically oriented generally cylindrical screen 2700 mounted on a cylindrical screen support 2615 at the base of the screen, and a cylindrical screen support 2620 at the top of the screen. The screen 2700 is thus positioned concentrically within the housing 2610 in radially spaced relation from the inside wall of the housing.

A vertical rotor 2625 is mounted for rotation within the screen 2700 and is rotatably driven by a motor 2630 that can be mounted at and/or connected to the base of the dryer (FIG. 42) or at the top of the dryer and is preferably mounted atop the upper end of the dryer, FIG. 40. The motor 2630 is connected to the rotor 2625 by a drive connection 2635 and through a bearing 2640 connected with the upper end of the housing. The connection 2645 and bearing 2640 support the rotor 2625 and guide the rotational movement of the upper end of the rotor. The slurry inlet 2605 is in communication with the lower end of the screen 2700 and rotor 2625 through the lower screen support section 2650 at connection 2648, and the upper end of the housing and rotor is in communication with a dried pellet discharge chute 2660 through a connection, not shown, in the upper screen support section 2655 at the upper end of the housing. A diverter plate 2665 in outlet 2667 can divert dried pellets out of exit 2670 or exit 2675.

The housing 2610 is of sectional construction connected at a flanged coupling, not shown, at a lower end portion of the dryer and a flanged coupling, not illustrated, at the upper end portion of the dryer. The uppermost flange coupling is connected to a top plate 2680 that supports bearing structure 2640 and drive connection 2635 that are enclosed by a housing or guard 2637. A coupling 2632 atop the housing 2637 supports the motor 2630 and maintains all of the components in assembled relation.

The lower end of the housing 2610 is connected to a bottom plate 2612 on top of a water tank or reservoir 2800 by a flange connection 2810 as illustrated in FIG. 43. Apertures 2812 communicate the lower end of the dryer housing with the reservoir 2800 for discharge of fluid from the housing 2610 into the reservoir 2800 as the surface liquid is removed from the pellets. This removal is achieved by action of the rotor that elevates the pellets and imparts centrifugal forces to the pellets so that impact against the interior of the screen 2700 will remove moisture from the pellets with such moisture passing through the screen and ultimately into the reservoir 2800 in a manner well known in the art.

The self-cleaning structure of the disclosed dryer includes a plurality of spray nozzles or spray head assemblies 2902 supported between the interior of the housing 2610 and the exterior of the screen 2700 as illustrated in FIG. 35. The spray nozzle assembly 2902 is supported at the end of spray pipes 2900 extending upwardly through top plate 2680 at the upper end of the housing with the upper ends 2904 of the spray pipes 2900 being exposed. Hoses or lines 2906 feed high pressure fluid, preferably water at a flow rate of at least approximately 40 gallons per minute and hereinafter, gpm, and preferably about 60 gpm to about 80 gpm, and more preferably at approximately 80 gpm or higher to the spray nozzles 2902. The hoses 2906 can optionally feed off a single manifold (not shown) mounted on the dryer 2600.

There are preferably at least three spray head nozzle assemblies 2902 and related spray pipes 2900 and lines 2906. The spray head nozzle assembly 2902 and pipes 2900 are oriented in circumferentially spaced relation peripherally of the screen 2700 and oriented in staggered vertical relation so that pressurized fluid discharged from the spray head nozzles 2902 will contact and clean the screen 2700, inside and out, as well as the interior of the housing 2610. Thus, collected pellets that have accumulated or lodged in hang-up points or areas between the outside surface of the screen 2700 and inside wall of the housing 2610 are flushed through apertures 2812 into the reservoir 2800, FIG. 43. Similarly, leftover pellets inside the screen 2700 and outside the rotor 2625 are flushed out of the dryer and will not contaminate or become mixed with pellets passing through the dryer during a subsequent drying cycle in that a different type pellet is dried.

The region between the screen support section 2650 at the lower end of the dryer and the inner wall of the housing 2610 includes flat areas at the port openings and seams that connect the components of the dryer housing together. The high pressure fluid from the spray head nozzle assembly 2902 effectively rinses this region as well. The base screen support section 2650 is attached to the bottom plate 2612 of the housing 2610 and reservoir 2800 by screws or other fasteners to stationarily secure the housing and screen to the reservoir 2800. The base screen support section 2650 is in the form of a tub or basin as shown in FIG. 40. Alternatively, in other dryers the base screen support section 2650 can be in the form of an inverted tub or inverted base (not shown).

The rotor 2625 includes a substantially tubular member 2627 provided with inclined rotor blades 2685 thereon for lifting and elevating the pellets and subsequently impacting them against the screen 2700. In other dryers, the rotor 2610 can be square, round, hexagon, octagon or other shape in cross-section. A hollow shaft 2632 extends through the rotor 2625 in concentric spaced relation to the tubular member 2627 forming the rotor. The hollow shaft guides the lower end of the rotor as it extends through an opening 2682 in a guide bushing 2688 at the lower end of the rotor 2625, as well as aligned openings in bottom plate 2612 and the top wall of the reservoir 2800, respectively. A rotary coupling 2690 is connected to the hollow shaft 2632 and to a source of fluid pressure (not shown), preferably air, through hose or line 2692 to pressurize the interior of the hollow shaft 2632.

The hollow shaft 2632 includes apertures to communicate the shaft 2632 with the interior of the hollow rotor member 2627. These holes introduce the pressurized fluid, preferably air, into the interior of the rotor 2625. The rotor 2625 in turn has apertures in the bottom wall that communicate the bottom end of the rotor 2625 with the interior of the base or tub section 2650 to enable the lower end of the rotor 2625 and the tub section 2650 to be cleaned. Pellets flushed from the rotor and inside screen 2700 are discharged preferentially through the dried pellet outlet chute 2660.

The top of the rotor 2625 inside top section 2655 is also a hang-up point and subjected to high pressure fluid, preferably air, to dislodge accumulated pellets. As shown in FIG. 40, a nozzle 2910 directs the high pressure air across the top of the rotor 2625 to drive accumulated pellets out of the top section and preferentially into the pellet outlet chute 2660. The nozzle 2910 is fed by an air hose or line, not shown, that extends through top plate 2680 and is connected to a high pressure air source.

In addition to hang-up points or areas occurring in the dryer structure, the agglomerate catcher 2500 can also be cleaned by a separate pipe or hose 2920 controlled by a solenoid valve that directs high pressure fluid onto the pellet contact side of the angled agglomerate grate or catcher plate and bar rod grid 2510 to clean off agglomerates that are then discharged through the discharge tube or chute 2505.

A hose and nozzle supply bursts of air to discharge chute or pipe 2660 in a direction such that it cleans the top of the rotor 2625 and the pellet discharge outlet 2660. The air discharge blows pellets past pipe connections and the diverter plate 2665 in outlet 2667 for discharge of dried pellets out of the dryer.

The rotor 2625 is preferably continuously turning during the full cleaning cycle. Solenoid valves are provided to supply air preferably at about between 60 psi to 80 psi, or more, to additional hang-up points not shown that include the cutting shroud bypass air port, rotor air ports, top section air port, pellet outlet air port and diverter valve air port. The solenoid valves include timers to provide short air bursts, preferably about three seconds, which cleans well and does not require a lot of time. A clean cycle button (not shown) activates the cleaning cycle with the cutting shroud bypass air port being energized first to allow air to purge the bypass with a multiplicity of air bursts, preferably five or more. The top section air port is then activated. This is followed sequentially with activation of the diverter plate 2665. This valve closes prior to activation of the spray nozzle assembly 2902 that washes the screen for one to ten seconds, preferably about six seconds. The blower 2960 should be deactivated during the fluid spray cycles and is then reactivated when the spray nozzle pump is de-energized thus completing one cleaning cycle. The cycle as herein described is not limited in scope and each component of the cycle can be varied in frequency and/or duration as necessitated to achieve appropriate removal of the residual pellets.

Blower 2960 in FIG. 18 is prone to abrasion, erosion, corrosion, and wear from by-products of the pelletization process as well as from the impact and/or adhesion of pellets on the surface of blower components, not shown, and can optionally be surface treated utilizing conventional nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized as is known to those skilled in the art.

Figure 44:
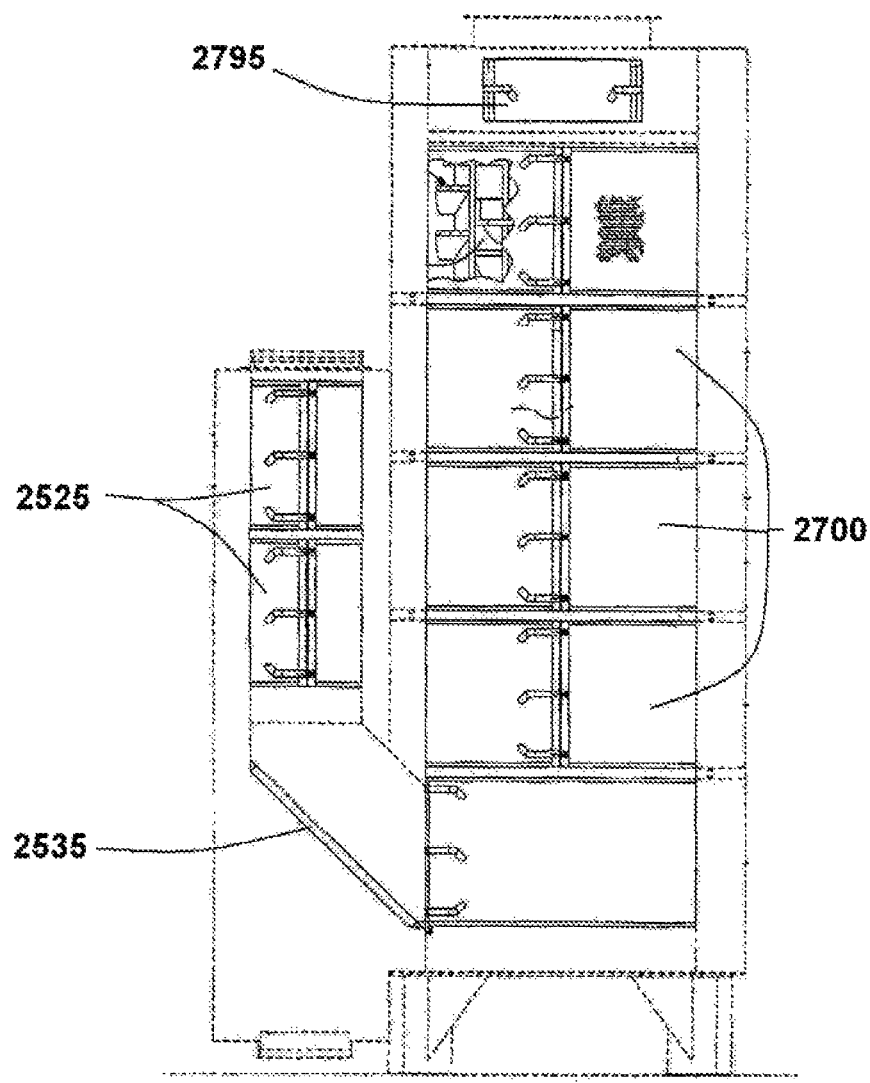
FIG. 44 is a schematic illustration of a dryer showing fluid removal screen and centrifugal drying screen positioning.

The screens for the process include none, one or more horizontal or vertical dewatering screens 2525, inclined dewatering screen 2535, port screens 2795, and/or one or more cylindrically attachable screens 2700 as illustrated in FIG. 44. The size, composition, and dimensions of the screens should accommodate the pellets being generated and can be perforated, punched, pierced, woven, or of another configuration known to those skilled in the art and can be the same or different in construction, composition, and style. As the pellet size decreases in diameter, preferably the screens will be composed of two or more layers that can be of similar or different composition, design, and size. The screens are fixedly attached by latches, clamps, bolts, and many other mechanisms appropriately understood by those skilled in the art.

Figures 45, 46:
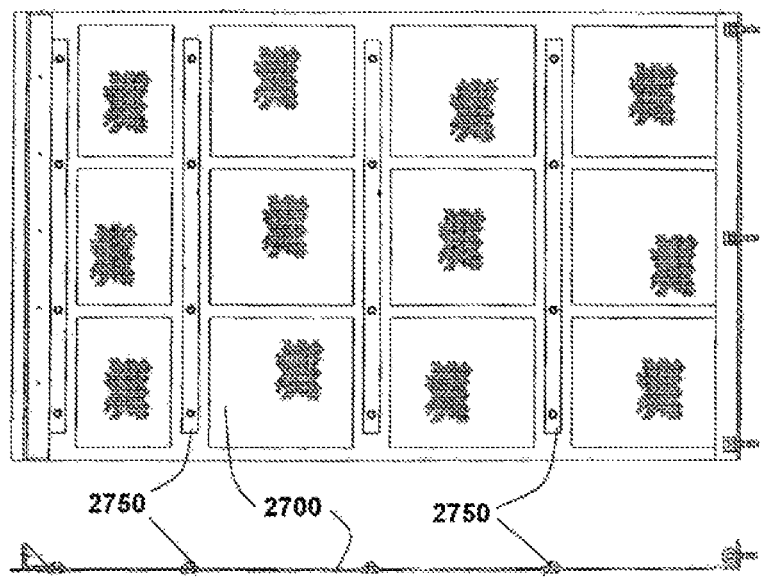
FIG. 45 illustrates a dryer screen with deflector bars.
FIG. 46 is a cross-sectional illustration of the screen with deflector bars in FIG. 45.
Figures 47, 48:
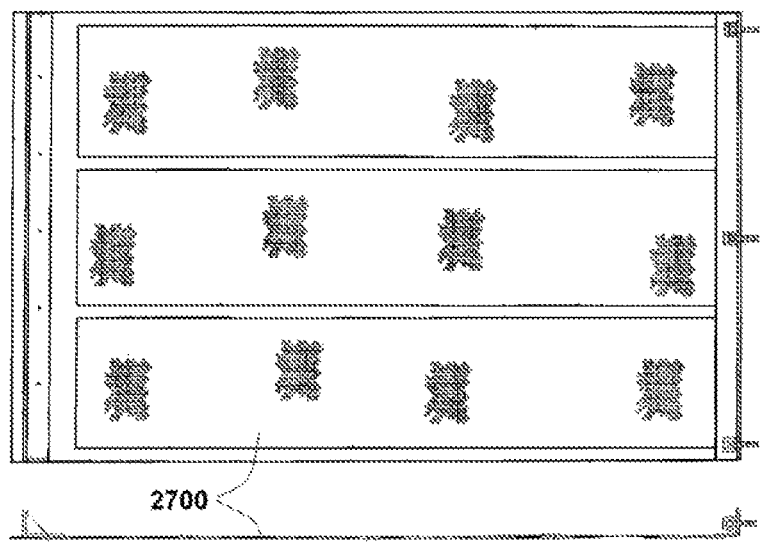
FIG. 47 illustrates a dryer screen of a configuration not requiring deflector bars.
FIG. 48 is a cross-sectional illustration of the dryer screen of FIG. 47 without deflector bars.
Figure 49:
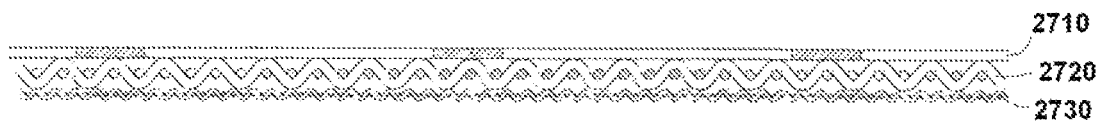
FIG. 49 illustrates an enlarged edge-on view of a three-layer screen.
Figure 50:
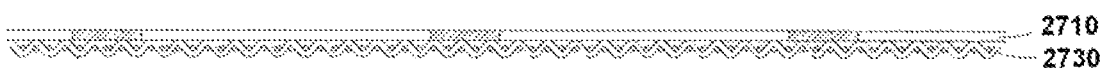
FIG. 50 illustrates an enlarged edge-on view of a two-layer screen.
Figure 51:
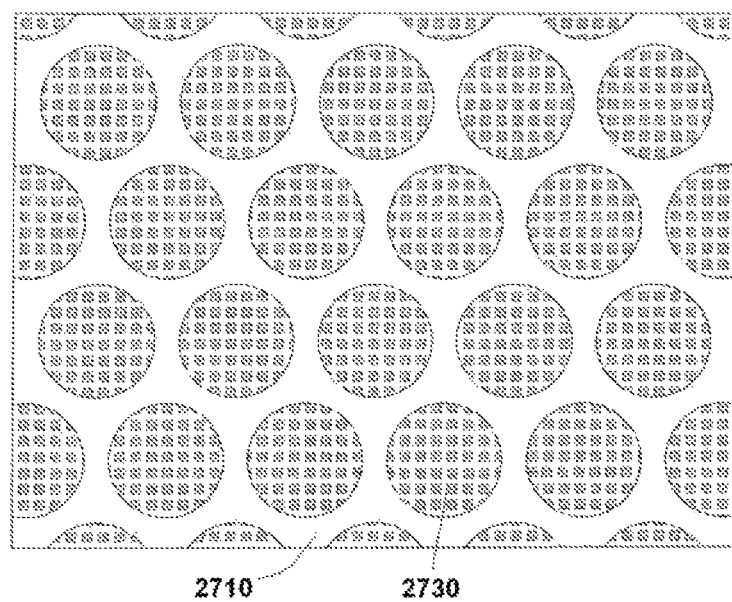
FIG. 51 illustrates an enlarged external view of a multi-layer screen following FIG. 50.

The screens 2700 are preferably of suitably flexible construction as to be circumferentially placed around the dryer 2600 and rotor 2625, and can contain deflector bars 2750 as illustrated in FIG. 45, face view, and FIG. 46, edge view, that are bolted in placed effectively segmentalizing the screen area into approximately equal areas. Alternatively, the screens can by free of deflector bars as seen in the face view of FIG. 47 with an edge view illustrated in FIG. 48. Preferably, screens 2700 are compositionally two or more layers functionally incorporating an outer support screen and an inner screen that accomplishes the effective drying of the pellets and smaller micropellets. Additionally, one or more screen layers can be sandwiched between the outer support screen and the inner screen depending upon the particular application. FIG. 49 illustrates an edge view of a three-layer composition and FIG. 50 illustrates a similar edge view of a two-layer composition. FIG. 51 illustrates a surface view of a three-layer screen composition in that the view is from the side of the support layer through which is visualized the finer mesh screen layers.

The outer support screen 2710 can be composed of molded plastic or wire-reinforced plastic and compositionally can be polyethylene, polypropylene, polyester, polyamide or nylon, polyvinyl chloride, polyurethane, or similarly inert material that capably maintains its structural integrity under chemical and physical conditions anticipated in the operation of the centrifugal pellet dryers. Preferably, the outer support screen 2710 is a metal plate of suitable thickness to maintain the structural integrity of the overall screen assembly and flexible enough to be contoured, exemplarily cylindrically, to fit tightly and positionally in the appropriate centrifugal pellet dryer. The metal plate is preferably 18 gauge to 24 gauge and most preferably is 20 to 24 gauge in thickness. The metal can compositionally be aluminum, copper, steel, stainless steel, nickel steel alloy, or similarly non-reactive material inert to the components of the drying process. Preferably, the metal is stainless steel and most preferably is Grade 304 or Grade 316 stainless steel as necessitated environmentally by the chemical processes undergoing the drying operation.

The metal plate can be pierced, punched, perforated, or slotted to form openings that can be round, oval, square, rectangular, triangular, polygonal, or other dimensionally equivalent structure to provide open areas for separation and subsequent drying. Preferably, the openings are round perforations and geometrically staggered to provide the maximum open area while retaining the structural integrity of the outer support screen. The round perforations are preferably at least approximately 0.075 inches (approximately 1.9 mm) in diameter and are positionally staggered to provide an open area of at least approximately 30%. More preferred is an open area geometric orientation such that the effective open area is approximately 40% or more. Most preferred are round perforations having a diameter of at least approximately 0.1875 inches (approximately 4.7 mm) that are positionally staggered to achieve an open area of approximately 50% or more.

Alternatively, the outer support screen can be an assembled structure or screen composed of wires, rods, or bars, stacked angularly or orthogonally, or interwoven, and welded, brazed, resistance welded or otherwise permanently adhered in position. The wires, rods, or bars can be plastic or wire-reinforced plastic compositionally similar to the molded plastic described above or can be metal, similarly and compositionally delineated as above and can be geometrically round, oval, square, rectangular, triangular or wedge-shaped, polygonal or structurally similar. The wires, rods, or bars across the width or warp of the screen can be the same as or different dimensionally as the wires, rods, or bars longitudinally contained as the weft, shute, or otherwise known to those skilled in the art.

Preferably, the wires, rods, or bars are a minimum of approximately 0.020 inches (approximately 0.5 mm) in the narrowest dimension, more preferably are at least approximately 0.030 inches (approximately 0.76 mm) in the narrowest dimension, and most preferably are approximately 0.047 inches (approximately 1.2 mm) in the narrowest dimension. Open areas are dimensionally dependent on the proximal placement of adjacent structural elements and are positionally placed so as to maintain a percent open area of at least approximately 30%, more preferably above approximately 40%, and most preferably approximately 50% or greater.

The optional middle screen 2720 or screens and the inner screen 2730 are structurally similar to that described herein for the outer support screen. Dimensionally and compositionally the screens in the respective layers can be similar or different. The percent open area of the respective screens can be similar or different wherein lesser percent open area will reduce the effective open area of the screen and the least percent open area will be the most restrictive and therefore the delimiting percent open area for the screen assembly. The orientation of any screen relative to other layers of the assembly as well as the dimension and structural composition of the screens can be similar or different.

The inner screen 2730 is preferably a woven wire screen that can be in a square, rectangular, plain, Dutch or similar weave wherein the warp and weft wire diameters can be the same or different dimensionally or compositionally. More preferably the inner screen is a plain square or rectangular weave wire screen wherein the warp and weft wires are similar compositionally and dimensionally and the open area is approximately 30% or greater. Even more preferably, the inner layer screen is plain square or rectangular 30 mesh or larger mesh grade 304 or grade 316 stainless steel wherein the warp and weft wires are of a size to allow at least approximately 30% open area and most preferably are approximately 50% open area. Still more preferred is an inner screen of a plain square or rectangular weave of 50 mesh or greater mesh, with a percent open area of approximately 50% or greater. If incorporated, the middle screen 2720 would be of a mesh intermediate between the support screen 2710 and the inner screen 2730, and can be similar or different structurally, geometrically, compositionally, and orientationally. The two-layer screen is a preferred composition as delineated in the disclosure.

Returning to FIG. 40, conventional surface treatments to reduce abrasion, erosion, corrosion, wear, and undesirable adhesion and sticture to many parts of dryer 2600 can be nitrided, carbonitrided, sintered, can undergo high velocity air and fuel modified thermal treatments, and can be electrolytically plated. Exemplary of these dryer components can be included the inner surface of the upper feed chute 3044, the inner surface of the lower feed chute 3046, the inner surface of the baseplate assembly 3048, the exterior surface of the pipe shaft protector 3050, the surface of the feed screen 3052 and the surface of the fluid removal screen 3054 (FIG. 41), the surface of the screen assemblies 3056, the surface of the lifter assemblies 3058, the exterior surface of the support ring assemblies 3060, the inner surface of the upper portion of dryer housing 3062, the inner surface of the pellet chutes 3064 and 3068, and the exterior surface of the pellet diverter plate 3066. Components of blower 2960 similarly can be treated as is understood by those skilled in the art. Other surface treatments for improvement of surface properties, enhancement of corrosion and abrasion resistance, and improvement of wear can be used without intending to be limited.

Pellets dried by the process illustrated in FIG. 18 can be transported for post-processing section 13, not shown, or can be directed into a hopper 3200 for additional processing including crystallization and will be described hereinbelow.

Figure 52:
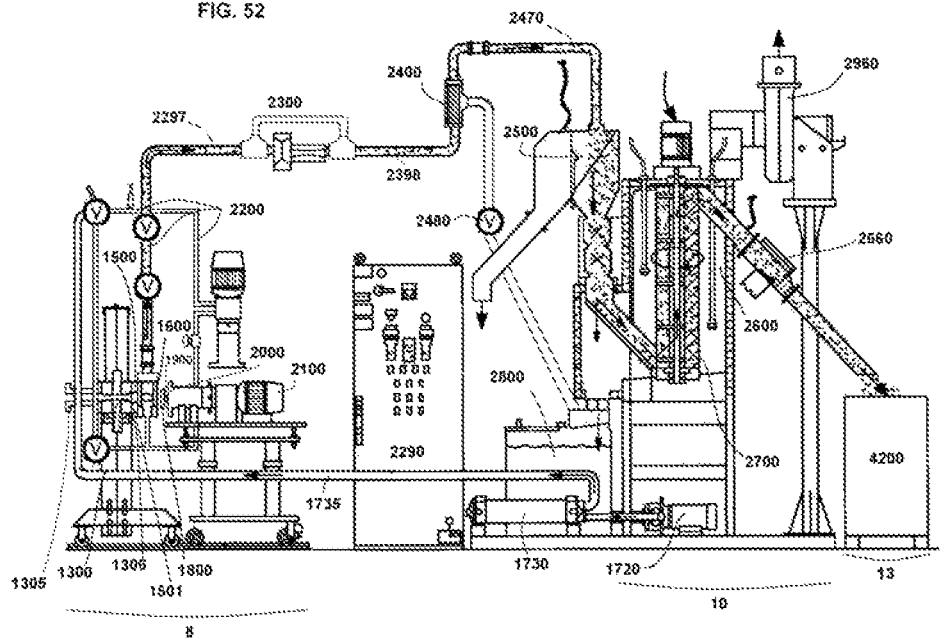
FIG. 52 is a schematic illustration of an apparatus for pelletization, pressurized transport, fluid removal, drying, and a post-processing section.
Figure 53:
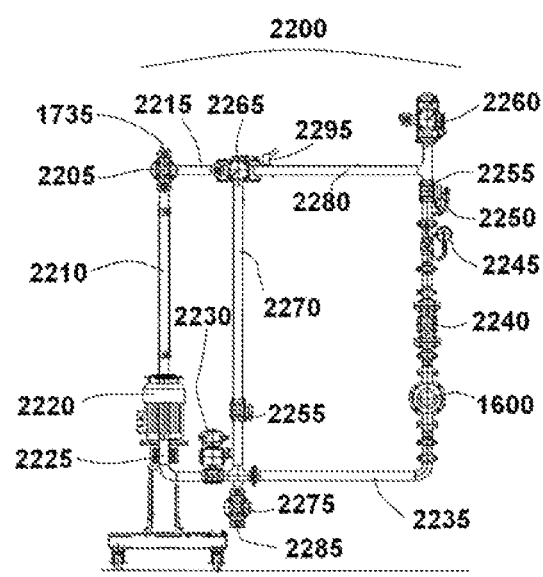
FIG. 53 is a schematic illustration of a multiple loop pressurized transport fluid bypass.

Alternative to the standard transport process, FIG. 18 and detailed in FIG. 37, and the accelerated transport process, FIGS. 38 and 39, as described above and to maintain pressure essential to impregnation of the pellets and/or avoidance of loss of volatiles, is the pressurized bypass 2200, as illustrated in FIG. 52 and detailed in FIG. 53. Transport fluids are supplied from inlet pipe 1735 into inlet three-way valve 2205. Flow may be directed through pipe 2210 for pressurization or, alternatively, to pipe 2215.

Pressurization is achieved on flow through pipe 2210 by passing fluid into and through pressure pump 2220 to pipe 2225 and through exhaust valve 2230 with flow blocked by bypass three-way valve 2265. The pressurized fluid passes through pipe 2235 into and through cutting shroud 1600 and transports pellets through an appropriately pressure-rated sight glass 2240 and sequentially by pressure gauge 2245 and vacuum break check valve 2250 with blocking valve 2255 open allowing the pellet/fluid slurry to pass through outlet 2260 for further processing as described below. To achieve this, drain valve 2275 is closed.

Alternatively, standard flow is achieved analogous to the comparative process detailed above whereby inlet three-way valve 2205 directs flow through pipe 2215 into bypass three-way valve 2265 which directs the standard flow through pipe 2270 into and through pipe 2235 into cutting shroud 1600 and transports pellets through an appropriately pressure-rated sight glass 2240 and sequentially by pressure gauge 2245 and vacuum break check valve 2250 with blocking valve 2255 open allowing the pellet/fluid slurry to pass through outlet 2260 for further processing as described below. To achieve this, drain valve 2275 is closed and pressure pump 2220 is effectively bypassed.

Draining of the system occurs when inlet three-way valve 2205 directs flow into pipe 2215 and bypass three-way valve directs flow into pipe 2280 with blocking valve 2255 closed and drain valve 2275 open. Flow into the system is effectively drained through outlet 2285 for recycling or disposal.

The pressurization loop and cutting shroud 1600 are effectively bypassed by closing blocking valve 2255 and directing flow by inlet three-way valve 2205 into and through pipe 2215 and into bypass three-way valve 2265 which redirects flow through pipe 2280 and through outlet 2260. Control of switching mechanisms and power regulation and distribution are provided through one or more appropriately interfaceable electrical panels 2290, FIGS. 18 and 52, as is well understood by those skilled in the art. Air nozzle 2295 allows bursts of air to be introduced during cleaning cycles as described below which effectively remove pellets which may become lodged in pipe 2280 during operation in which flow proceeds through the cutting shroud 1600 and the pellet/fluid slurry produced is propagated through the appropriate apparatus to outlet 2260 as detailed in the foregoing discussion.

Pressurized flow, greater than atmospheric pressure, preferably five bar or greater, and most preferably 10 bar, passes from outlet 2260 (FIG. 53) into pipe 2297 (FIG. 52) which must be capable of maintaining the requisite pressure and must be of length and diameter appropriate to transport the pellet/fluid slurry mixture at throughput rates, temperature, and volumes necessary for the process. The length of pipe and composition must be such that maintenance of temperature or cooling as required by the process is achieved.

Figure 54:
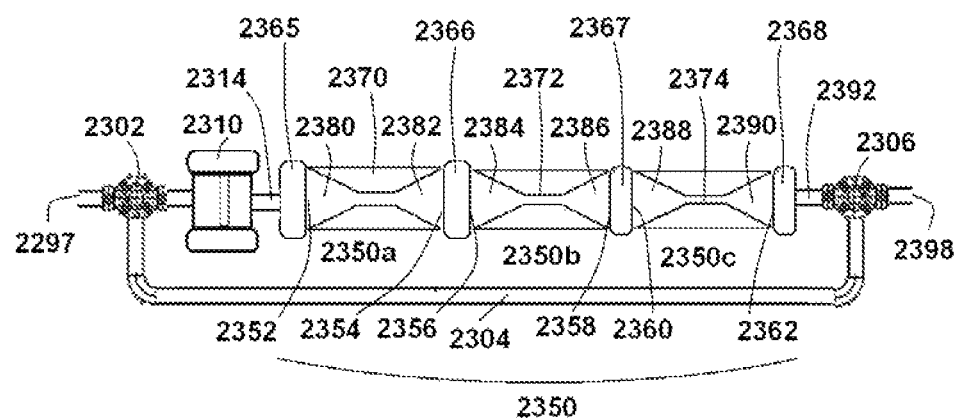
FIG. 54 is a schematic illustration of an inline pressure generation unit comprising a bypass loop, agglomerate filtration basket and three biconical devices in a series of decreasing diameter flow restriction tubes.

According to the present invention, the pipe 2297 is of sufficient length to require one or more pressure supplement devices 2300 as shown positionally in FIG. 52. Pipe 2297 is connected to optional inlet three-way valve 2302 as illustrated in FIG. 54 which directs the pellet/fluid slurry through bypass line 2304 into outlet three-way valve 2306 and into pipe 2398 effectively serving as a bypass to the pressure supplement device components. Alternatively, the pellet/fluid slurry is directed by inlet three-way valve 2302 into and through basket filter 2310 (see FIG. 55) into one or more conical devices 2350 (illustrated in FIG. 56 and detailed below), preferably two or more in series, in which the flow channel is alternately reduced and enlarged diametrically to expedite the desired level of pressurized flow through the system, a phenomenon described by the well-known Bernoulli effect to those skilled in the art. Flow out of the conical devices passes into and through the outlet three-way valve 2306 and into pipe 2398.

Figure 55:
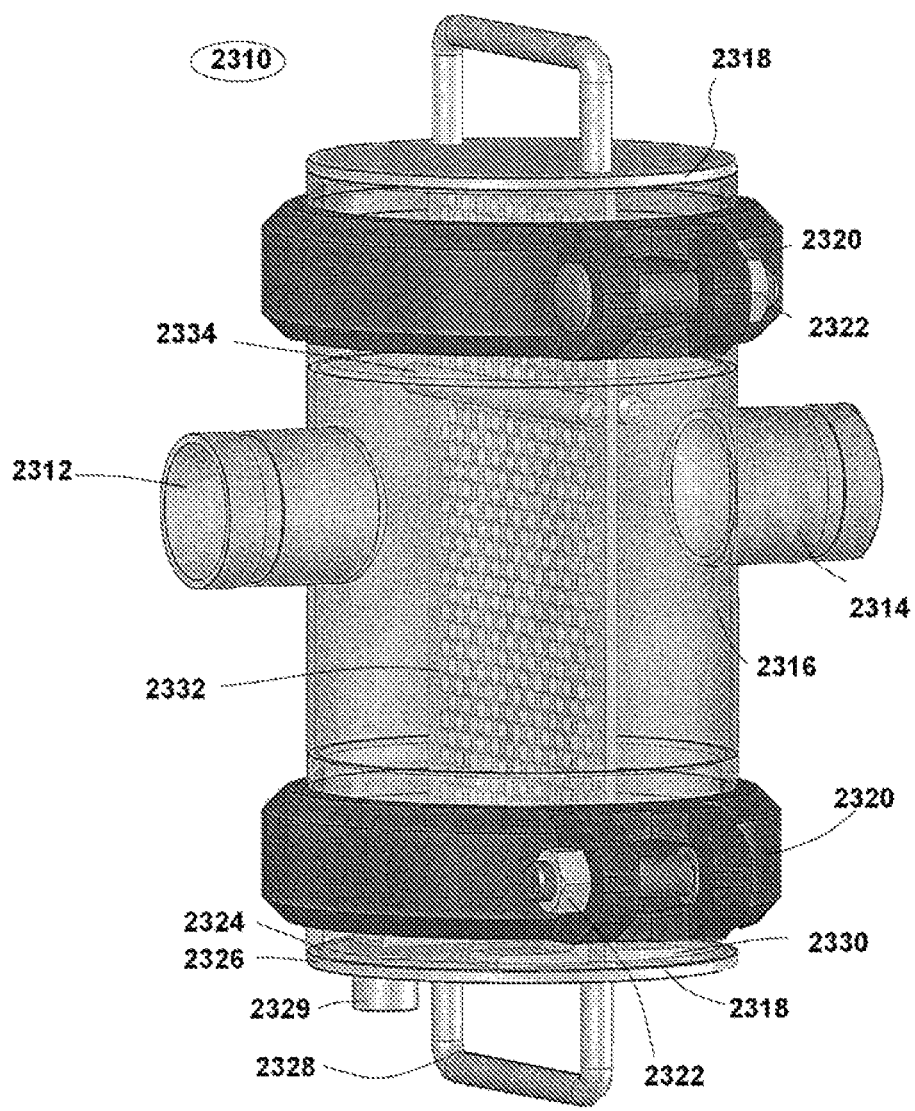
FIG. 55 is a schematic illustration of the slurry line filtration basket of FIG. 54.

Referring now to FIG. 55, basket filter 2310 has fluid inlet pipe 2312 which is diametrically opposed to fluid outlet pipe 2314 attached to cylindrical housing 2316 which is of a height and diameter appropriate to accommodate the throughput rate and volume required by the process. The housing 2316 has a top and bottom endcap 2318 of comparable diameter which are sealingly attached by clamps 2320 and tightened securely by bolt 2322 or equivalent mechanism. Gaskets and/or other sealing materials may be used to prevent loss of fluid or diminution of pressure as is understood by those skilled in the art.

Endcap 2318 is composed of a cylindrical pipe section 2324 of equivalent diameter to housing 2316 which is sufficiently wide to be attached by clamp 2320. Fixedly attached to cylindrical pipe 2324 is cover plate 2326, of equivalent outer diameter, and handle 2328. To the opposite face of cover plate 2326 are fixedly attached flanges 2330 which are spaced at a distance apart sufficient to allow basket screen 2332 to insert and be held tightly in place and drain 2329.

The basket screen 2332 is equivalent in length to the distance between the top and bottom cover plates 2326 and of equivalent width to the inner diameter of cylindrical housing 2316. The thickness must be sufficient to withstand the flow velocity and pressure of the process and is preferably 18 Gauge or approximately 0.047 inches or approximately 1.2 millimeters. The screen may be woven, punched, perforated, or pierced and is preferably a perforated plate which may be steel, stainless steel, nickel or nickel alloy, plastic or other appropriate durable material and is most preferably a perforated stainless steel plate in which the maximum perforation is of comparable diameter to the smallest diameter of the conical device or devices 2350 as described below. Fixedly attached to cylindrical housing 2316 are two, and preferably four, rollers 2334 which are placed such that the basket screen 2332 fits tightly between them and is free to be removed for cleaning. Rollers 2334 are of sufficient length to traverse the diameter of the cylindrical housing 2316 at the attachment points and are positioned at a distance from the cover plate 2326 at a distance greater than is the length of cylindrical pipe 2324. Rollers preferably are comparably positioned at equivalent distance from both the top and bottom cover plates 2326.

Figure 56:
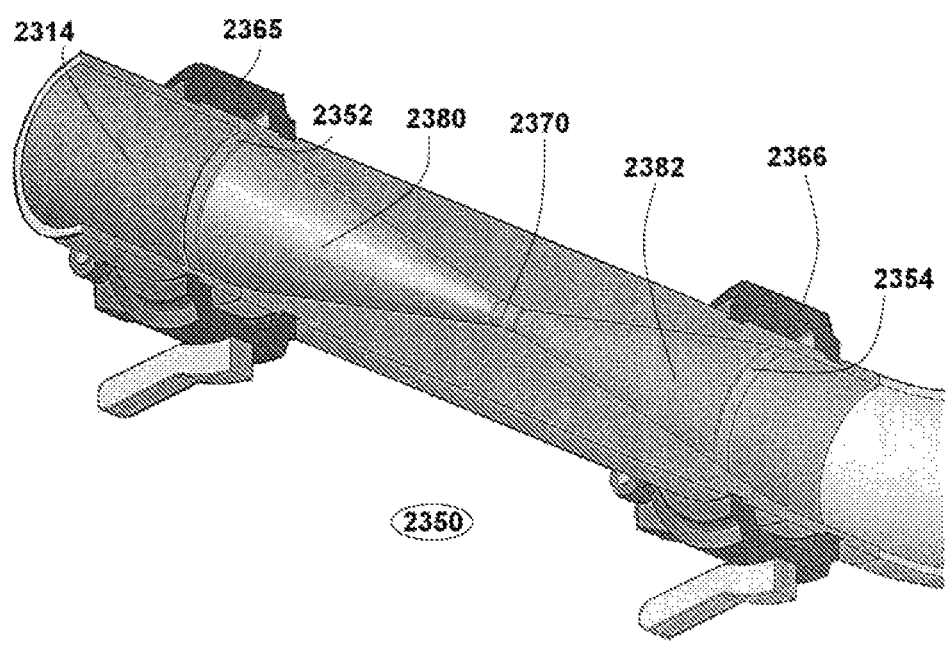
FIG. 56 is a schematic illustration of one biconical device of FIG. 54.

The conical, biconical, or hyperboloid device or devices, and preferably conical device or devices 2350 comprise a cylinder with inlet 2352 diametrically of common dimension as fluid outlet pipe 2314 as shown in FIG. 56. The taper 2380 may begin at the inlet 2352 or, alternatively, may begin at a distance appropriate to allow appropriate pressure and decreases diametrically to that of the cylindrical constriction 2370. This cylindrical constriction 2370 is of diameter and length sufficient to create an appropriate pressure for the process and connects with taper 2382 which increases diametrically for an appropriate length to outlet 2354 which may be the same or different in diameter than inlet 2352. Where only one conical device 2350 is utilized, outlet 2354 is attached to outlet pipe 2392 (FIG. 54) which is equivalent in diameter to outlet 2354.

Preferably, two or more conical devices are used, and most preferably three are used in series as illustrated in FIG. 54, in which the diameters of the cylindrical constrictions 2370, 2372, and 2374 may be of the same or different diameter and/or length as necessitated by process conditions. The length of cylindrical constrictions 2370, 2372, and 2374 may be from zero inches, essentially a point, to any lengths less than that of the entire length of the conical device 2350. The lengths of each conical device 2350 may be the same or different, and they are separately identified as 2350*a*, 2350*b*, and 2350*c* in FIG. 56 for clarification of illustration. Similarly, the inlets 2352, 2356, and 2360 may be equivalent or different diameters and lengths as can be outlets 2354, 2358, and 2362. Tapers 2380, 2384, and 2388 may be the same or different in length and degree of taper to cylindrical constrictions 2370, 2372, and 2374, respectively. Tapers 2382, 2386, and 2390 increase in diameter from cylindrical constrictions 2370, 2372, and 2374, respectively and increase diametrically to that of outlet 2354, 2358, and 2362, respectively with lengths and degree of taper appropriate to satisfy the process requirements.

Preferably, conical devices 2350*a*, 2350*b*, and 2350*c* are identical in overall length in which cylindrical constriction 2370 is diametrically larger than cylindrical constriction 2372 which is larger than cylindrical constriction 2374 whose lengths may vary as necessitated for optimization of pressurization and flow. Inlet 2352 must be comparable to outlet pipe 2314 diametrically. Similarly, outlet 2354 and inlet 2356 are diametrically equivalent as are outlet 2358 and inlet 2360, outlet 2362 and outlet pipe 2392. All conical devices 2350 are clamped in place and preferably are clamped by quick disconnects as illustrated in FIG. 54 for clamps 2365, 2366, 2367, and 2368 which are sized appropriately for the diameters of the respective conical device 2350 or conical devices 2350*a*, 2350*b*, and 2350*c* which may be dissimilar or are preferably equivalent diametrically.

Outlet pipe 2392 connects to outlet three-way valve 2306 where the aforementioned bypass is utilized or directly to pipe 2398 for downstream processing in its absence. Pipe 2398 must be of suitable length and diameter to accommodate the volume flow rate and throughput for the process and to allow cooling of the pellets to achieve a sufficient level of outer shell formation to complete solidification to allow downstream dewatering, drying, and post-processing with minimal or no loss of volatiles and/or without unwanted or premature expansion.

Figure 57A:
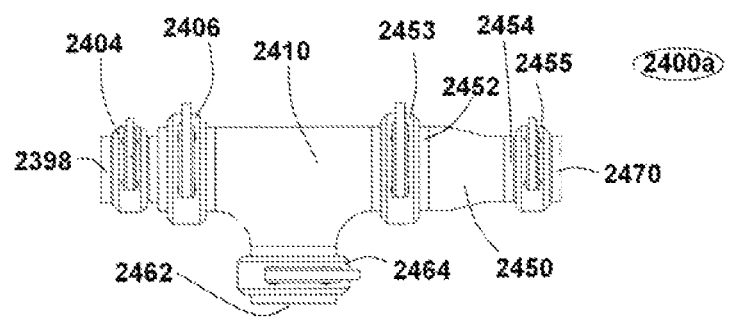
FIG. 57a is a schematic illustration of a pressurized fluid removal device.

Once the pellet is sufficiently solidified for processing, it is transported via pipe 2398 optionally to and through a pressurized fluid removal device 2400 or directly to and through an agglomerate catcher/dewatering unit 2500 and into the drying unit 2600 as illustrated in FIG. 52. The pressurized fluid removal device 2400 is attachedly connected to pipe 2398 at inlet 2402 as shown in FIGS. 57*a* and *b*. Inlet 2402 is fittingly attached to housing 2410 which are clamped in position preferably by quick disconnect clamps 2404 and 2406 respectively. The housing 2410 is connected at outlet 2412 to reducing pipe 2450 longitudinally and distally positioned relative to inlet 2402 and clamped as before, preferably with quick disconnect clamp 2453. Dewatering outlet 2460 is orthogonally positioned relative to inlet 2402 and is attachedly connected to dewatering pipe 2462 by clamp 2464, preferably quick disconnects as above.

Within housing 2410, preferably larger in diameter than pipe 2398, is cylindrical screen element 2420 which is of at least comparable inner diameter as are inlet 2402 and/or outlet 2412 and preferably is slightly larger diametrically than are inlet 2402 and/or outlet 2412. Dewatering outlet may be equivalent or different in diameter as compared with inlet 2402 and/or outlet 2412 and is preferably larger in diameter. Inlet 2402 and outlet 2412 may be equivalent or different in inner diameter, and are preferably equivalent allowing the screen element 2420 to remain cylindrical across its length which is equivalent to the distance across the pressurized fluid removal device 2400 between inlet 2402 and outlet 2412. Screen element 2420 is fixedly attached at the inlet 2402 and outlet 2412 as is exemplified in FIG. 57*a*.

Figure 57B:
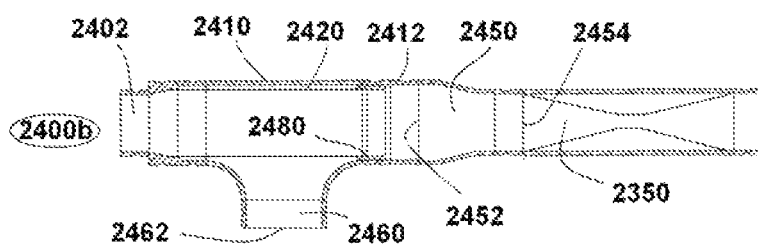
FIG. 57b is a cross-sectional schematic illustration of a pressurized fluid removal device.

Alternatively, as shown diagrammatically in FIG. 57*b*, inlet 2402 and/or outlet 2412 may larger in diameter than is pipe 2398 and may be tapered or angularly reduced in diameter sufficient to be equivalent to the diameter of the screen such that a lip 2480 is formed against which the screen member 2420 is tightly and fittingly positioned. The lip 2480 as shown in FIG. 57*b* is preferably at outlet 2412 and allows the screen to be held in place by the fluid pressure against it. This preferred design allows the screen element to be replaced periodically as necessary.

Cylindrical screen element 2420 may be perforated, woven, pierced, or punched and may be in one or more layers fixedly attached in which the screen openings are sufficiently small to prevent loss of pellets in the dewatering process. Successive layers may be the same or different structurally and compositionally and may be similar or different in terms of screen size opening. The screen may be steel, stainless steel, nickel or nickel alloy, plastic, or other durable compositions as is known to someone skilled in the art. Similarly the thickness or gauge of the metal must be sufficient to withstand the flow velocity, vibration, and throughput, and flexible enough to be formed into cylindrical contour without any leakage of pellets under the pressure constraint of the processing.

Attached at outlet 2412 is reducing pipe 2450 which may be the same or different diameter of inlet 2402. More specifically, reducing inlet 2452 must fittingly attach to outlet 2412 and be of comparable diameter for clamping as described above. Reducing outlet 2454 must be comparable in inner diameter to that of inlet 2402 and is preferably smaller in diameter to maintain pressure within the pressurized dewater 2400. Alternatively, outlet 2412 or reducing outlet 2454 may be attached to a similar conical device or series of conical devices 2350 previously described, not shown in FIG. 52 or in FIGS. 57*a* and/or 57*b*. Pipe 2470 is attached to reducing outlet 2454 or to the outlet from the conical device or devices 2350 using a quick disconnect clamp 2455, or equivalent.

The pressurized fluid removal device 2400 is designed to accommodate pressurized flow of the pellet/fluid slurry into and through it which has sufficiently cooled to avoid loss of volatiles and unwanted or premature expansion. The flow is maintained at least under comparable pressure by the reducing outlet 2454 and/or under comparable or greater pressure optionally by addition of one or more conical devices 2350. The pressure forces significant reduction of fluid used generically as described herein, to concentrate the pellet/fluid slurry for further downstream processing.

Fluid reduction results in the removal of transport fluid through fluid reduction outlet 2460 into pipe 2462 with the rate of fluid reduction controlled by valve 2480 (FIG. 52). The fluid removed may be recycled to reservoir 2800 or elsewhere for purification or modification or it may be removed from the process or discarded as appropriate. The concentrated pellet/fluid slurry is transported through pipe 2470 to undergo additional fluid removal, drying, and downstream processing as required. FIGS. 18 and 52 diagrammatically illustrate the agglomerate catcher/fluid removal device 2500, the dryer 2600, and ultimately to optional downstream processes and post-processing section 13, FIG. 1.

Figure 58:
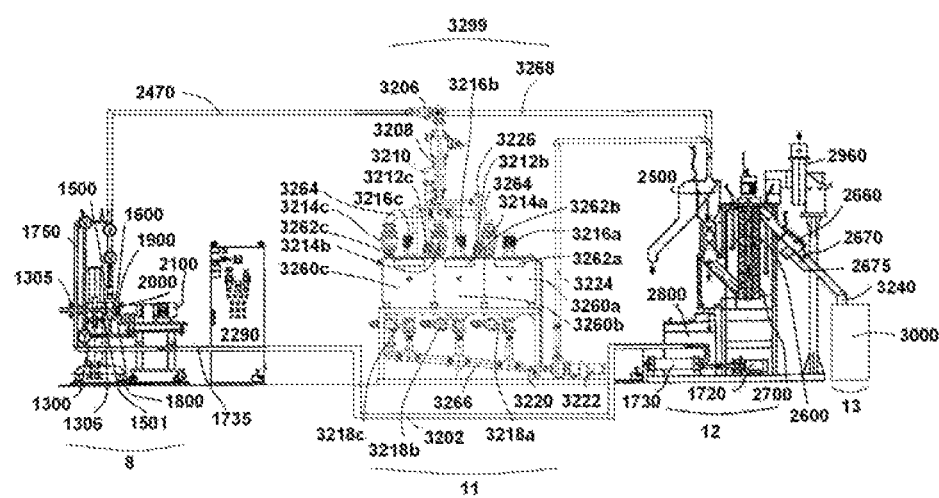
FIG. 58 is a schematic illustration of a pelletization process with pellet crystallization system and dryer.
Figure 59:
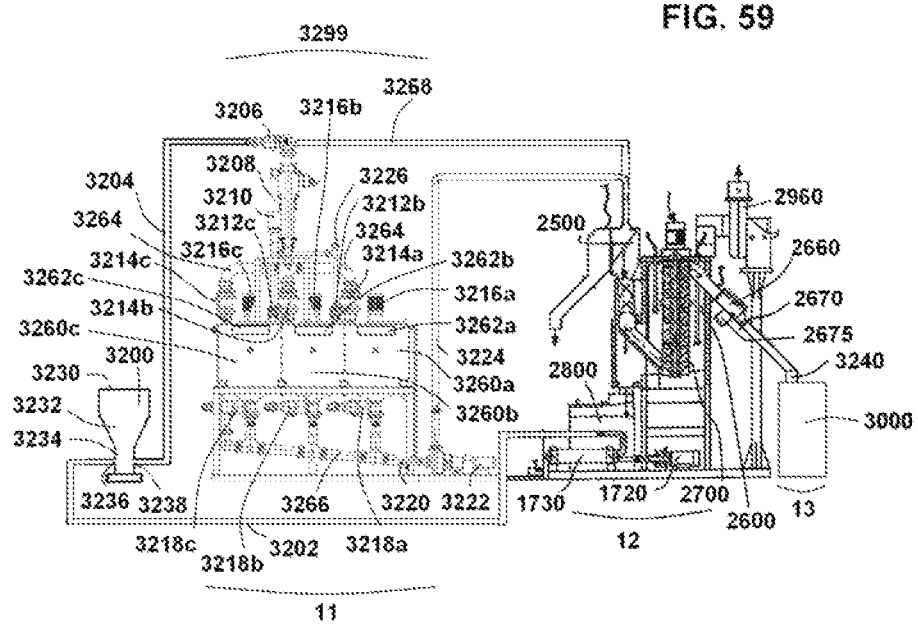
FIG. 59 is a schematic illustration of a split sequence pellet crystallization process with dryer.

Returning to FIG. 18, pellets from the pelletizing section 8, FIG. 1, can pass through pipe 2470 directly into a pellet crystallization system 3299, FIG. 58, at inlet valve 3206 for single pass crystallization or can be discharged from dryer 2600 passing through pellet discharge chute 2660 and optionally can be deflected through exit 2675 as heretofore detailed or can pass through exit 2670 into and through pellet discharge chute extension 3240 separately positioned above and/or preferably attachedly connected to hopper or flow splitter 3200 for a split sequence crystallization process continuing with FIG. 59. The pellet crystallization system 3299 follows the description hereinbelow for either process as deemed necessary to achieve the desired results. The split sequence is illustrated in FIG. 59.

Hopper or flow splitter 3200, as illustrated in FIGS. 18 and 59, is metal or plastic square, round, rectangular, or other geometric configuration receiving device, without being limited, for the pellets which is of inlet 3230 diameter larger than the outside diameter of the pellet discharge chute extension 3240 to surroundingly encompass the outflow of pellets. From inlet 3230, the hopper or flow splitter 3200 taperingly decreases 3232 to chamber 3234 that can be geometrically similar or different than is inlet 3230. Hopper or flow splitter 3200 is preferably 18 gauge to 24 gauge metal and most preferably is 20 to 24 gauge in thickness. The metal can compositionally be aluminum, copper, steel, stainless steel, nickel steel alloy, or similarly non-reactive material inert to the components of the drying process. Preferably, the metal is stainless steel and most preferably is Grade 304 or Grade 316 stainless steel as necessitated environmentally by the chemical processes undergoing the drying operation.

Additionally, conventional surface treatments to reduce abrasion, erosion, corrosion, wear, and undesirable adhesion and sticture can be applied to the inner surface (not shown) of hopper or flow splitter 3200. The inner surface can be nitrided, carbonitrided, sintered, can undergo high velocity air and fuel modified thermal treatments, and can be electrolytically plated. Materials applied utilizing these processes can include at least one of metals, inorganic salts, inorganic oxides, inorganic carbides, inorganic nitrides, and inorganic carbonitrides wherein the inorganic salts, inorganic oxides, inorganic carbides, inorganic nitrides, and inorganic carbonitrides are preferably metal salts, metal oxides, metal carbides, metal nitrides, and metal carbonitrides, respectively.

As illustrated in FIG. 18 and detailed in FIG. 59, inlet pipe 3202 is attachedly connected to inlet 3236, optionally including a venturi or eductor, to introduce transport fluid to and through chamber 3234 to entrain the pellets into that transport fluid forming a pellet and liquid slurry passes through outlet 3238 into attachedly connected transport pipe 3204. The distal end of transport pipe 3204 is attachedly connected to inlet valve 3206 through which is transported the pellet and liquid slurry into agglomerate catcher 3208 through the tank inlet valve 3214*a* and into tank 3260*a* fitted with agitator 3216*a*. Overflow assembly 3210 allows transport fluid to continue flowing into and through effluent pipe 3266 as eventuated by periodic maintenance thusly preventing shutdown of the continuous process. Alternatively, the transport pipe 3204 may be modified as an accelerated transport pipe, section 9*b*, or through pressurized transport, section 9*c*, as illustrated in FIGS. 38, 39, and 52.

Optionally inlet valve 3206 can be attachedly connected to bypass pipe 3268 is illustrated in FIG. 59. This facilitates complete bypass of the pellet crystallization system 3299 and connects directly to transport pipe 3224 proximal to the agglomerate catcher 2500. Optional valving (not shown) can be utilized to prevent back-up into pipes not actively in use for the bypass process as is understood by someone skilled in the art.

On start-up, tanks 3260*b* and 3260*c* are filled with transport fluid through transport fluid valves 3212*b* and 3212*c*, respectively with potential overflow through orifices 3262*b* and 3262*c* that attachedly connect to effluent pipe 3266. Initially, the pellet and liquid slurry enters tank 3260*a* as previously filled tank 3260*b* begins to drain through drain valve 3218*b* with transport fluid valve 3212*b* now closed. Once tank 3260*a* is filled with the pellet and liquid slurry with agitation and/or after the cycle time is met, inlet valve 3214*a* closes and inlet valve 3214*b* opens to fill tank 3260*b*. Simultaneously, transport fluid valve 3212*c* is closed and drain valve 3218*b* opens. The cycle is now continuous and can be fully automated with flow of the pellet and liquid slurry into and ultimately through each of the three tanks 3260*a*, *b*, and *c*, respectively. The inlet valves 3214*a*, *b*, and *c* as well as drain valves 3218*a*, *b*, and *c* can be actuated manually, mechanically, hydraulically, electrically, and many combinations thereof and automation of these processes can be controlled manually by programmable logic control (PLC), or many comparable methods known to those skilled in the art.

On completion of the appropriate residence and/or cycle time for each tank, the appropriate drain valve 3218 a, b, or c opens and the pellet and liquid slurry flows into effluent pipe 3266 and is transported assistedly by pump 3222 into and through transport pipe 3224 to a dryer as illustrated in FIGS. 58 and 59 and heretofore described as dryer 2600 in FIG. 18.

The dryer 2600 (FIG. 18) and dryer 2600 (FIGS. 58 and 59) can be the same or different structurally and/or dimensionally and details and options for the section 10 dryer (or section 12) are detailed in association with dryer 2600 in FIGS. 18, 42 to 51. Pump 1720 and heat exchanger 1730 as illustrated for FIG. 18 serve comparable or equivalent functions or can differ in sizing including but not limited to head, flow rates, heat loads, and transport agent temperatures as illustrated in FIG. 52 and are fixedly attached to inlet pipe 3202, FIG. 59, heretofore described.

Overflow orifices 3262*a*, *b*, and *c* can be attachedly covered by a screen (not shown) of one or more layers and mesh size as dictated by the particle size of the individual process. Screen composition and construction follow that hereinbefore delineated for screen 2700, FIGS. 40 through 51.

Optionally, the entire pellet crystallization system, in FIGS. 58 and 59 can be elevated above the level of the agglomerate catcher 2500 and dryer 2600 to allow gravity flow into the drying process thusly avoiding the need for pump 3222 as heretofore described.

While FIGS. 58 and 59 illustrates a preferred three (3) compartment unit design with tanks 3260*a*, *b*, and *c*, at least one (1) tank can allow crystallization to be accomplished in the instant invention. Two (2) or more tanks reduce the effective residence time and improve the operation of the cycle to enhance crystallization. Three (3) or more tanks in a common unit, and more preferably, three (3) or more individual tanks interconnectedly attached to accommodate the appropriate volumes and cycle times as necessitated by the throughput of the individual process are well within the scope of the present invention. As throughput rates and/or residence times for crystallization increase, four (4) or more tanks, stand alone or in unit construction, are still more preferred effectively reducing the individual tank size and enhancing the cycle time as is understood by someone skilled in the art.

Additionally, surface treatments to reduce abrasion, erosion, corrosion, wear, and undesirable adhesion and sticture can be applied to the inner surface (not shown) of tanks 3260*a*, *b*, and *c*, FIGS. 58 and 59, screens (not shown) over the overflow orifices 3262*a*, *b*, and *c*, and the lumens (not shown) of distribution pipe 3264, effluent pipe 3266, bypass pipe 3268, and transport pipe 3224. The inner surface can be nitrided, carbonitrided, sintered, can undergo high velocity air and fuel modified thermal treatments, and can be electrolytically plated. Materials applied utilizing these processes can include at least one of metals, inorganic salts, inorganic oxides, inorganic carbides, inorganic nitrides, and inorganic carbonitrides. The inorganic salts, inorganic oxides, inorganic carbides, inorganic nitrides, and inorganic carbonitrides are preferably metal salts, metal oxides, metal carbides, metal nitrides, and metal carbonitrides respectively.

Alternatively, hopper or flow splitter 3200 can be fixedly attached at outlet 3238, FIG. 59, to a multiplicity of outlet pipes by common attachment pipe (not shown) through which the throughput flow of the pellet and liquid slurry is divided and distributionally regulated by valves (not shown) as is understood by those skilled in the art, to provide uniform and equivalent flows to a multiplicity of pellet crystallization system (PCS) 3299 assemblies identified as section 11 in FIGS. 1, 58, and 59. The PCS system heretofore described and parallel PCS 3299 assemblies optionally can be serially attached to additional PCS systems 3299 the numbers of which, both in parallel and/or serially, are dependent on the dimensions of PCS system 3299, pellet content of pellet and liquid slurry, throughput rate, throughput volume, residence time, temperature variance, and degree of crystallization specific to the process for a particular pellet and liquid slurry.

Without intending to be bound by theory, PCS systems 3299 in series can be the same or different in temperature wherein additional heating potentially can increase the level of crystallization and cooling potentially can decrease the level of tack facilitating the downstream drying and post-processing components of the particular process. The optimization of potential increase in crystallization and potential decrease in tack is determined by the chemical composition and/or formulation of the material being processed. The split sequence as illustrated in FIG. 59 represents the transport of the pellets from dryer 2600, FIG. 18, or section 10 of FIG. 1, to the pellet crystallization system, section 11 and dryer section 12 with post-processing in section 13, FIG. 1.

Figure 60A:
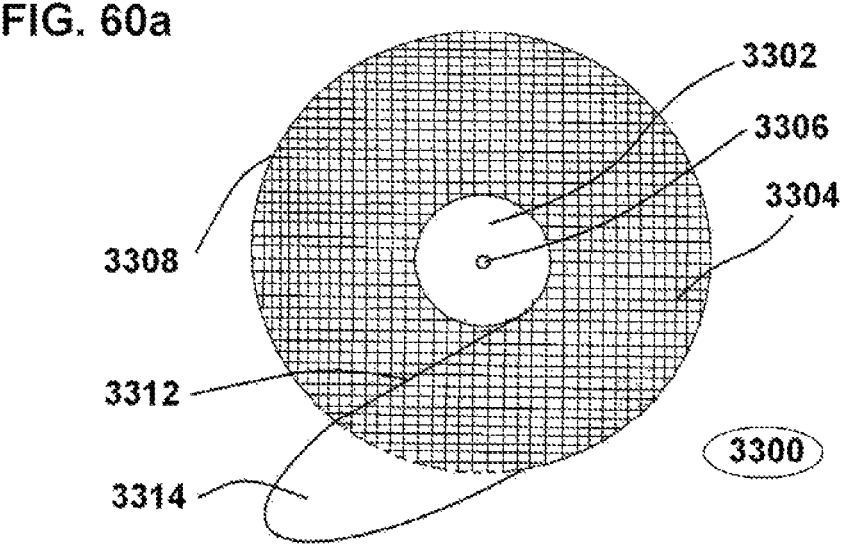
FIG. 60a is a vertical schematic view of a vibratory unit with deflector weir and pan for powder treatment of pellets.

The substantially dried pellets discharged from the dryer 2600 in FIGS. 18, 58 and/or 59 exit through pellet discharge chute 2660 to and through exit 2670 and optionally into and through pellet discharge chute extension 3240. These pellets optionally can be packaged, stored, transported or additionally processed. Alternatively, the pellets can be introduced into a coating pan 3302, FIGS. 60*a* and 60*b*, which is fixedly attached by bolt 3306 to the sizing screen 3304, preferably centered, in an eccentric vibratory unit 3300. The design and mechanism of operation of an eccentric vibratory unit 3300 are well known to those skilled in the art. The coating pan 3302 preferably is diametrically smaller than the diameter of the sizing screen 3304, and is preferably one-half the diameter of the sizing screen 3304. The circumference of sizing screen 3304 is bounded by unit housing 3308. The coating pan 3304 is comprised of a solid circular base satisfying the heretofore described dimensional constraints with a circumferential wall at the edge of the base of at least approximately one inch (approximately 2.5 centimeters) such that the coating material is contained therein and such that the throughput volume of the pellets introduced from pellet outlet chute 2660 is confined for an appropriate time, at approximately five (5) seconds or less, and more preferably approximately two (2) seconds or less, allowing uniform coating of the pellets expedited by the vibration of the vibratory unit 3300. The screen 3304 composition can be of construction similarly described for screen assembly 2700 of at least one layer previously described herein. The unit is fittedly attached with cover 3320.

Figure 60B:
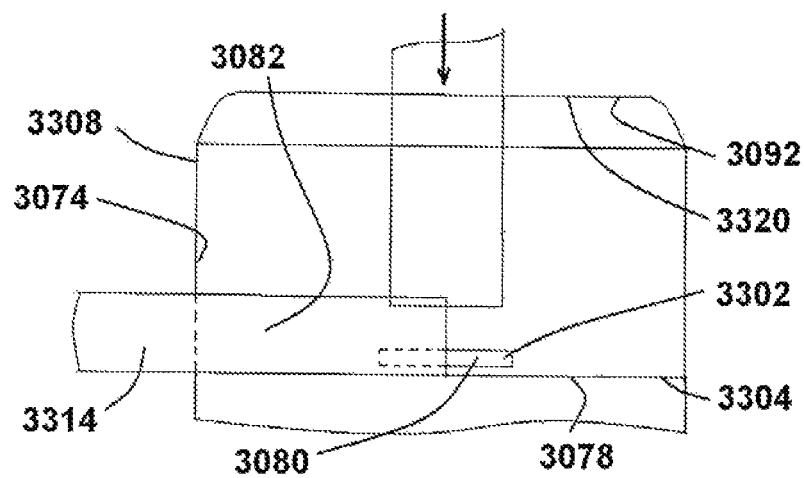
FIG. 60b is a side view illustration of a vibratory unit with deflector weir and pan for powder treatment of pellets.

The coated pellet ultimately is vibratably shaken from the coating pan 3302 onto sizing screen 3304 and circumnavigates the screen effectively removing excipient coating material that passes through the screen and is expelled from the apparatus through an outlet 3314, FIG. 60*b*. The coated pellet migrates about the screen until it encounters deflector weir 3312 that redirects the coated pellet through outlet 3314. Deflector weir 3312 is affixedly and tangentially attached to the wall of coating pan 3302 and distally to the unit housing 3308 adjacent to outlet 3314. Preferably, the weir 3312 tapers in width from that equivalent to the wall height of the coating pan 3302 to at least two times that at the attachment point adjacent to the unit housing 3308.

Coatings can be applied to pellets to reduce or eliminate tack, to provide supplementary structural integrity to the pellet, to introduce additional chemical and/or physical properties, and to provide color and other esthetic enhancement. Exemplary of coating materials can be, but are not limited to, talc, carbon, graphite, fly ash, wax including microcrystalline, detackifying agents, calcium carbonate, pigments, clay, wollastonite, minerals, inorganic salts, silica, polymeric powders, and organic powders. Preferably, the coating materials are powders.

Figure 61A:
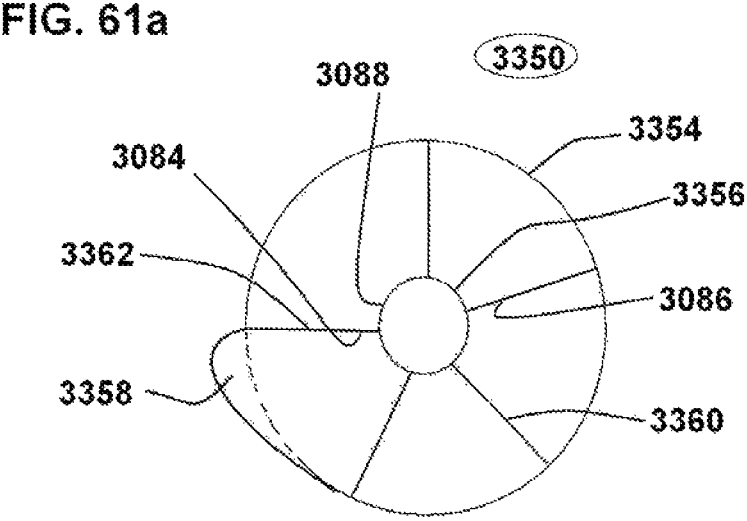
FIG. 61a is a vertical schematic view of a vibratory unit with deflector weir and retainer weirs for enhanced crystallization of pellets.
Figure 61B:
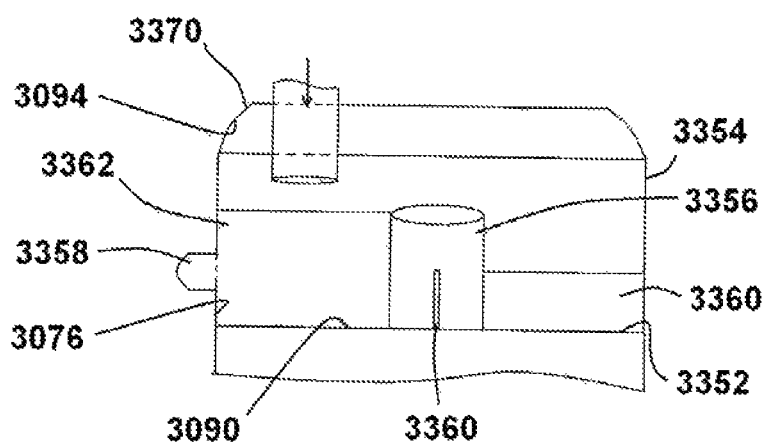
FIG. 61b is a side view illustration of a vibratory unit with deflector weir and retainer weirs for enhanced crystallization of pellets.

FIGS. 61*a* and 61*b* illustrate an alternative eccentric vibratory unit 3350 that can increase residence time allowing additional drying, cooling, and/or preferably crystallization and any combination thereof. The unit 3350 comprises a solid plate 3352 circumferentially enclosed by and fixedly attached to the unit housing 3354. Centrally attached onto the solid plate 3352 is a cylindrical core 3356 to which are attachedly and perpendicularly connected at least one and, preferably, a plurality of weirs. Deflector weir 3362 is fixedly attached to the unit housing 3354 distally from the cylindrical core 3356 and adjacent to outlet 3358. Preferably, at least one (1) retainer weir 3360 and more preferably at least two (2) retainer weirs 3360 are similarly attached to the cylindrical core 3356 and the unit housing 3354. Retainer weir or a plurality thereof are lower in height than is the deflector weir 3362 and preferably are one-half the height of the deflector weir 3356. Retainer weirs 3360 are circumferentially placed around the unit 3350 and can be positioned symmetrically, asymmetrically, or both. The unit is fittedly attached with cover 3370.

Pellets are fed into unit 3350 on the side of the deflector weir 3362 remote from outlet 3358. Movement of pellets occurs circumferentially about the unit 3350 until a retainer weir 3360 is encountered, if any, against which pellet volume accumulates until such volume exceeds the height of retainer weir 3360 and pellets fall over to migrate vibrationally therearound to the next retainer weir 3360 or deflector weir 3362 as determined by design of unit 3350. Upon encounter of the pellet and the deflector weir 3356, movement of the pellet is redirected to and through outlet 3358. The design and mechanism of operation of that eccentric vibratory unit 3350 are well known to those skilled in the art. Increasing the number of retainer weirs 3360 increases the volume of pellets allowed to accumulate, thusly increasing the residence time the pellets are retained by the eccentric vibratory unit 3350. Variance of the number and/or height of the retainer weirs 3360 can enhance the effective drying, cooling, and crystallization times for the pellets. On deflection to and through outlet 3358 the pellets can be transported to additional post-processing and/or storage as required.

The present invention anticipates that other designs of eccentric vibratory units, oscillatory units, and their equivalent known to those skilled in the art can be used effectively to achieve comparable results as disclosed herein. Components of the assemblies for the eccentric vibratory units described herein can be metal, plastic or other durable composition and are preferably made of stainless steel, and most preferably are made of 304 stainless steel. The shape of the vibratory units in FIGS. 60*a*, 60*b*, 61*a*, and 61*b* may be round, oval, square, rectangular or other appropriate geometrical configuration and is not limited.

Referring again to FIGS. 60*a, b* and 61*a, b*, conventional surface treatments to reduce abrasion, erosion, corrosion, wear, and undesirable adhesion and sticture to many parts of vibratory units 3300 and 3350 can be nitrided, carbonitrided, sintered, can undergo high velocity air and fuel modified thermal treatments, and can be electrolytically plated. Exemplary of these vibratory unit components can be the inner surface of housings 3074 and 3076, the surface of screen 3078, the surface of coating pan 3080, the surface of deflector weir 3082, the surfaces of deflector weir 3084 and the surfaces of retainer weirs 3086, the outer surface of the cylindrical core 3088, the upper surface of baseplate 3090, and the inner surface of cover assemblies 3092 and 3094. Other surface treatments for improvement of surface properties, enhancement of corrosion and abrasion resistance, improvement of wear, and/or reduction of clumping, agglomeration, and/or sticture can be used without intending to be limited.

The feeding system section 1 of FIG. 1 is extremely useful for control of the conditioning, including thermal and atmospheric, of fluids used in formulations. The volumes in each of the respective tanks is monitored by feedback through at least one and preferably a multiplicity of load cells as previously described wherein setpoints determine when and how much material to add to maintain a certain weight, and thus volume, in each tank. Temperature throughout the system is monitored by at least one and preferably a multiplicity of thermocouples as illustrated supra that communicate with appropriate switching mechanisms, solenoids for example, to control the heating input to the individual tanks. Pressure transducers, also illustrated hereinabove, monitor the transport processes to forewarn of potentially problematic change in viscosity, occlusion, clogging, and the like. Recirculation systems and/or agitation are provided for each reservoir tank as previously described to maintain thermal as well as compositional uniformity throughout the system. Inert gas, preferably nitrogen, air, and/or vacuum is available to respectively pressure/depressurize the individual tanks allowing filling, continuously or discontinuously, as necessitated by the particular fluid levels and demand. The inert gas is available to minimize undesirable reactivity or decomposition by maintaining an inert environment in the respective chambers. Flow rates are maintained by flowmeters, preferably mass flowmeters, as illustrated supra to insure the proper delivery within well-controlled consistent and reproducible volumes. Limit switches also previously described, and preferably proximity switches, are utilized to determine the positioning of the delivery of the fluids from the feeding system section 1 to the mixing section 2, FIG. 1. All systems are monitored by at least one and preferably a multiplicity of programmable logic controllers with touch screen communication to maintain the systems independently and collectively at the preferable and optimum operating conditions for the particular process.

The multiplicity of materials manipulable with the scope of the present invention can include and are not limited to formulations, solvents, solutions, catalysts and formulations thereof, dispersions, suspensions, emulsions, plasticizers, antioxidants and formulations thereof, ultraviolet stabilizers and formulations thereof, thermal stabilizers and formulations thereof, tackifiers, detackifiers, waxes including microcrystalline waxes, rheology modifiers, flame retardants and solutions thereof, alcohols including diols and polyols and copolyols, esters including diesters and polyesters and copolyesters and thioester equivalents, ethers including polyethers and copolyethers and thioether equivalents, organic acids including diacids and polymers and copolymers and thioacid equivalents, isocyanates including diisocyanates and polyisocyanates and copolymeric isocyanates and thiocyanate equivalents, isocyanate and thioisocyanate adducts including biurets and cyanurates and ureides and imidates and amidates, amines including diamines and polymeric amines and copolymeric amines, carbonates including polycarbonates and copolycarbonates and thiocarbonate equivalents, ureas and polyureas and copolyureas, surfactants and formulations thereof, oligomers, pre-polymers, protected polymers and pre-polymers, low molecular weight polymers and copolymers, and a multiplicity of combinations of many of the above. These materials can be combined and/or further combined to form solutions, suspensions, dispersions, emulsions, and formulations and can be reacted to form molecules, oligomers, pre-polymers, polymers, and the like. The materials thusly formed can be crystallized, combined with fillers, additives, pigments, stabilizers including antioxidant, thermal, and ultraviolet, and the like without intending to be limited.

The materials must be a liquid in at least a portion of the temperature range over which the equipment can be operated. It is understood that at least one of the reservoir tanks as herein described can be fitted with cooling capabilities replacing the heretofore described heating process extending the range of temperature for the independent materials being processed. It is anticipated that the range of the equipment with appropriate insulation, gasketing, and mechanical parts can be at least from approximately $-100°$ C. to $250°$ C., preferably from approximately $-40°$ C. to $200°$ C., more preferably from approximately $-15°$ C. to $175°$ C., still more preferably from approximately $0°$ C. to $150°$ C., and most preferably for the disclosed equipment as described hereinabove is from approximately ambient or room temperature to $150°$ C.

As discussed herein, the present invention provides numerous improvements over the prior art. For example, the present feeding system preferably uses one large oven with internal dividers, as opposed to separate ovens. This lowers the cost of manufacture, and reduces the overall footprint of the system. Using one large oven provides cost savings over using more than one oven, as a single oven has a greater insulation coefficient that individual ovens or jacketed tanks. This design allows for more of the heat to be held where it is needed.

The tanks, pumps, flow-meters and associated piping are enclosed in the heated ovens. Attention has been taken to ensure the size of the ovens, as well as the heating circuit, allow for optimum air flow and heating around the tanks. In conventional systems, heat exits at the bottom of the ovens, yet this tends to blow heat directly on the bottom of the tanks and directly onto the flow meters and pumps. The air inlet (to recondition the heated air) is located at the top of the oven. The oven of the present invention has the heat discharge at the top, and ducts the air around the tank for even heating. The air return inlet preferably is located at the bottom of the tank. This eliminates over heating of the bottom of the tank, and possible degradation of the product contained in the tank.

The present invention provides oven access doors that have open activated lighting inside the ovens for maintenance purposes.

The pumps of the present invention are driven via a shaft connecting a gear drive unit located on the outside of the oven to the pump, which is inside the oven. Pumps and pump drive units are mounted on machined pads that are part of the system base, giving a correlated mounting surface for the pump and the drive. This eliminates any misalignment between this drive shaft and the pump/drive components, and the prior art's problem associated with mounting the pump on a thin plate that can not provide a stable platform.

The present pumps can be magnetic drive design, and driven via a shaft with flexible joints. The magnetic drive eliminates the need for seal maintenance and wear issues. For use with, for example, isocyanate, this will mean a safer, closed loop chemical circuit. The elimination of seal maintenance and wear issues not only simplifies the issues of spare parts, but also eliminates the need for expensive break-away couplings on the pumps that are necessary to keep from damaging the pump in the event of a lock-up of conventional systems. If one of the pumps were to lock up with the magnetic drive, the magnetic field would be broken before damage could be done to the pumps.

The pumps of the present invention preferably have amp indication and alarms in the control system. This too is a money saver in the event of a pump lock up. As noted, magnetic drive pumps will 'break loose' if the pump itself locks up, and in the event this happens, the present invention insures the system shuts down and does not continue to feed the extruder. If the amps of the pump were not monitored, and one of them locked up, the system would continue to feed the remaining pumps, resulting in wasted chemicals and a mess downstream. Amp indication and alarm enables continuous monitoring to avoid this conventional system problem.

The present tanks preferably are mounted on load cells for refill and usage indication. Most conventional systems use a level controller to determine tank levels for these functions; however, one must use conversions to determine exactly how much chemical remains in the tank. This is necessary to determine how much has been used, and the remaining run time on the tank, as for example, thermoplastic polyurethane (TPU) formulations are derived from weight. The present invention informs the operator how much run time is on each tank depending on its actual weight without the need for additional calculations. In addition, operators will determine refill frequency based on loss of weight. The conventional use of level probe in a tank is the accumulation of chemicals on the probe in the tank. Unless this probe is constantly kept clean, it could give erratic indications or quit working altogether upon the accumulation of chemicals.

The present tanks preferably are equipped with electronic inert gas and vacuum regulators with set-points entered by the operator. Inert gas, like Nitrogen, pressurization of the tanks have several important facets in a precision metering system. First, the nitrogen is used to displace air, which is inherently moist. Second, the nitrogen pressure is used to compensate for the loss of chemical during running, which if not for the positive pressure of the nitrogen, would create a vacuum and eventually starve the pumps. In using manual valves of the prior art systems, monitoring of this pressure is left to the operator. If they do not set the pressure correctly, then the tank could easily see an overpressure condition, and that would result in loading the pump, or an under-pressure condition that would lead to a vacuum condition and starving of the pump. Once the pump is starved, then the final product will be off ratio. By providing this regulation an automated process, the present invention provides the continuous monitoring of the nitrogen in the tank, insuring a constant pressure in the tank, and allows the system to track the pressure for data reporting purposes. This electronic regulation also allows the system to monitor the plant nitrogen pressure so that in the event of a loss in nitrogen to the regulator, an alarm can be triggered to alert the operator.

The present invention utilizes a vacuum assembly that has been carefully designed to both work with each tank, yet importantly keep the lines separate. Meaning, it is vital that liquids or vapors from each tank remain separate from those of the other tank(s), because if the chemical are reactants, and they prematurely get in contact with each other, then a reaction could occur uncontrollably, undesirably and perhaps unsafely. The present invention utilizes separator bottles, preferably designed of glass and protected by a perforated plate so to allow for ease of operator inspection, to separate out any chemicals and preventing them from crossing over to another tank or its vacuum line.

The present invention further provides an improved chemical supply and return line cables/hoses than those of the prior art designs. In conventional designs, these cables/hoses are electrically heat traced hoses, and are susceptible to premature failures. They are not very compatible with the chemicals used in the system, and the heating wires keep breaking. Once the heating failed, this causes problems such as unstable flows and/or freezing of the chemicals in the lines. The present invention uses cables that are much more robust that those of the conventional system, and great attention was made to assure compatibility with the chemicals involved in the system.

The present invention also employs a bulk-head design for the feeding unit. Operators and technicians might have a need to get pipes, cables and mechanisms into and out of the ovens. Instead of taking conventional designs and cutting holes in the oven walls, care was taken to design specific opening(s) over which are mounted perforated plates (bulk-heads) uniquely designed to fit tightly around the various items as they pass through. This makes the ovens easier and better to insulate, easier and faster to install and to service in the future, and the various items more accessible.

The present refill system includes connections to supply tanks and a 25 micron filter device. These filters are easily accessible through a dedicated access port for ease in cleaning. The feeding system control program controls the customer mounted refill valves. A 25 micron filter is used to eliminate un-melted particulates, contaminates, or degraded product from entering the tanks. Since the tanks are in essence "conditioning" tanks used to prepare the chemicals for the reaction process, it is in these tanks that the temperature, nitrogen levels and metering are more precisely accomplished in order to introduce stable reactants into the process. By using this filter, the present invention introduces yet another safeguard to insure the quality of these reactants.

The present ovens, pumps, chemical lines, and mix head valves preferably have heat soak safeguards in the control program. Polyols and isocyantes are solid at room temperature, and if the pumps and flow meters contain these chemicals during startup, the present invention makes sure that they are completely melted prior to pump start, otherwise, the pumps and flow meters could be damaged by trying to pass solidified product. In addition, these mechanical components need to be uniformly heated so as not to introduce a "cold spot" in the chemical circuit. Cold spots of the conventional systems have an effect on the chemical composition by cooling it prior to the mixing process. The heat soak of the present invention can be bypassed by the appropriate supervisor controls, but even if a supervisor bypasses this, the present system logs the exception to a permanent data file. This data file enables the later review of which alarms, prevention processes, and reporting lines were bypassed by the operator.

The present agitators preferably have amp indication in the control program. This is a useful tool for monitoring approximate viscosity of the chemical. The agitators of the present invention are really "stirrers" used to keep the heat distributed throughout the chemical, further conditioning the product for final processing. The stirrers move the chemical that is being heated against the wall of the tank to the center of the vessel in a continuous cycle, and keep the outer edge of the chemical mass from being over heated. Should an operator see a higher or lower than normal amp indication, this could be a flag to check the chemical quality for problems.

Mass flow meters preferably are standard on the chemical circuits of the present invention. These meters monitor and display production flow rate, specific gravity and temperature of the chemical.

Line pressure preferably is monitored at the pump suction, pump discharge, and mix head of the present invention. This allows the alarming of pressure drop due to loss of chemical feed to the pump or broken chemical lines in both the supply and recirculation circuits.

The mix head of the present invention preferably has position indication to determine when the operator has it in the feed position or the stand-by position. This is critical for alarming and "run-ready" sequencing. This safeguards against an operator inadvertently sending the system into process mode without being over the feed throat of the extruder unless they bypass the interlock. In addition, the present invention uses solvent to clean the mix head that could be harmful to the extruder, and using this interlock feature ensures that the solvent flush cannot be activated when the mix head is in position over the extruder.

The mix head of the present invention preferably has an inert gas (nitrogen) outlet directly at the reactant outflow. Having a nitrogen blanket at this outflow aids in product quality. As the reactants are transferred from the mix head to the inlet of the extruder, they will be exposed to atmosphere and in some cases this atmosphere could be high in humidity, thus introducing moisture to the chemicals. Also, the extruder itself can act as an air pump at the inlet by pulling air along the screws into the barrel. By using a nitrogen blanket at the feed section, moist air is displaced by dry nitrogen, reducing the chance for this moisture to affect the reaction properties of the mix.

The mix head of the present invention preferably has dual flush capability. Flushing, for example, with polyol allows the mix head to be cleaned directly over the extruder in the event of a panic shutdown. Since introducing solvents into the extruder is to be avoided, in the event the system should fault and shutdown without the operator present, it is beneficial to clear the mix head with an extruder-safe fluid. Polyol will clean the head and not harm the extruder; therefore, it is used as a flushing agent when the mix head is in the process position.

The present invention preferably provides a control screen for controlling the feeding system, extruder and pelletizing system. Another screen is mounted at the pelletizer. Safeguards are installed for operation of equipment remote to the individual screen locations. Two screen control has benefits, as most users of these types of systems allow only one or two individuals to operate the computer interfaces on these systems, leaving the mechanical job of cleaning the die and coupling the pelletizer to junior employees. Many times, the supervisory individuals are also the ones observing the flow of chemicals into the feed section of the extruder and/or the polymer being extruded through the die plate, and they will determine when the system is ready to start. The present feature of control at either end allows these supervisory personnel to start or stop any part of the process from either location when they are satisfied.

The present invention preferably provides that formulations can be calculated from the computer screen with the correct permissions. The ability to process formulations on the screens allows the process engineer to make adjustments or complete recipe authoring at the machine. The feature also alerts when the formulation may be incorrect or off ratio, or may be outside the limitations of the machine. Both the ability to formulate and introduce changes to the machine and the safeguards of recipe continuity at the machine gives the engineer immediate feedback.

The present control system preferably is accessible either across the internet via VPN or through a modem or other connection.

The present PLC program ladder logic preferably is accessible through the control interfaces. Should a problem with the program arise, a programmer can be granted permission to look at the logic and determine if there is indeed a problem. However, the main purpose of this is for the technicians to have the program available to them without the added burden of attaching their computers to the PLC.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A system to achieve formulation and reactive polymerization utilizing a thermally and atmospherically controlled feeding system for thermoplastic materials comprising:
    a feeding unit that provides delivery of thermally and atmospherically conditioned components in a stream;
    a mixing unit to mix and thermally control the components of the stream from the feeding unit, to effect polymerization in the mixing process;
    a pressurizing unit to pressurize the stream from the mixing unit;
    a filtering unit to filter the pressurized stream from the pressurizing unit;
    a second mixing unit to mix the filter stream from the filtering unit;
    a second pressurizing unit to pressurize the stream from the second mixing unit;
    a second filtering unit to filter the pressurized stream from the second pressurizing unit; and
    a pelletization unit to pelletize the filtered stream from the second filtering unit.

2. A system to achieve formulation and reactive polymerization utilizing a thermally and atmospherically controlled feeding system for thermoplastic materials comprising:
    a feeding unit that provides delivery of thermally and atmospherically conditioned components in a stream, the feeding unit comprising:
        at least two reservoir tanks for conditioning the stream;
        an inert gas and vacuum assembly for regulating and metering the stream through the feeding unit;
        a mix head located on a pivotable arm;
        a rinse system to rinse feeding unit transport lines and at least the mix head of the reactive stream; and
        an independent stream temperature control for each reservoir tank;
    a mixing unit to mix and thermally control the components of the stream from the feeding unit, to effect polymerization in a mixing process, the mixing unit further comprising an extruder having a throat, wherein the stream flows from the mix head of the feeding unit into the throat of the extruder of the mixing unit;
    a positioning system to ensure the proper positioning of the stream exiting from the feeding unit to the mixing unit, wherein the positioning system comprises a sensor in proximity to the mix head in order to ensure the location of the mix head over the throat of the extruder when delivering the stream from the feeding unit to the mixing unit;
    a pressurizing unit to pressurize the stream from the mixing unit;
    a filtering unit to filter the pressurized stream from the pressurizing unit, the filtering unit comprising at least two filters, a first filter being an on-line filter for filtering the pressurized stream, and a second filter being a standby filter for use when the first filter must be taken off-line, wherein the pressurized stream is directed through the first filter for filtering, wherein upon when there is a need for removing the first filter from the processing system, the pressurized stream can be directed through the second filter for filtering, and wherein the second filter is temperature controlled during stand-by, so the second filter has the operational characteristics for ready substitution of the first filter, so it can become the on-line filter upon removal of the first filter;

a pelletization unit to pelletize the filtered stream; and a drying unit to dry the pellets of the pelletized stream.

3. A processing system comprising:

a feeding unit that provides delivery of thermally and atmospherically conditioned components in a stream, wherein the feeding unit comprises one or more reservoir tanks for conditioning the stream, wherein at least one of the one or more reservoir tanks comprise stream level control, and wherein the stream level control comprises an inert gas and vacuum assembly;

a mixing unit to mix the components of the stream to effect polymerization in a mixing process; and a pelletization unit to pelletize the mixed stream.

4. The processing system of claim 3, wherein at least one of the one or more reservoir tanks comprise a perforated angular fluid regulating device through which the stream flows, wherein the perforated angular fluid regulating device tapers decreasingly in the direction of the bottom of the at least one of the one or more reservoir tanks, wherein the perforations of the perforated angular fluid regulating device are positioned so as to allow excess stream to drain out of the perforated angular fluid regulating device, and wherein the angularity perforated angular fluid regulating device allows some build-up of incoming stream while directing the flow of that stream taperingly into a fluid film along the wall of at least one of the one or more reservoir tanks.

5. The processing system of claim 3, wherein at least one of the one or more reservoir tanks comprise stream temperature control.

6. The processing system of claim 5, wherein the stream temperature control comprises an agitation system to maintain sufficient motion of the stream in the reservoir tank to achieve uniformity of temperature throughout the reservoir tank.

7. The processing system of claim 5, wherein the stream temperature control comprises a plurality of thermocouples to monitor stream temperature.

8. The processing system of claim 5, wherein the stream temperature control comprises a circulation system to circulate a heat stream in proximity to the reservoir tank.

9. The processing system of claim 8, wherein the stream temperature control further comprises a deflection system, wherein the circulation system comprises a blower, and the heat stream is heated air from the blower, and wherein the deflection system comprises a plurality of baffles.

10. The processing system of claim 3, further comprising a pressurization unit to accept the mixed stream from the mixing unit, and pressurize the mixed stream.

11. The processing system of claim 10, further comprising a filtration unit to accept the pressurized mixed stream from the pressurization unit, and filter the pressurized mixed stream.

12. A reactive processing system comprising:

a feeding unit that provides delivery of thermally and atmospherically conditioned reactive components in a reactive stream, wherein the feeding unit comprises;

at least two reservoir tanks for conditioning the reactive stream;

an inert gas and vacuum assembly for regulating and metering the reactive stream through the feeding unit;

a mix head located on a pivotable arm;

a rinse system to rinse feeding unit transport lines and at least the mix head of the reactive stream; and an independent reactive stream temperature control for each reservoir tank;

a mixing unit to mix the reactive components of the reactive stream to effect polymerization in a reactive mixing process; and a pelletization unit to pelletize the mixed reactive stream.

13. A processing system comprising:

a feeding unit that provides delivery of thermally and atmospherically conditioned components in a stream, the feeding unit further comprising a mix head;

a mixing unit to mix the components of the stream to effect polymerization in a mixing process, the mixing unit further comprising an extruder having a throat, wherein the stream flows from the mix head of the feeding unit into the throat of the extruder of the mixing unit;

a positioning system to ensure the proper positioning of the stream exiting from the feeding unit to the mixing unit, wherein the positioning system comprises a sensor in proximity to the mix head in order to ensure the location of the mix head over the throat of the extruder when delivering the stream from the feeding unit to the mixing unit; and a pelletization unit to pelletize the mixed stream.

14. The processing system of claim 13, wherein the sensor is a positional sensor on the mix head.

15. The processing system of claim 13, wherein the sensor is a limit switch.

16. A processing system comprising:

a feeding unit that provides delivery of thermally and atmospherically conditioned components in a stream, the feeding unit further comprising a mix head;

a mixing unit to mix the components of the stream to effect polymerization in a mixing process, the mixing unit further comprising an extruder having a throat;

an overflow shroud mounted to the throat of the extruder of the mixing unit, wherein the stream flows from the mix head of the feeding unit into the overflow shroud and subsequently into the throat of the extruder of the mixing unit; and a pelletization unit to pelletize the mixed stream.

17. The processing system of claim 16, wherein the mix head is located on a pivotable arm.

18. The processing system of claim 17, the processing system further comprising a positioning system to ensure the proper positioning of the stream exiting from the feeding unit to the mixing unit; and wherein the positioning system comprises a sensor in proximity to the mix head in order to ensure the location of the mix head over the overflow shroud when delivering the stream from the feeding unit to the mixing unit, the mix head moveable into proper positioning via the pivotable arm.

19. A processing system comprising:

a feeding unit that provides delivery of thermally and atmospherically conditioned components in a stream wherein the feeding unit comprises one or more reservoir tanks for conditioning the stream, wherein at least one of the one or more reservoir tanks comprise stream temperature control, and wherein the stream temperature control comprises a circulation system to circulate a heat stream in proximity to the reservoir tank;

a mixing unit to mix the components of the stream to effect polymerization in a mixing process; and a pelletization unit to pelletize the mixed stream.

20. The system of claim 19, further comprising a drying unit to dry the pellets of the pelletized stream.

21. The system of claim 19, further comprising a pellet crystallization unit to crystallize the pellets of the pelletized stream.

22. The processing system of claim 19, wherein at least one of the one or more reservoir tanks comprise a perforated angular fluid regulating device through which the stream flows, wherein the perforated angular fluid regulating device tapers decreasingly in the direction of the bottom of the at least one of the one or more reservoir tanks, wherein the perforations of the perforated angular fluid regulating device are positioned so as to allow excess stream to drain out of the perforated angular fluid regulating device, and wherein the angularity perforated angular fluid regulating device allows some build-up of incoming stream while directing the flow of that stream taperingly into a fluid film along the wall of at least one of the one or more reservoir tanks.

23. The processing system of claim 19, wherein at least one of the one or more reservoir tanks comprise stream level control.

24. The processing system of claim 23, wherein the stream level control comprises an inert gas and vacuum assembly.

25. The processing system of claim 24, wherein the inert gas and vacuum assembly is designed to keep liquids and vapors of one chemical component stream reservoir from another.

26. The processing system of claim 24, further comprising separator bottles to allow for operator inspection.

27. The processing system of claim 24, wherein the inert gas and vacuum assembly is computer-controlled.

28. The processing system of claim 19, wherein the stream temperature control comprises a system to maintain sufficient motion of the stream in the reservoir tank to achieve uniformity of temperature and composition throughout the reservoir tank.

29. The processing system of claim 19, wherein the stream temperature control comprises a plurality of thermocouples to monitor stream temperature.

30. The processing system of claim 19, wherein the stream temperature control further comprises a deflection system, wherein the circulation system comprises a blower, and the heat stream is heated air from the blower, and wherein the deflection system comprises a plurality of baffles.

31. The processing system of claim 19, further comprising a pressurization unit to accept the mixed stream from the mixing unit, and pressurize the mixed stream.

32. The processing system of claim 31, further comprising a filtration unit to accept the pressurized mixed stream from the pressurization unit, and filter the pressurized mixed stream.

33. The processing system of claim 19, further comprising a refill system that includes connections to supply tanks and an about 25 micron filter device.

34. The processing system of claim 19, wherein the one or more reservoir tanks utilize load cells to determine usage and refill as necessary.

35. The processing system of claim 19, wherein the feeding unit further comprises a mix head.

36. The processing system of claim 35, wherein the mix head is located on a pivotable arm.

37. The processing system of claim 35, wherein the feeding unit further comprises a rinse system to rinse feeding unit transport lines and at least the mix head of a reactive stream.

38. The processing system of claim 35, wherein the feeding unit further comprises a positioning system having a sensor in proximity to the mix head and over an inlet of the mixing unit to deliver streams exiting the feeding unit to the mixing unit.

39. The processing system of claim 38, wherein the sensor is a positional sensor.

40. The processing system of claim 35, wherein the mix head comprises an inert gas outlet at a stream outflow to prevent introducing moisture and oxidation to the stream.

41. The processing system of claim 35, wherein the mix head has dual flushing capabilities to flush reactive stream components.

42. The processing system of claim 19, wherein the mixing unit comprises an overflow shroud.

43. The processing system of claim 19, wherein the feeding unit is enclosed within one oven.

44. The processing system of claim 43, wherein air flow within the oven circulates from the top of the oven to the bottom of the oven.

45. the processing system of claim 43, wherein the oven comprises a plurality of internal dividers.

46. The processing system of claim 19, wherein pumps and pump drive units are mounted onto machined pads on a base of the feeding unit.

47. The processing system of claim 46, wherein the pumps utilize a magnetic drive driven by a shaft with flexible joints.

48. The processing system of claim 46, further comprising a control system that monitors amp load within the pumps, shuts the system down if the pumps malfunction, and submits an alarm to alert an operator of the malfunction.

49. The processing system of claim 19, further comprising heat soak safeguards in a control system.

50. The processing system of claim 49, wherein the control system further comprises data recording files to reveal if heat soak safeguards are bypassed.

51. The processing system of claim 19, wherein a control program will take amp load measurements of agitators in each reservoir of the system.

52. The processing system of claim 19, wherein line pressure is monitored at pump suction, pump discharge, and mix head locations.

53. The processing system of claim 19, further comprising a filtering unit to filter the stream, the filter unit comprising at least two filters, a first filter being an on-line filter for filtering the stream, and a second filter being a stand-by filter for use when the first filter must be taken off-line, wherein the stream is directed through the first filter for filtering, and wherein upon there is a need for removing the first filter from the processing system, the stream can be directed through the second filter for filtering.

54. The processing system of claim 53, wherein the second filter is temperature controlled during stand-by, so the second filter has the operational characteristics for ready substitution of the first filter, so it can become the on-line filter upon removal of the first filter.

* * * * *